United States Patent [19]
Gunasekera

[11] Patent Number: 6,018,497
[45] Date of Patent: Jan. 25, 2000

[54] METHOD AND APPARATUS FOR GENERATING MORE ACCURATE EARTH FORMATION GRID CELL PROPERTY INFORMATION FOR USE BY A SIMULATOR TO DISPLAY MORE ACCURATE SIMULATION RESULTS OF THE FORMATION NEAR A WELLBORE

[75] Inventor: Dayal L. Gunasekera, Curbridge, United Kingdom

[73] Assignee: GeoQuest, Houston, Tex.

[21] Appl. No.: 08/873,234

[22] Filed: Jun. 11, 1997

Related U.S. Application Data

[60] Provisional application No. 60/039,475, Feb. 27, 1997.

[51] Int. Cl.$^7$ ...................................................... G01V 1/00
[52] U.S. Cl. ................................ 367/72; 367/69; 367/68; 367/38; 367/7; 364/422
[58] Field of Search .................................. 367/68, 69, 38, 367/72; 364/422

[56] References Cited

U.S. PATENT DOCUMENTS

| 4,821,164 | 4/1989 | Swanson | .................................. 364/420 |
| 5,056,066 | 10/1991 | Howard . | |

FOREIGN PATENT DOCUMENTS

| 2 217 014 | 10/1989 | United Kingdom . |
| 2 247 751 | 3/1992 | United Kingdom . |

OTHER PUBLICATIONS

"Computing Dirichlet tessellations", Bowyer, The Computer Journal, vol. 24, No. 2, 1981.
SPE 25262 "Validation of an Adaptive, Orthogonal, Curvilinear Gridding Procedure for Reservoir Simulation" 1993.
SPE 21235 "Orthogonal Curvillinear Grid generation with Preset Internal Boundaries for Reservoir Simulation", 1991.
SPE 25233 "Reservoir Simulation Grids: opportunities and problems" 1993.
"Distinguished Author Series: Reservoir Simulation: state of the art" Aug. 1982.
"The Simulation of Petroleum Reservoirs" Perspectives in Computing, Spring 1985.

(List continued on next page.)

*Primary Examiner*—Christine K. Oda
*Assistant Examiner*—Anthony Jolly
*Attorney, Agent, or Firm*—John H Bouchard

[57] ABSTRACT

A Petragrid method and apparatus generates grid cell property information that is adapted for use by a computer simulation apparatus which simulates properties of an earth formation located near one or more wellbores. An interpretation workstation includes at least two software programs stored therein: a first program called "Petragrid" and a second simulation program which is responsive to output data produced from the first "Petragrid" program for generating a set of simulation results. The set of simulation results are displayed on a workstation display monitor of the workstation. The first Petragrid software program will: receive well log and seismic data which indicates the location of each layer of a formation near a wellbore, and then grid each layer of the formation, the grid being comprised of a plurality of cells. The first Petragrid software will then generate more accurate data associated with each cell, such as the transmissibility of well fluid through each cell. The more accurate data for each cell originating from the first Petragrid software will be transmitted to the second simulation program. The second simulation program will respond to the more accurate data for each cell of the grid from the Petragrid software by generating a set of more accurate simulation results for each cell of the grid. The second simulation program will overlay the more accurate simulation result for each cell onto each of the corresponding cells of the grid which is being generated and displayed on the workstation display by the Petragrid software. As a result, the workstation will display each layer of the earth formation where each layer is gridded with a plurality of cells, and each cell has its own particular color which corresponds in numerical value to the particular more accurate simulation result (e.g., pressure or saturation) that corresponds to that cell.

29 Claims, 24 Drawing Sheets

OTHER PUBLICATIONS

SPE 9369 "Reservoir Geometry with Non–Rectangular Coordinate Grids" 1980.

SPE 15857 "The Construction of curvillinear co–ordinate grid systems for reservoir simulation", 1986.

"Numerical Solution of the Quasilinear Poisson Equation in a Nonuniform Triangle Mesh" by Alan M. Winston, Journal of Computational Physics 2, 149–172 (1967).

"A Control–Volume, Finite–Element Method of Local Mesh Refinement in Thermal Reservoir Simulation" by Peter A. Forsyth, SPE Reservoir Engineering, Nov. 1990.

"Delaunay's Mesh of a Convex Polyhedron in Dimension d Application to Arbitrary Polygedra" by George and Hermeline, International Journal for Numerical Methods in Engineering vol. 33, 975–995 (1992).

"Discretization on unstructured grids for inhomogeneous, anisotropic media, Part I: Derivation of the methods" by Aavatsmark, Barkve, Boe, submitted to SIAM J. Sci. Comput.

"Discretization on unstructured grids for inhomogeneous, anisotropic media, Part II: Discussion and numerical results" by Aavatsmark, Barkve, Boe, submitted to SIAM J. Sci. Comput.

"Interactive Modelling of Multiphase Inflow Performance of Horizontal and Highly Deviated Wells" by Alvestad, Holing, Christoffersen, SPE 27577 (Mar. 1994).

"Finite Volume Discretization of the Fluid Flow Equations on General Perpendicular Bisection Grids" by Amado, Ganzer, Heinemann, Fifth International Forum on Reservoir Simulation, Dec. 1994.

"Two Dimensional Static and Transient Simulation of Mobile Carrier Transport in a Semiconductor" by Cottrell, Buturla, NASECODE—Boole Press Dublin, 1979 Dublin.

"Flexible Gridding Techniques for Coning Studies in Vertical and Horizontal Wells", SPE 25563, Apr. 1993.

SPE 12264 "Nested Factorization" (1983).

"Two and Three–Dimensional Flexible Grids for Reservoir Simulation" by Verma and Aziz, 5th European conference on the Mathematics of Oil Recovery, Sep. 1996.

"Interpretation of Well Block Pressures in Numerical Reservoir Simulation With Nonsquare Grid Blocks and Anisotropic Permeability" by Peaceman, Society of Petroleum Engineers, Jun. 1983.

"Corner Point Geometry in Reservoir Simulation" by Ponting.

"The generation and application of Voronoi (PEBI) grids for simulating well tests in reservoirs with Eclipse", May 1992.

SPE 18854 "Predicting Horizontal/Slanted Well Production by Mathematical Modeling" by Chang, Tham, Mar. 1989.

SPE 37998 "The Generation and Application of K–Orthogonal Grid Systems" Jun. 8–11, 1997.

SPE 15622 "Generalized Transmissiblities for Distorted Grids in Reservoir Simulation" by Hegre, Dalen, Henriquez, Oct. 1986.

"A Triangle Based Mixed Finite Element—Finite Volume Technique for Modeling Two Phase Flow through Porous Media" Durlofsky, Journal for Computational Physics, (1993).

SPE 21224 "Reservoir Simulation With a Control Volume Finite Element Method" By Fung, Feb. 1991.

"Use of Vozonoi Grid in Reservoir Simulation", Society of Petroleum Engineers.-

FIG.10
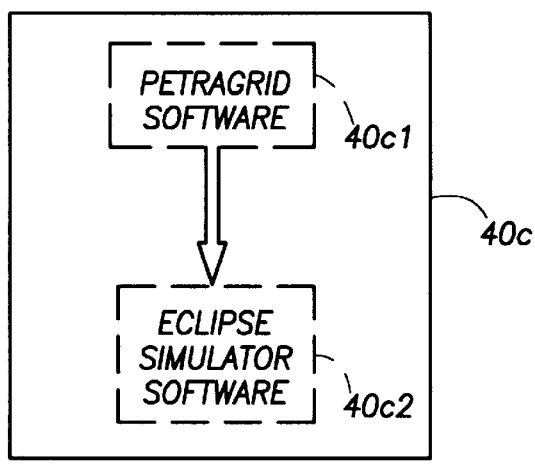
FIG.13c1
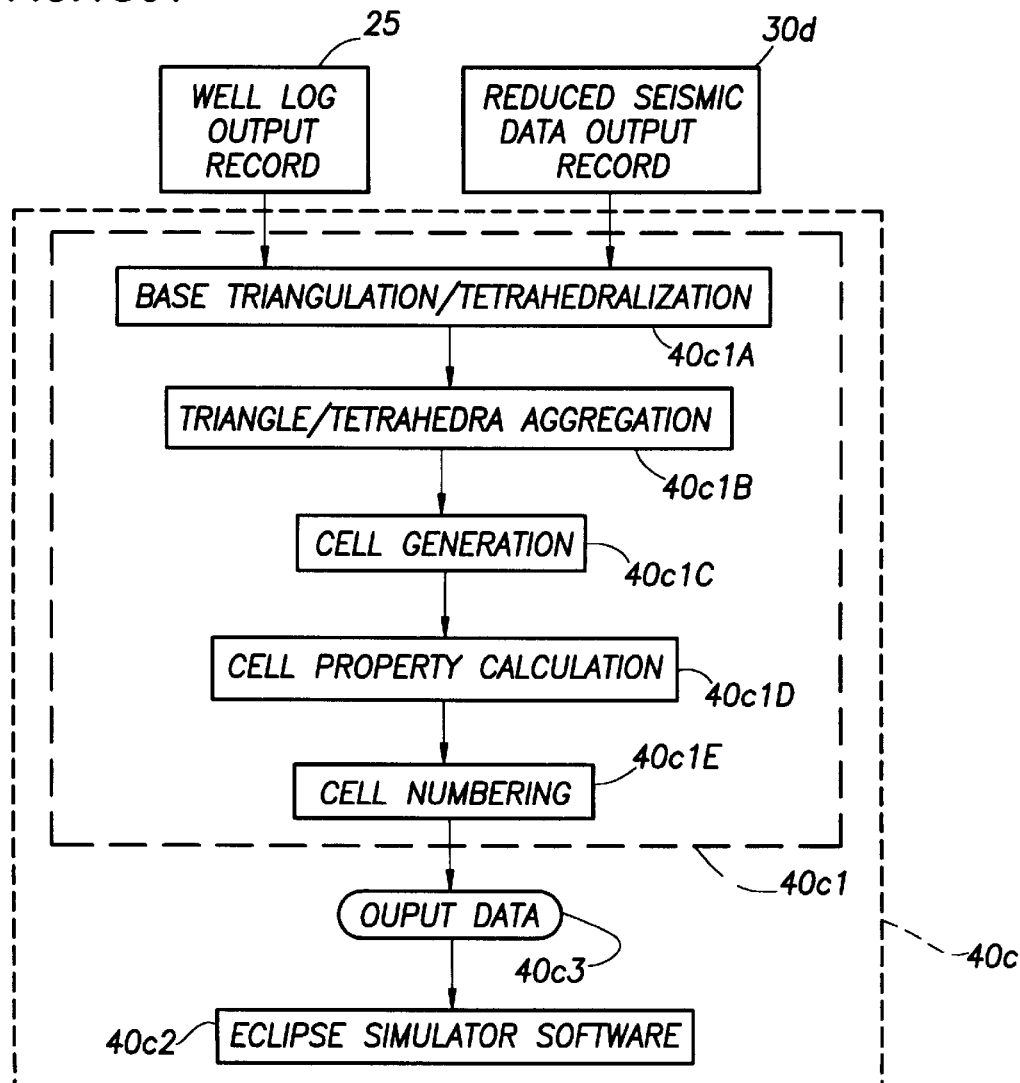

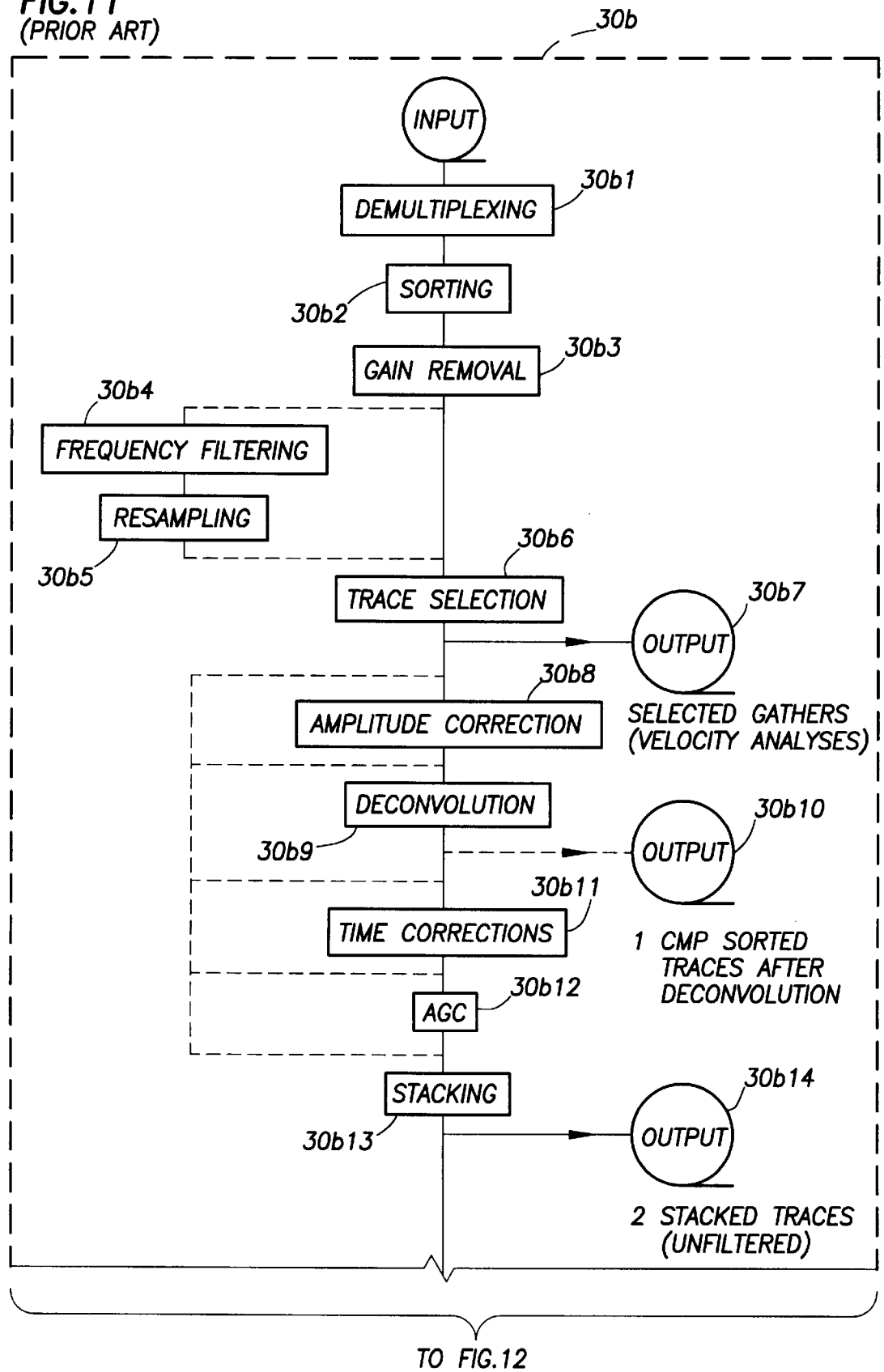

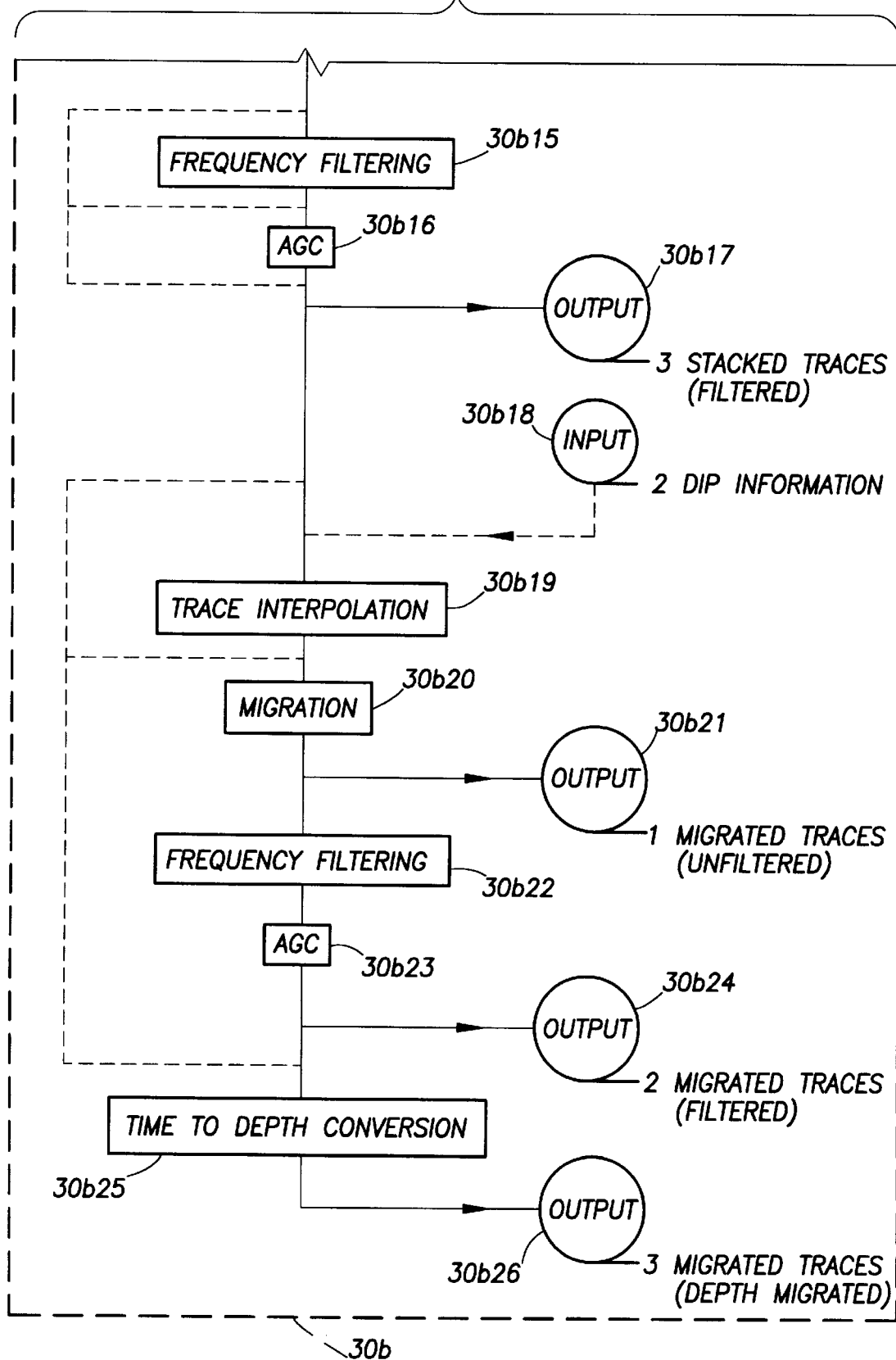

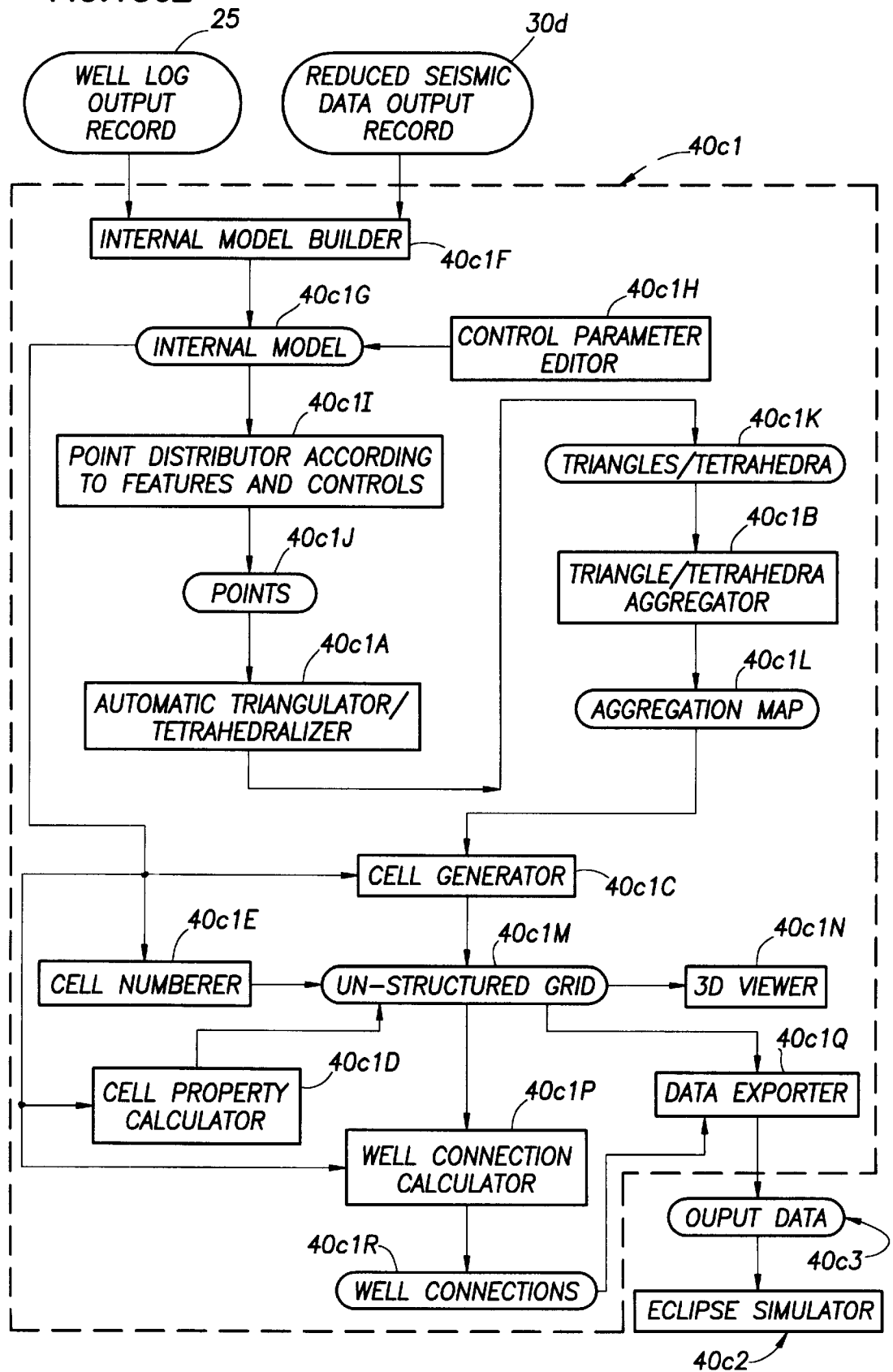
FIG.13c2

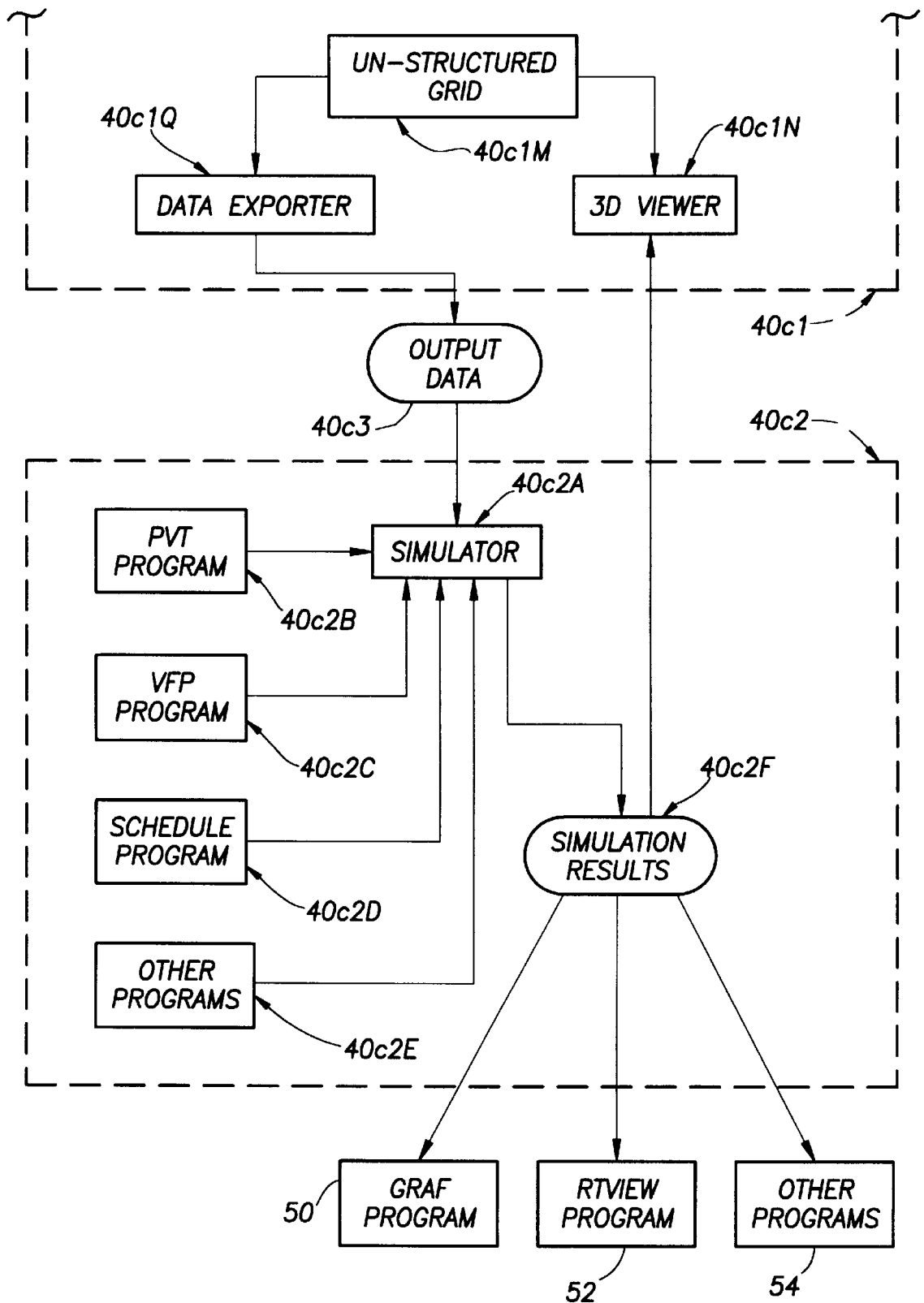
FIG.13d1

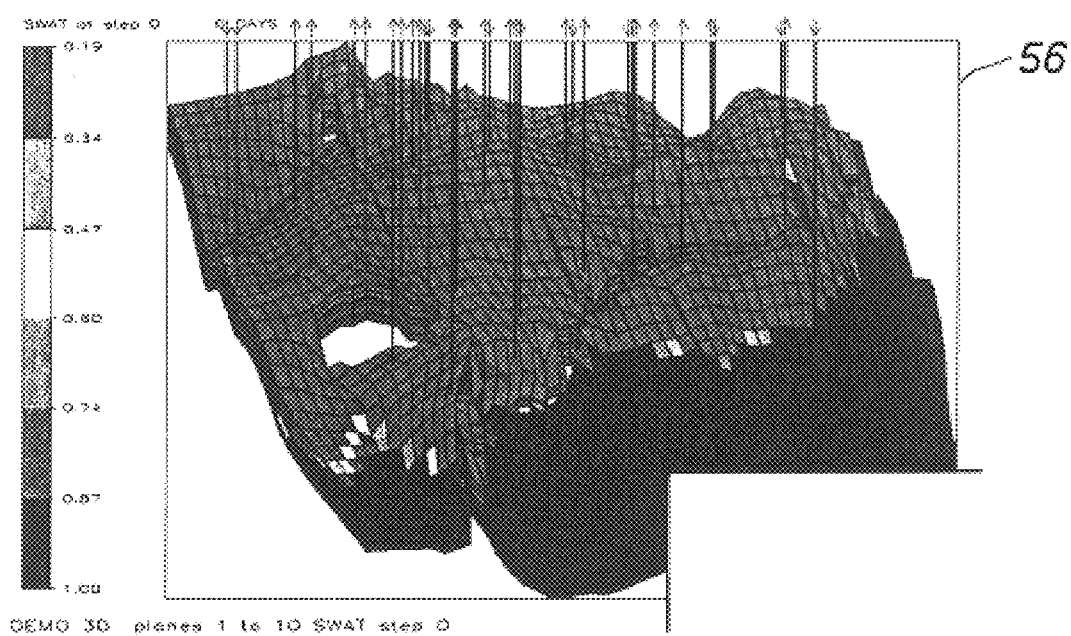
FIG. 13d2

FIG. 14

| 1 | 1 | 1 | 2 | 2 | 3 |   | 3 | 3 |   |
|---|---|---|---|---|---|---|---|---|---|
| 1 | 1 | 1 | 2 | 2 |   |   | 3 |   | 3 |
| 1 | 1 | 1 | 2 | 2 | 3 | 3 | 3 |   |   |
|   |   |   | 2 | 2 | 3 |   |   |   |   |
|   |   |   | 2 | 2 | 3 |   | 3 | 3 | 3 |
|   |   |   | 2 | 2 |   | 3 |   | 3 |   |
|   |   |   |   |   | 3 | 3 |   | 3 | 3 |
|   |   |   |   |   | 3 |   | 3 | 3 |   |

FIG. 15

| GRID TYPE | ACTIVE CELLS | NNC | CPU (s) | TIME STEPS | NON LIN.ITS. | LIN.ITS. | COST (μs) |
|---|---|---|---|---|---|---|---|
| SQUARE | 441 | 0 | 10 | 237 | 237 | 237 | 96 |
| HEXAGONAL | 461 | 526 | 14 | 242 | 242 | 242 | 126 |
| TRIANGULAR | 976 | 915 | 27 | 259 | 259 | 259 | 107 |
| RAD/PEBI | 296 | 83 | 21 | 533 | 533 | 912 | 133 |

FIG. 16

| GRID TYPE | ACTIVE CELLS | NNC | CPU (s) | TIME STEPS | NON LIN.ITS. | LIN.ITS. | COST (μs) |
|---|---|---|---|---|---|---|---|
| RECTANGLE | 423 | 0 | 17 | 477 | 477 | 477 | 84 |
| HEXAGONAL | 473 | 553 | 25 | 483 | 483 | 483 | 109 |
| TRIANGULAR | 1004 | 773 | 56 | 732 | 732 | 732 | 76 |
| RAD/PEBI | 382 | 197 | 29 | 679 | 679 | 1575 | 112 |

FIG. 17

| GRID TYPE | ACTIVE CELLS | NNC | CPU (s) | TIME STEPS | NON LIN.ITS. | LIN.ITS. | COST (ms) |
|---|---|---|---|---|---|---|---|
| RECTANGLE | 2825 | 0 | 499 | 73 | 377 | 2857 | 2.42 |
| HEX/PEBI | 3095 | 3271 | 1087 | 94 | 480 | 4724 | 3.74 |
| RECT/PEBI | 2795 | 1359 | 628 | 74 | 389 | 3267 | 3.04 |

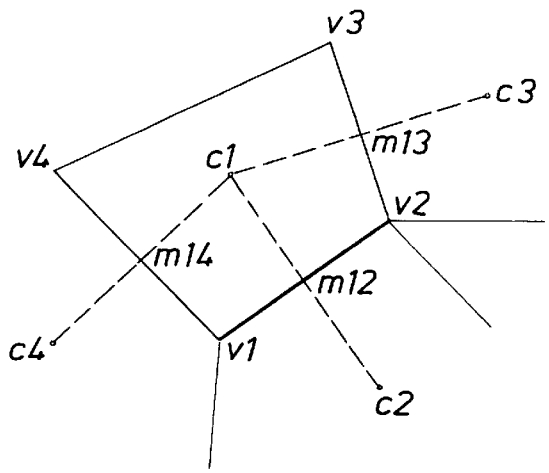
FIG. 18
FIG. 19
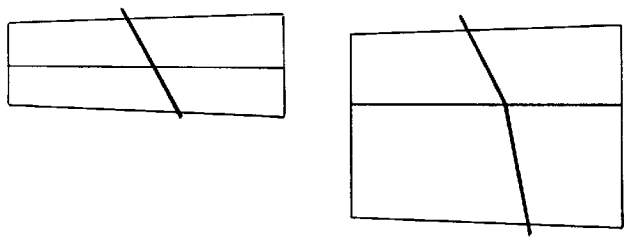
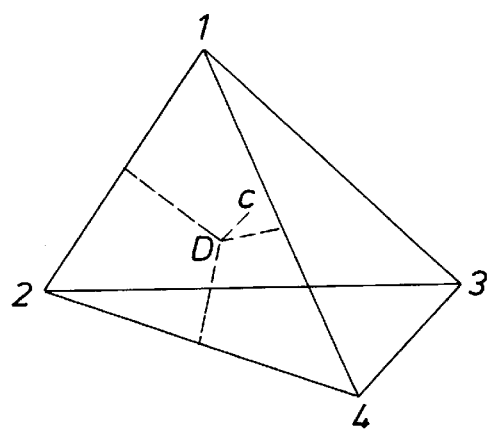
FIG. 20
FIG. 21
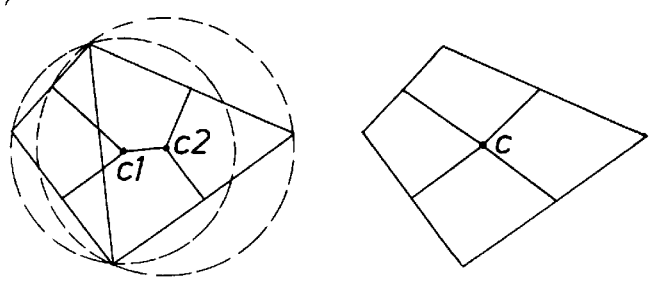

METHOD AND APPARATUS FOR GENERATING MORE ACCURATE EARTH FORMATION GRID CELL PROPERTY INFORMATION FOR USE BY A SIMULATOR TO DISPLAY MORE ACCURATE SIMULATION RESULTS OF THE FORMATION NEAR A WELLBORE

CROSS REFERENCE TO RELATED APPLICATIONS

This specification is a 35 USC 111(a) and 35 USC 119(e)(1) application of prior pending provisional application serial No. 60/039,475 filed Feb. 27, 1997 and entitled "Method and Apparatus for Generating More Accurate Earth Formation Grid Cell Property Information for Use by a Simulator to Display More Accurate Simulation Results of a Formation Near a Wellbore".

BACKGROUND OF THE INVENTION

The subject matter of the present invention relates to a workstation based software method and apparatus, which is responsive to received seismic data and well log data, for generating a grid composed of a plurality of individual cells which is imposed upon each horizon of an earth formation and further generating a corresponding plurality of "more accurate" information relating, for example, to the transmissibility properties of the plurality of cells of the grid, the plurality of "more accurate" information being input to a conventional simulator which generates a corresponding plurality of simulation results (such as pressures and saturations) pertaining, respectively, to the plurality of cells of the grid, the plurality of simulation results being overlayed, respectively, upon the plurality of cells of the grid so that a new simulation result is associated with each cell of the grid, the cells of the grid and the new simulation results associated therewith being displayed on the workstation display monitor for viewing by an operator of the workstation.

Seismic operations are performed near one or more wellbores in an earth formation, and a plurality of seismic data is obtained from such seismic operation. In addition, well logging operations are also performed in the one or more wellbores and well log data is also obtained from the well logging operations. The seismic data and the well log data is input to a computer workstation where an interpretation program is executing. The interpretation program of the prior art was comprised of a first program sometimes called "grid" which generated data, and a second simulation program, responsive to the first program, which received the data from the first "grid" program and generated a set of simulation results and displayed the simulation results on the workstation display, the displayed simulation results enabling an operator to determine the flow properties of the earth formation situated near the one or more wellbores drilled into the formation. In particular, the first "grid" program establishes a grid for each horizon in the earth formation near the wellbores, the grid for each horizon comprising a multitude of individual cells. In addition, the first "grid" program generates data and other information for each of the individual cells for each horizon, the data and other information for each cell being transmitted to the second simulation program which uses the data and information received from the first program to generate a set of simulation results for each cell of the grid, a simulation result being displayed on the workstation display for each cell of the grid thereby enabling an operator of the workstation to determine the flow producing properties of each of the cells in the gridded earth formation located near the wellbores drilled into the formation.

However, continuous developmental efforts are focused on improving the quality and accuracy of the data and other information generated by the first "grid" program. When a set of improved and more accurate data is received by the second simulation program, the simulation function practiced by the second simulation program will be more accurate and complete; that is, the simulation results generated by the second simulation program will be more accurate and complete. Consequently, in view of the more accurate and complete set of simulation results generated by the second simulation program, the flow properties associated with each cell of the earth formation located near the wellbores can be more accurately determined.

Consequently, a need exists for improving the first program of the interpretation program such that more accurate data is generated by the first program. More particularly, since the data generated by the first program of the interpretation program includes a parameter known as "transmissibility" which relates to the transmissibility or flow properties of each cell of the grid imposed on the formation, a need exists for improving the first program of the interpretation program executing in the workstation so that more accurate "transmissibility" data is generated by the first program.

When more accurate transmissibility data is generated by the first program, more accurate simulation results can be generated by the second simulation program of the interpretation program. As a result, in response to the more accurate simulation results, a display on said workstation will display more accurate data, such as pressures and saturations, associated with each cell of the grid of the earth formation near the wellbores. Consequently, the flow properties of the formation near the wellbores are more accurated determined.

More particularly, flow simulations on grids based on triangles have been used by various authors inside and outside the petroleum industry. Winslow[24] used control volumes formed around each node of a triangular grid by joining the edge midpoints to the triangle centroids for solving a 2D magnetostatic problem. This technique was applied to reservoir simulation by Forsyth[12], and is commonly known as the control volume finite element (CVFE) method. Cottrell et al.[9] used control volumes formed by joining the perpendicular bisectors of triangle edges of a Delaunay[10] triangulation for solving semiconductor device equations. Heinemann et al.[18] applied this technique to reservoir simulation, which is known as the PEBI or the Voronoi[23] method. Further work on the CVFE method was presented by Fung[13] and on the PEBI method by Palagi[19] and Gunasekera[15]. Both Forsyth and Fung handled heterogeneous problems by defining permeability to be constant over a triangle. Aavatsmark[1] and Verma[22] derived an alternative difference scheme based on the CVFE method in which permeabilities are defined to be constant within control volumes. This approach handles boundaries of layers with large permeability differences better than the traditional CVFE method and as with the traditional method it leads to a multi-point flow stencil, hence referred to as an MPFA scheme. By contrast, the PEBI method reduces to a two point flow stencil. Heinemann et al.[18] and Amado et al.[4] extended the PEBI method to handle anisotropic heterogeneous systems by defining permeability to be constant within a triangle and by adjusting the angle between triangle edges and cell boundaries. This approach has two problems;

firstly handling layers of contrasting permeabilities is poor, secondly in highly anisotropic systems the angle condition between triangle edges and cell boundaries may become so severe that cells begin to overlap, as shown in Verma[22]. As an alternative to using control volumes formed around nodes of triangulations it is possible to use the triangles themselves as control volumes. Examples of such schemes are Aavatsmark[1], Durlofsky[11], Cominelli et al.[8] and Gunasekera[16]. A drawback of triangular control volumes compared to Voronoi volumes is the much higher number of cells in the former; for random point distributions an average factor of two and five exist in two and three dimensions respectively. An advantage of triangular grids is the flexibility in honouring complex geological and production features.

SUMMARY OF THE INVENTION

Accordingly, it is a primary object of the present invention to provide an improved interpretation program adapted to be executed by an interpretation workstation for use in an oilfield environment.

It is a further object of the present invention to provide an improved first program of the interpretation program (hereinafter called the "Petragrid software") executable on the interpretation workstation for the purpose of determining the flow properties and other information associated with the earth formation near a wellbore.

It is a further object of the present invention to provide an improved first "Petragrid" software program for generating more accurate data, such as transmissibility, for transmission to a second simulation program of the interpretation program executable on the interpretation workstation, the second simulation program producing more accurate simulation results in response to the more accurate data from the Petragrid software program, the more accurate simulation results providing a more accurate indication of the flow producing properties of an earth formation situated near a wellbore.

It is a further object of the present invention to provide an improved Petragrid software program adapted for generating more accurate data for use by a second simulation program of the interpretation program executable on the interpretation workstation, the Petragrid software program providing improved quality and more accurate data and other information, such as flowrate data and transmissibility data, associated with each of the cells of a grid of each layer of an earth formation, for transmission to the second simulation program that generates more accurate simulation results responsive thereto, such as pressure and saturation, the simulation results being associated with each cell of the grid for simulating the flow properties of the formation located near one or more wellbores in the formation.

In accordance with these and other objects of the present invention, a "Petragrid" method and apparatus is disclosed, in accordance with the present invention, for generating grid cell property information that is adapted for use by a computer simulation apparatus which simulates properties of an earth formation located near one or more wellbores drilled into the formation. An interpretation workstation includes at least two software programs stored therein: a first program called "Petragrid" and a second simulation program which is responsive to output data produced from the first "Petragrid" program for generating a set of simulation results. The set of simulation results are displayed on a workstation display monitor of the workstation. The first "Petragrid" software program will receive well log and seismic data which indicates the location of each layer of a formation near a wellbore. The first "Petragrid" software program will "grid" each layer of the formation, the grid being comprised of a plurality of "cells". The first "Petragrid" software will then generate more accurate data associated with each cell, such as the "transmissibility" of well fluid through each cell. The more accurate data for each cell originating from the firt "Petragrid" software (i.e., the transmissibility through each cell) will be transmitted to the second simulation program. The second simulation program will respond to the "more accurate" data for each cell of the grid from the Petragrid software by generating a set of "more accurate" simulation results for each cell of the grid. The second simulation program will overlay the more accurate simulation result for each cell onto each of the corresponding cells of the grid which is being generated and displayed on the workstation display by the Petragrid software. As a result, an operator sitting at the workstation will view each layer of the earth formation where each layer is gridded with a plurality of cells, and each cell has its own particular color which corresponds in numerical value to the particular "more accurate simulation result" (e.g., pressure or saturation) that corresponds to that cell.

The most novel aspects of the first "Petragrid" software program of the present invention, executing in the interpretation workstation, are discussed below with reference to FIG. 13c1 and 13c2 of the drawings. The most novel aspects of the "Petragrid" software include the following: base triangulation/tetrahedralization, triangle/tetrahedral aggregation, cell generation, cell property calculation, and cell numbering.

More particularly, un-structured K-orthogonal PEBI grids with permeability defined on triangles (or tetrahedra) have been used successfully for mildly anisotropic systems. However, the Petragrid method and apparatus of this specification presents two un-structured K-orthogonal grid systems, in which permeability is defined on cells. The first grid system is the previously mentioned K-orthogonal PEBI grids, and the second grid system is the dual of a PEBI grid constructed by aggregating triangles (or tetrahedra) termed a "composite tetrahedral grid". Such grids, when carefully generated, enable the accurate modelling of highly anisotropic and heterogeneous systems. Good K-orthogonal grids for highly anisotropic systems can be generated by transforming the physical space into an isotropic computational space in which an orthogonal grid is generated.

The steps involved in generating K-orthogonal "unstructured" grids and their application to reservoir simulation are discussed and comprise the steps of anisotropy scaling, point distribution, triangulation (or tetrahedralization), triangle aggregation, cell generation, transmissibility calculation, grid smoothing, well connection factors, and cell renumbering for linear algebra. The Petragrid method and apparatus of this specification also: describes how independently generated multiple domains are merged to form a single grid, and presents 2D and 3D simulation results for single phase and multi-phase problems in well test and full field situations.

The grids are tested under high anisotropy, high mobility ratios, complex geometries and grid orientations, in order to establish the true limitations of K-orthogonal grids. The error due to non-orthogonality is reported for each cell, suggesting regions where multi-point flux approximations may be of advantage. Relative merits of PEBI and composite tetrahedral grids are also discussed. The grids are applicable to multi-layered, multi-phase well test and full field simulations, with full heterogeneity and anisotropy limited to a spatially varying kv/kh ratio.

In addition, other novel technical contributions disclosed in this specification include: the definition and generation of composite tetrahedral grids, the process of generating good K-orthogonal PEBI and composite tetrahedral grids, algorithms for computing volumes, transmissibilities, well connections and cell renumbering for general K-orthogonal grids.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 10 illustrates the contents of the memory of the interpretation computer workstation of FIG. 9 including the Petragrid software program of the present invention;

FIGS. 11 and 12 illustrate the data reduction software 30$b$ of FIG. 7;

FIG. 13$c$1 illustrates the more relevant and novel aspects of the Petragrid software program of the present invention shown in FIG. 10 which operate on the gridded horizons of FIG. 13$a$;

FIG. 13$c$2 illustrates a more complete flow diagram of the Petragrid software program of the present invention, including the more relevant and novel aspects illustrated in FIG. 13$c$1;

FIG. 13$d$1 illustrates a flow diagram of the Eclipse simulator (the second simulation program) which receives the more accurate output data from the Petragrid software program of the present invention, the Eclipse simulator generating a set of more accurate simulation results which are displayed on the output display;

FIGS. 13$d$2 and 13$d$3 illustrate an example output display which is produced by the Eclipse Simulator software of FIG. 13$d$1 and is displayed on the interpretation workstation display monitor;

FIGS. 14 through 17 illustrate tables 1, 2, 3, and 4 which are used during the discussion set forth below in the Detailed Description of the Preferred Embodiment;

FIG. 18 illustrates an unstructured cell with vertices v1,v2,v3,v4 and centre c1;

FIG. 19 illustrates a two layer model with a single well transformed into isotropic space;

FIG. 20 illustrates a tetrahedral cell with circumcentre C;

FIG. 21 illustrates a pair of triangles before aggregation and a quadrilateral after aggregation, with respective PEBI cell portions;

FIG. 26 illustrates a Pressure, kx/ky=1, square grid,

FIG. 27 illustrates a Pressure, kx/ky=1, hexagonal grid,

FIG. 28 illustrates a Pressure, kx/ky=1, triangular grid,

FIG. 29 illustrates a Pressure, kx/ky=1, radial/PEBI grid,

FIG. 30 illustrates a Log-log plot of wellbore pressure drops and derivatives from an analytic solution and from different grids for kx/ky=1, FIG. 31 illustrates a Pressure, kx/ky=25, rectangular grid, FIG. 32 illustrates a Pressure, kx/ky=25, hexagonal grid, FIG. 33 illustrates a Pressure, kx/ky=25, triangular grid, FIG. 34 illustrates a Pressure, kx/ky=25, radial/PEBI grid, FIG. 35 illustrates a Log-log plot of wellbore pressure drops and derivatives from an analytic solution and from different grids for kx/ky=1, FIG. 36 illustrates a Water saturation, 100 ft square grid, FIG. 37 illustrates a Water saturation, 50 ft square grid, FIG. 38 illustrates a Water saturation, 100 ft triangular grid, FIG. 39 illustrates a Water saturation, 100 ft hexagonal grid, FIG. 40 illustrates a Water saturation, 1 injector, 2 producers, kx/ky=1, FIG. 41 illustrates a Water saturation, 1 injector, 2 producers, kx/ky=5, FIG. 42 illustrates a Water cut for the two producers, kx/ky=1, and FIG. 43 illustrates a Water cut for the two producers, kx/ky=5;

DESCRIPTION OF THE PREFERRED EMBODIMENT

This "Description of the Preferred Embodiment" includes: (1) Background Information, consisting of a description of well logging operations for producing a set of well log data and seismic operations for producing a set of seismic data, with reference to FIGS. 1, 2, 3, 4, 5, 6, 7, 11, and 12 of the drawings, (2) a Summary of the Petragrid Method and Apparatus of the present invention that is responsive to the well log data and the seismic data produced by the well logging operations and the seismic operations of FIGS. 1 through 7, respectively, with reference to FIGS. 8, 9, 10, 13a, 13b, 13c1 and 13c2 of the drawings; and (3) a summary of the Eclipse Simulator software 40c2 of FIG. 13c1 and 13c2 with reference to FIGS. 13d1 and 13d2.

(1) Background Information

Referring to FIGS. 1 through 7, 11, and 12 in general, the well logging operations for producing well log data and the seismic operations for producing seismic data is illustrated.

Figure 1:
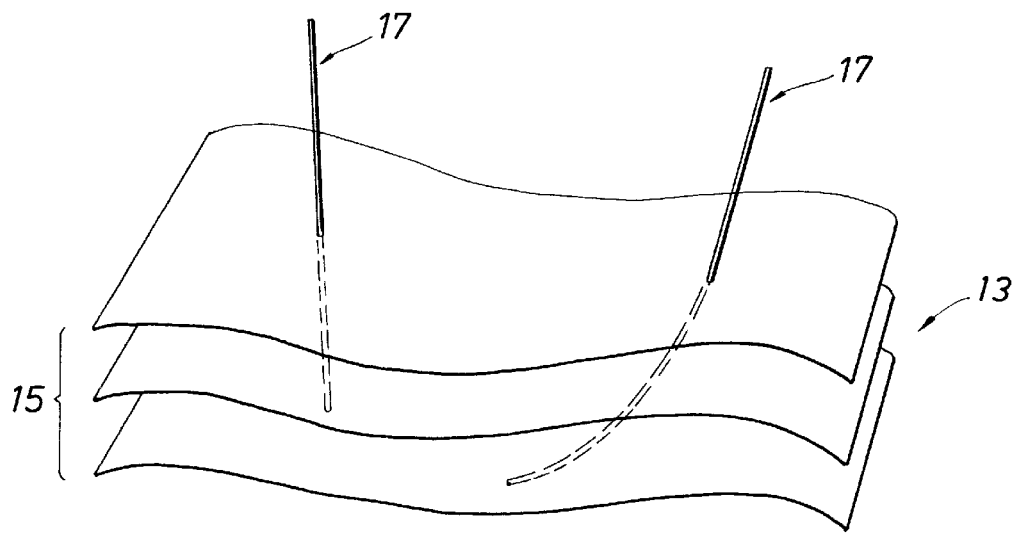
FIG. 1 illustrates a plurality of earth formation horizons which are penetrated by two wellbores.

In FIG. 1, a plurality of earth formation horizons 13 comprise an earth formation 15 and a pair of wellbores 17 have been drilled into the formation 15 for the ultimate purpose of withdrawing wellbore fluid from the formation. The earth formation 15 will be modelled and simulated on an interpretation workstation computer by the Petragrid software of the present invention.

Figure 2:
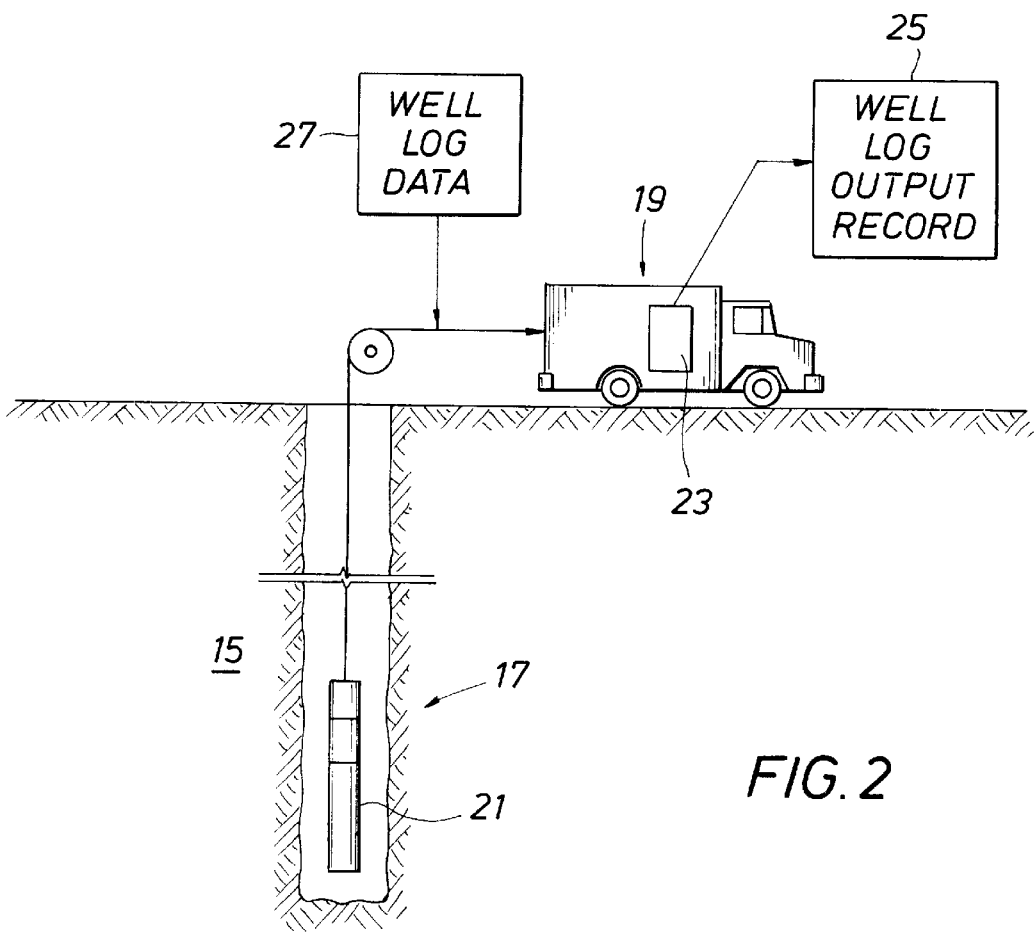
FIG. 2 illustrates a well logging operation being performed at the wellbores of FIG. 1 for generating a well log output record.

In FIG. 2, one of the wellbores 17 of FIG. 1 is illustrated as penetrating the earth formation 15 of FIG. 1. A well logging truck 19 lowers a logging tool 21 into the wellbore 17 and the logging tool 21 stimulates and energizes the formation 15. In response, sensors in the logging tool 21 receive signals from the formation 15, and, in response thereto, other signals representative of well log data 27 propagate uphole from the logging tool 21 to a well logging truck computer 23. A well log output record 25 is generated by the well logging truck computer 23 which displays the well log data 27.

Figure 3:
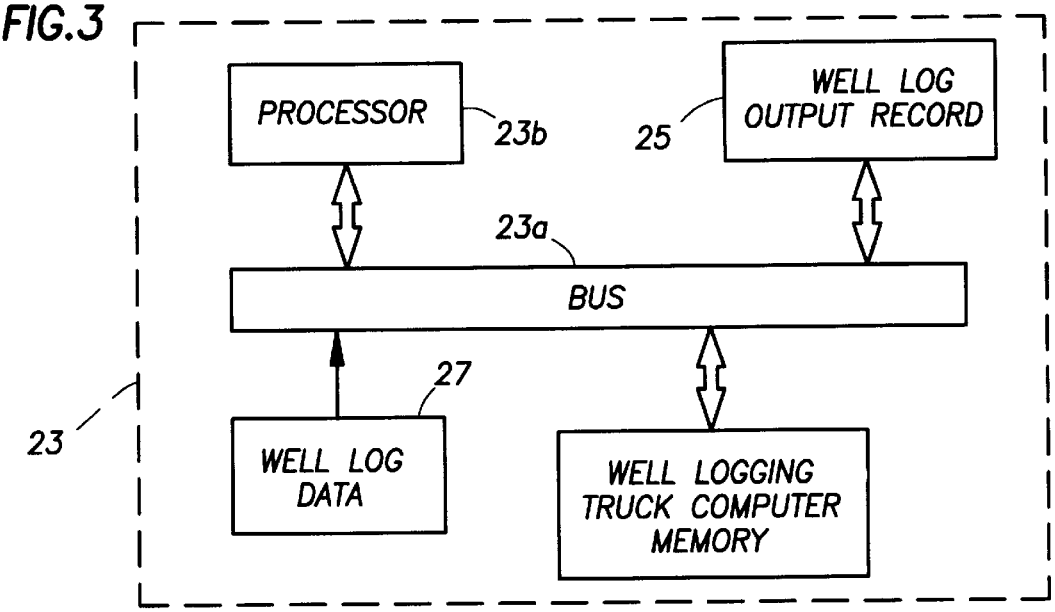
FIG. 3 illustrates the well logging truck computer of FIG. 2 which generates the well log output record.

In FIG. 3, a more detailed construction of the well logging truck computer 23 is illustrated. A bus 23a receives the well log data 27 and, responsive thereto, the well log output record 25 is generated by the processor 23b, the well log output record 25 displaying and/or storing the well log data 27. The well log output record 25 is input to the interpretation workstation of FIGS. 8 and 9.

Figure 4:
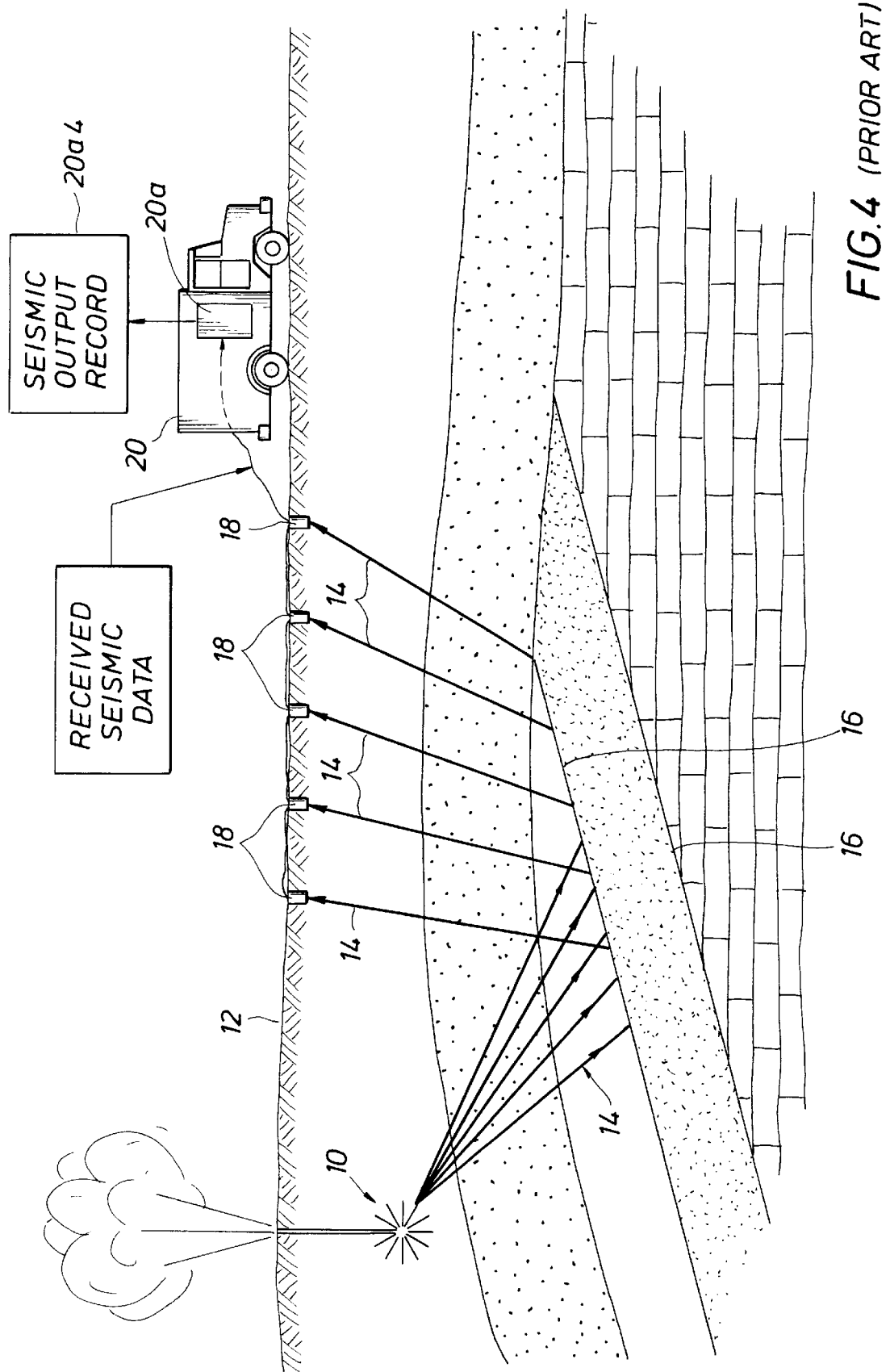
FIGS. 4 through 7 illustrate a seismic operation performed near the wellbores of FIG. 1 adapted for generating seismic data, and, in particular, a reduced seismic data output record.
Figure 5:
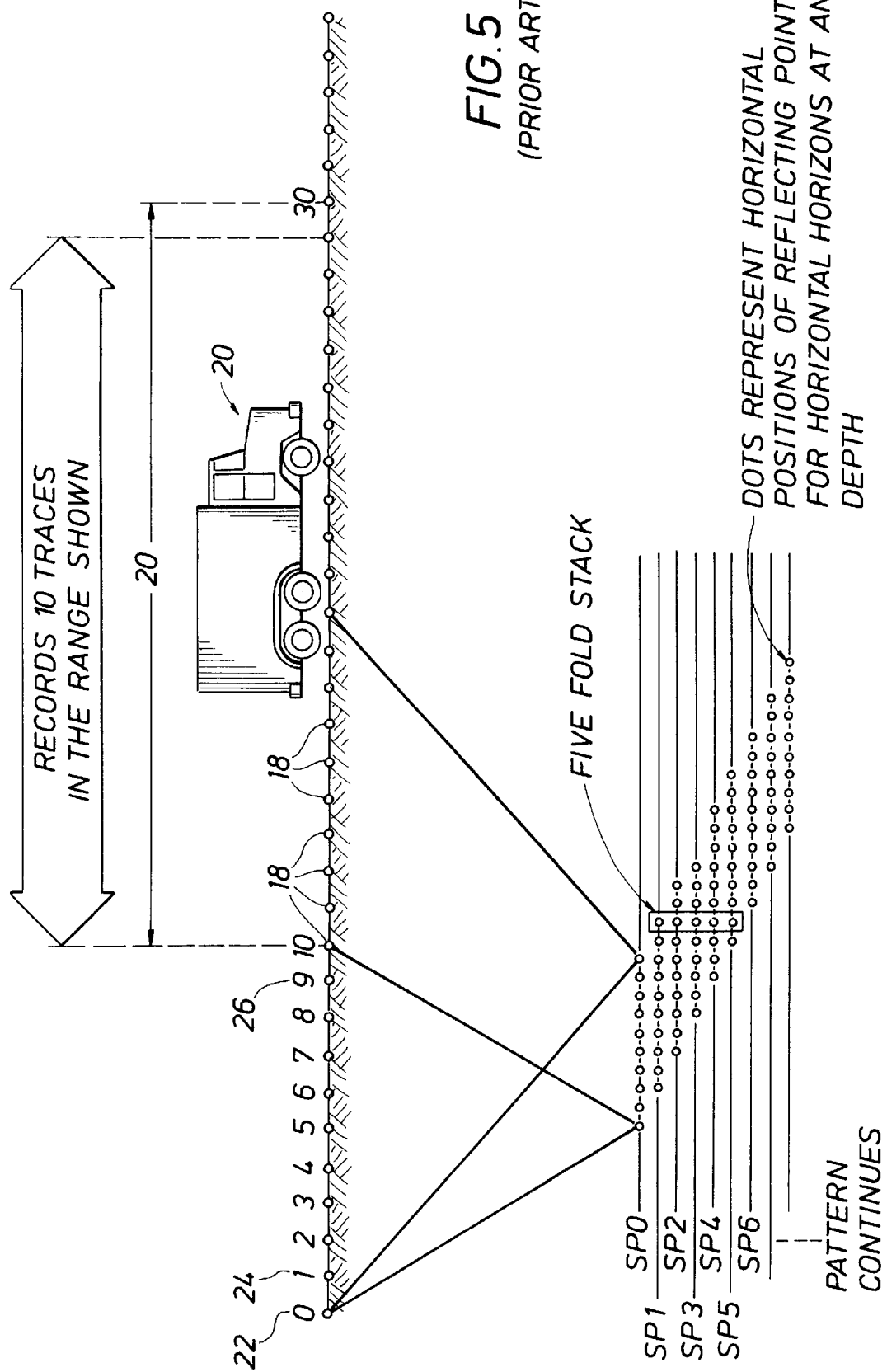

In FIGS. 4 and 5, an apparatus and associated method for performing a three dimensional (3D) seismic operation at a location on the earth's surface near the wellbores 17 of FIG. 1 is illustrated.

In FIG. 4, an explosive or acoustic energy source 10 situated below the surface of the earth 12 detonates and generates a plurality of sound or acoustic vibrations 14 which propagate downwardly and reflect off a horizon layer 16 within the earth formation. The horizon layer 16 could be a top layer of rock or sand or shale. When the sound vibrations reflect off the horizon layer 16, the sound vibrations 14 will propagate upwardly and will be received in a plurality of receivers 18 called geophones 18 situated at the surface of the earth. The plurality of geophones 18 will each generate an electrical signal in response to the receipt of a sound vibration therein and a plurality of electrical signals will be generated from the geophones 18, the plurality of signals being received in a recording truck 20. The plurality of electrical signals from the geophones 18 represent a set of characteristics of the earth formation including the horizons 16 located within the earth below the geophones 18. The recording truck 20 contains a computer 20a which will receive and store the plurality of signals received from the geophones 18. A seismic output record 20a4 will be generated from the computer 20a in the recording truck 20 which will include and/or display and/or store the plurality of electrical signals that are representative of the characteristics of the earth formation including the horizons 16 located within the earth below the geophones 18

In FIG. 5, another method and apparatus for performing a 3D seismic operation is illustrated. FIG. 5 was taken from a book entitled "Seismic Velocity Analysis and the Convolutional Model", by Enders A. Robinson, the disclosure of which is incorporated by reference into this specification. The 3D seismic operation of FIG. 4 is performed 10 different times. For example, when the explosive energy source 10 is located at position 22 (the first position or position "0" along the surface of the earth) in FIG. 4, a first plurality of electrical signals from the geophones 18 are stored in the computer 20a in the recording truck 20. The explosive energy source is moved to position 24. When the explosive energy source 10 is located in position 24 (the second position or position "1" along the surface of the earth), a second plurality of electrical signals are stored in the computer 20a in the recording truck 20. The explosive energy source 10 is repeatedly and sequentially moved from positions "2" to "9" in FIG. 5 until it is located at position 26 (i.e.—position "9" which is the tenth position) on the surface of the earth. When the explosive energy source 10 is located in position 26 (the tenth position along the surface of the earth), a tenth plurality of electrical signals are stored in the computer 20a in the recording truck 20. As a result, in FIG. 5, the recording truck 20 records 10 traces (ten sets of electrical signals, where each set is a plurality of electrical signals) between position 22 and position 26 along the surface of the earth. A seismic output record 20a4 will be generated by the computer 20a in the recording truck 20 which includes the 10 traces or ten set of electrical signals received from the geophones 18.

Figure 6:
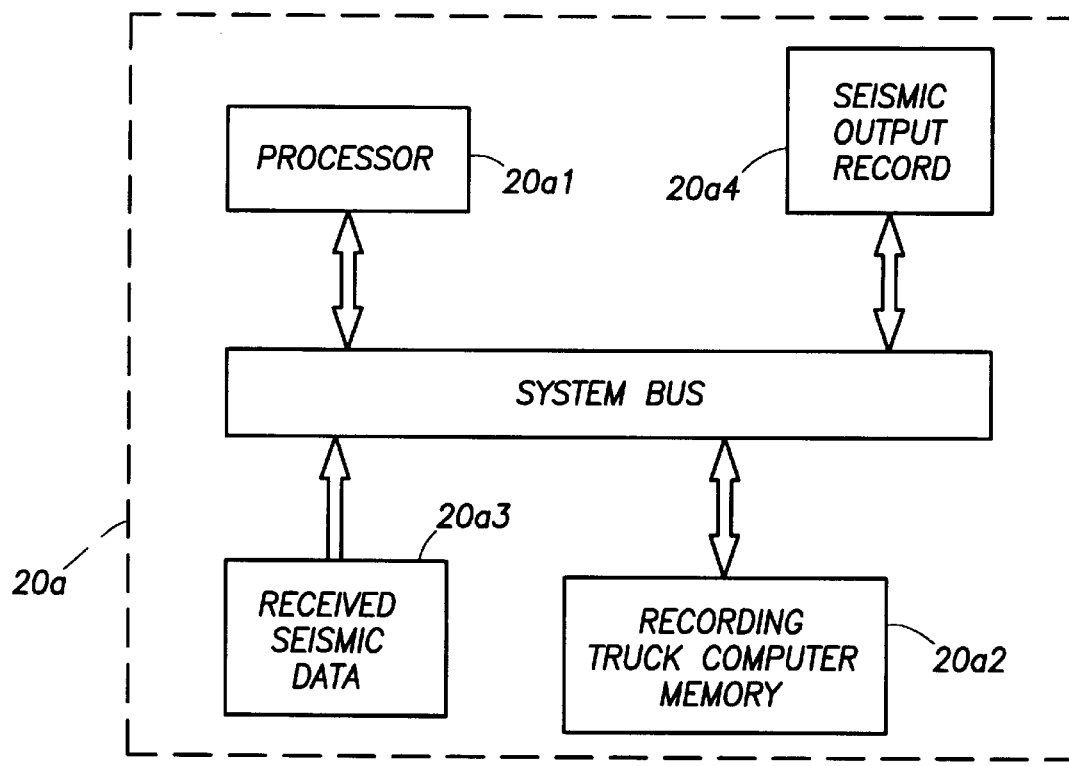

In FIG. 6, a more detailed construction of the recording truck computer 20a is illustrated. The recording truck computer 20a of FIG. 4 includes a processor 20a1 and a memory 20a2 connected to a system bus. The ten traces or ten sets of electrical signals (received from the geophones 18 during the 3D seismic operation) would be received into the recording truck computer 20a via the "Received Seismic Data" block 20a3 in FIG. 3 and would be stored in the memory 20a2 of the recording truck computer 20a. When desired, a seismic output record 20a4 is generated by the recording truck computer 20a, the seismic output record 20a4 being adapted for storing and displaying "a plurality of seismic data" representing the ten traces or ten sets of electrical signals received by the recording truck computer 20a from the geophones 18.

Figure 7:
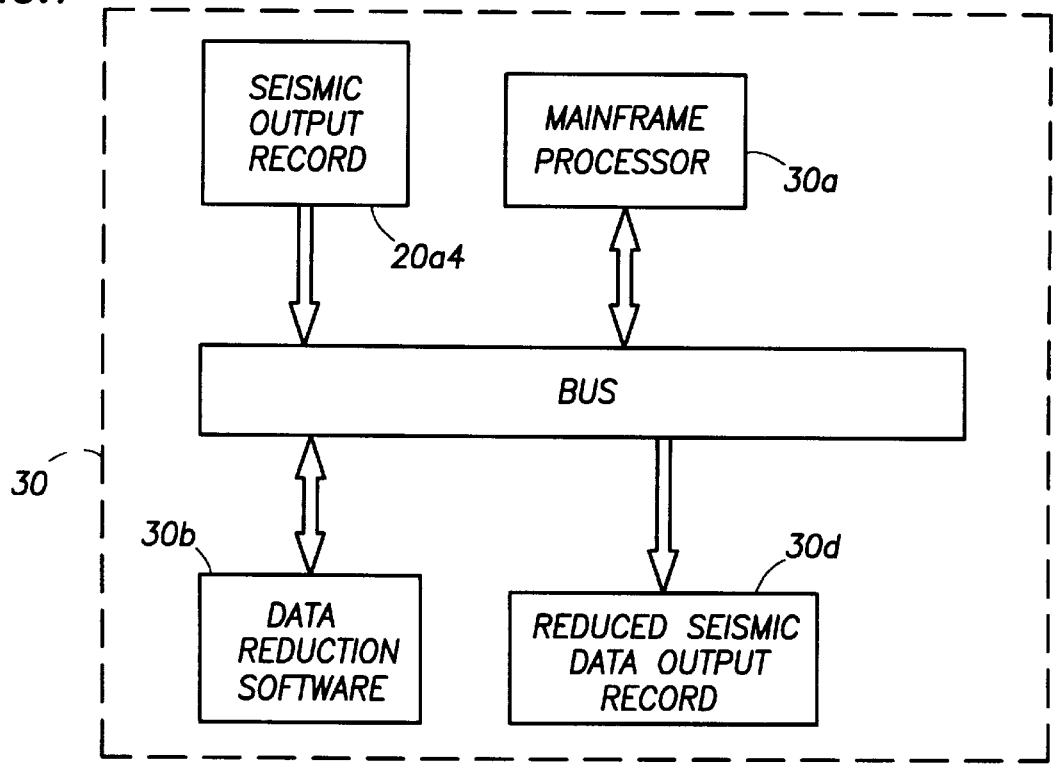

In FIG. 7, a simplified diagram of a mainframe computer 30 is illustrated which uses a stored "data reduction software" to perform a "data reduction" operation on the "plurality of seismic data" included in the seismic output record 20a4 of FIG. 6. The mainframe computer 30 produces a "reduced seismic data output record" 30d in FIG. 7 which is adapted for storing and displaying information that represents "reduced" versions of the "plurality of seismic data" included in the output record medium 20a4 of FIG. 3. The mainframe computer 30 of FIG. 4 includes a mainframe processor 30a connected to a system bus and a memory 30b also connected to the system bus which stores a "data reduction software" therein. The seismic output record 20a4 of FIG. 6, which includes the "plurality of seismic data", is connected to the system bus of the mainframe computer 30 of FIG. 7. As a result, the "plurality of seismic data", included in the output record medium 20a4 of FIG. 6, is now being input to the mainframe processor 30a of FIG. 7. The processor 30a of the mainframe computer 30 in FIG. 7 executes the "data reduction software" stored in the memory 30b of the mainframe computer. The "data reduction software", which is stored in the memory 30b of the mainframe computer 30 of FIG. 4, can be found in a book entitled "Seismic Velocity Analysis and the Convolutional Model", by Enders A. Robinson, the disclosure of which is incorporated by reference into this specification. When the "data reduction software" in memory 30b is executed, the mainframe processor 30a will perform a "data reduction" operation on the "plurality of seismic data" that is included in the seismic output record 20a4 of FIG. 7. When the "data reduction operation" is complete, the mainframe processor 30a will generate a "reduced seismic data output record" 30d which will store and is adapted for displaying information: representing a "reduced version" of the "plurality of seismic data" included in the seismic output record 20a4 of FIG. 7, and including a set of characteristics pertaining to the earth formation located near the wellbore 17 of FIG. 1, the characteristics including the location and structure of the horizons 16 of FIG. 4.

In FIGS. 11 and 12, a flowchart of the data reduction software 30b stored in the memory 30b of the mainframe computer 30 of FIG. 7 is illustrated. The data reduction software flowchart of FIGS. 11 and 12 is taken from a book entitled "Seismic Velocity Analysis and the Convolutional Model" by Enders A. Robinson, the disclosure of which has already been incorporated by reference into this specification. The flowchart of the data reduction software 30b includes the following blocks: a demultiplexing block 30b1 connected to the input, a sorting block 30b2, a gain removal block 30b3, a frequency filtering block 30b4, a resampling block 30b5, a trace selection block 30b6, an output 30b7 labelled "selected gathers (velocity analyses), amplitude correction 30b8, deconvolution 30b9, a second output 30b10 labelled "CMP sorted traces after deconvolution", a time corrections block 30b11, an AGC block 30b12, a stacking block 30b13, a third output 30b14 labelled "stacked traces (unfiltered)", a frequency filtering block 30b15, another AGC block 30b16, a fourth output 30b17 labelled "stacked traces (filtered)", a second input labelled "dip information" 30b18, a trace interpolation block 30b19, a migration block 30b20, a fifth output 30b21 labelled "migrated traces (unfiltered)", a frequency filtering block 30b22, an AGC block 30b23, a sixth output 30b24 labelled "migrated traces (filtered)", a time to depth correction block 30b25, and a seventh output 30b26 labelled "migrated traces (depth migrated)". In the flowchart of FIGS. 11 and 12, any of the outputs 30b7, 30b10, 30b14, 30b17, 30b21, 30b24, and 30b26 can be used as inputs to the main frame computer 30 or the interpretation workstation discussed below with reference to FIGS. 8 and 9 of the drawings.

(2) Summary of the Petragrid Method and Apparatus

Referring to FIGS. 8, 9, 10, 13a, 13b, 13c1 and 13c2, a summary of the Petragrid Method and Apparatus in accordance with the present invention, which is responsive to the well log output record 25 and the reduced seismic data output record 30d, produced by the well logging operations and the seismic operations of FIGS. 1 through 7, is illustrated. A Detailed Description of the Petragrid Method and Apparatus of the present invention is set forth below in the "Detailed Description of the Preferred Embodiment".

Figure 8:
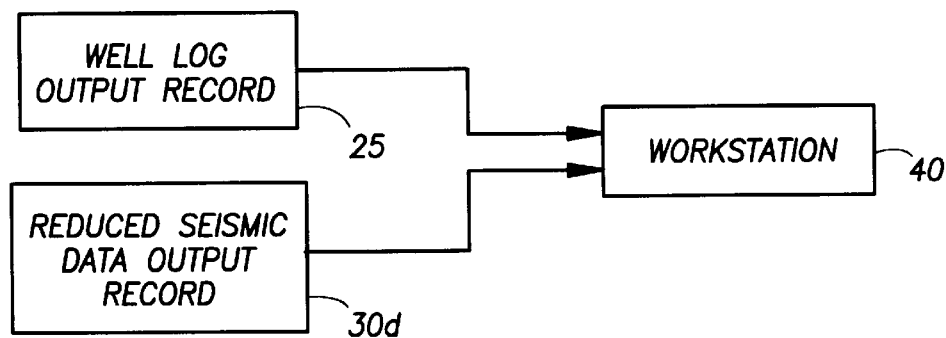
FIGS. 8 and 9 illustrate an interpretation computer workstation which receives the well log output record and the reduced seismic data output record of FIGS. 3 and 7 for executing an interpretation program stored in its memory, including the Petragrid software program of the present invention and the second simultation program, for ulimately generating improved quality data and information from the Petragrid software program for use by the second simulation program while simulating the earth formation near the wellbores of FIG. 1.

In FIG. 8, the well log output record 25 of FIG. 3 and the reduced seismic data output record 30d of FIG. 7 are both input to an interpretation workstation 40. This workstation 40 stores the Petragrid software of the present invention which, when executed, generates more accurate horizon grid cell property information which is adapted for use by a simulation program, the simulation program, when executed, modelling and simulating the well fluid producing properties of the earth formation 15 adjacent the one or more wellbores 17 of FIG. 1.

Figure 9:
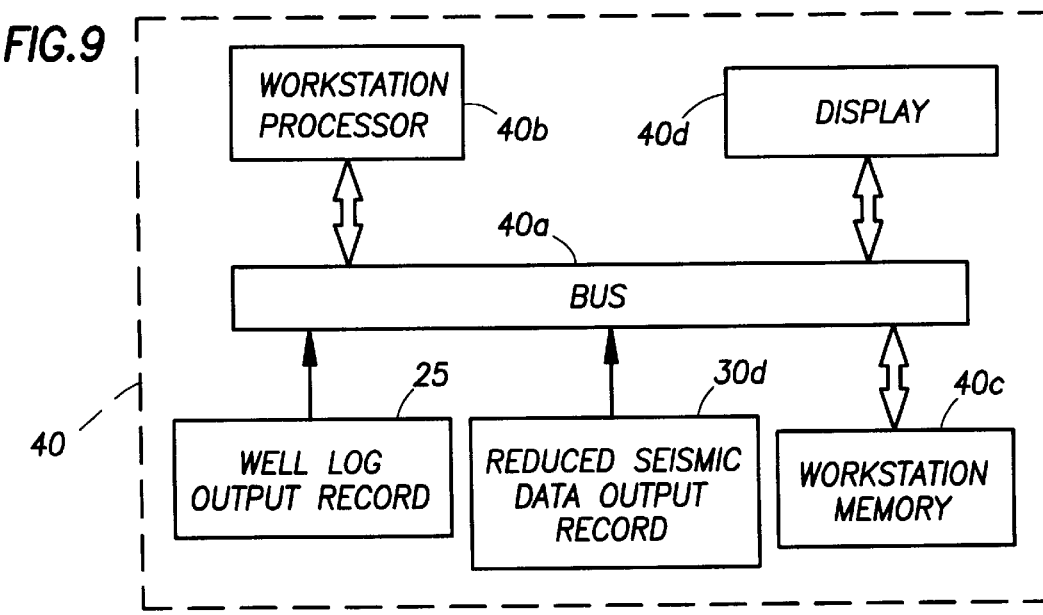

In FIG. 9, the interpretation workstation 40 of FIG. 8 is illustrated in greater detail. The workstation 40 includes a bus 40a, a workstation processor 40b connected to the bus 40a, a workstation memory 40c connected to the bus 40a, and a display 40d connected to the bus 40a. The well log output record 25 and the reduced seismic data output record 30d are both connected to the bus 40a of the workstation 40; as a result, the well log data and the reduced seismic data stored in the well log output record 25 and the reduced seismic data ouptut record, respectively, will be input to the workstation 40 and made available to the workstation processor 40b. The contents of the workstation memory 40c is illustrated in FIG. 10.

In FIG. 10, the workstation memory 40c of FIG. 9 stores at least two blocks of software:

(1) a first block of software hereinafter called the "Petragrid software" 40c1 in accordance with the present invention which generates more accurate horizon grid cell property information needed by the Eclipse Simulator software 40c2 discussed below; the Petragrid software 40c1 is discussed in detail in the following paragraphs of the "Detailed Description of the Preferred Embodiment"; and (2) a second block of software hereinafter called the "Eclipse Simulator software" 40c2 which receives the more accurate horizon grid cell property information which is generated by the Petragrid software 40c1; the Eclipse Simulator software 40c2 is discussed in a manual entitled "ECLIPSE 100 User Manual", which is available from "GeoQuest, a division of Schlumberger Technology Corporation" located in Abingdon, the United Kingdom (U.K.). The "ECLIPSE 100 User Manual" is incorporated by reference into the specification of this application. The Eclipse Simulator software 40c2 will more accurately model and simulate the well fluid producing properties of the earth formation 15 that is located near the wellbores 17 of FIG. 1 as a result of the more accurate horizon grid cell property information which is received from the Petragrid software 40c1 of the present invention.

Referring to to FIGS. 13a and 13b, 13c1 and 13c2, the following paragraphs will provide a summary of the Petragrid software 40c1 of FIG. 10 of the present invention. See the "Detailed Description of the Preferred Embodiment" below for a more detailed discussion of the Petragrid software 40c1.

Figure 13A:
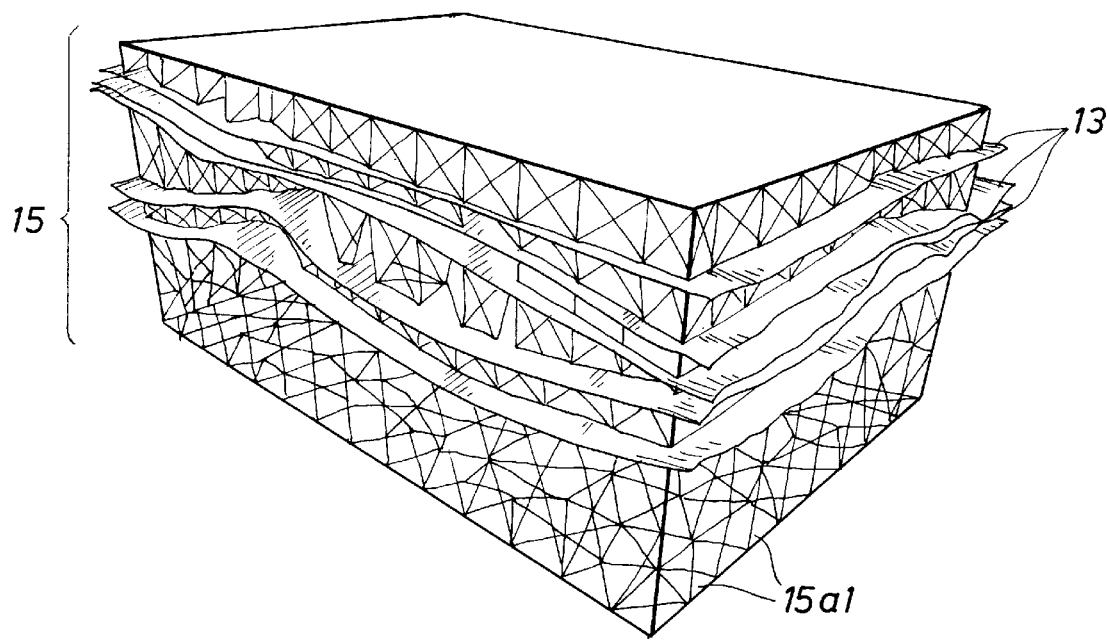
FIGS. 13$a$ and 13$b$ illustrate a plurality of earth formation horizons which have been divided up into a multitude of interconnected cells forming a grid by the Petragrid software program of FIG. 10.

In FIG. 13a, the earth formation 15 of FIG. 1 is again illustrated, the formation 15 including four (4) horizons 13 which traverse the longitudinal extent of the formation 15 in FIG. 13a. Recall that a "horizon" 13 is defined to be the top surface of an earth formation layer, the earth formation layer comprising, for example, sand or shale or limestone, etc.

However, in accordance with one aspect of the present invention, the Petragrid software 40c1 will "grid" the formation 15 which is located intermediate the horizon layers 13. That is, in between the horizons 13 and on top of the uppermost horizon 13 and below the lowermost horizon 13, the Petragrid software 40c1 will "grid" the formation 15. When gridding the formation 15, the formation 15 will be divided up into a multitude of individual cells which, when connected together, comprise the grid.

Figure 13B:
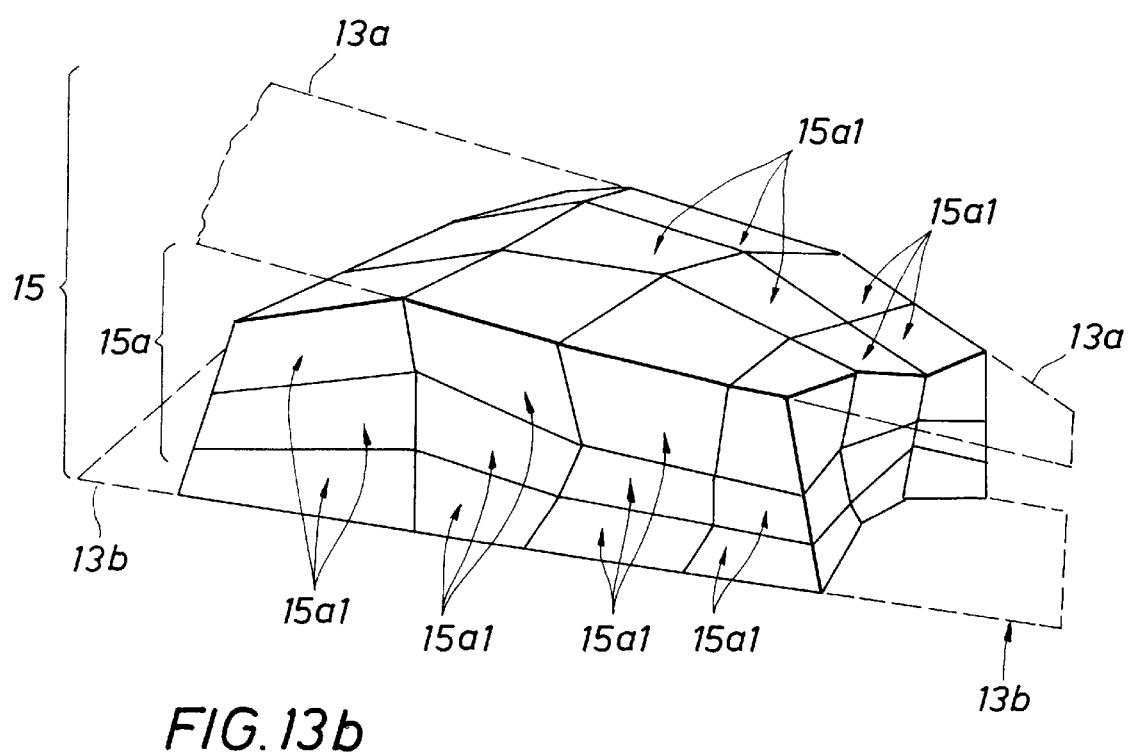

In FIG. 13b, for example, the formation 15 includes an uppermost horizon 13a and a lowermost horizon 13b which is separated from the uppermost horizon 13a by an intermediate earth formation layer 15a. The intermediate earth formation layer 15a includes, for example, a sand layer or a shale layer or a limestone layer, etc. The Petragrid software 40c1 will "grid" the earth formation layer 15a. That is, the formation layer 15a will be divided up, by the Petragrid software 40c1, into a multitude of cells 15a1.

In the prior art, a software product known as "Grid" was marketed by GeoQuest, a division of Schlumberger Technology Corporation, Abingdon, the United Kingdom (UK). The "Grid" software would divide the formation layers 15a into a multitude of cells. However, each of the multitude of cells were approximately "rectangular" in cross sectional shape.

In FIG. 13b, the cells 15a1 are shown to be approximately "rectangular" in cross sectional shape.

In FIG. 13a, however, in accordance with one aspect of the present invention, the Petragrid software 40c1 will also create the multitude of cells 15a1 in the earth formation 15 intermediate the horizons 13; however, each cell 15a1 can have a cross sectional shape that, in addition to approximately "rectangular" in cross section, is either approximately "polygonal" or "tetrahedral" in cross section. FIG. 13a clearly shows a multitude of cells 15a1 where each cell 15a1 has a cross sectional shape which is either approximately "polygonal" or "tetrahedral" in addition to "rectangular".

In FIG. 13c1, having described, with reference to FIGS. 13a and 13b, one function of the Petragrid software 40c1 (i.e.—"gridding" the formation with a multitude of cells) and having described a first potentially novel function of the Petragrid software 40c1 (i.e.—creating individual cells of the grid which are either approximately "polygonal" or "tetrahedral" in cross sectional shape in addition to approximately "rectangular" in cross sectional shape), FIG. 13c1 illustrates "additional potentially novel features" of the Petragrid software 40c1 of FIG. 10 of the present invention. The Petragrid software 40c1 of FIG. 13c1 and 13c2 should be read in conjunction with the "Detailed Description of the Preferred Embodiment" set forth below. In FIG. 13c1, the Petragrid software 40c1 receives the well log output record 25 of FIG. 3 and the reduced seismic data output record 30d of FIG. 7, and, responsive thereto, the Petragrid software 40c1 generates a set of "more accurate" output data 40c3, the "more accurate" output data 40c3 being input to the Eclipse simulator software 40c2. The Eclipse simulator software 40c2 will, in turn, generate a "more accurate" set of simulation results which will be displayed on the workstation display 40d of FIG. 9. As a result, the Eclipse simulator software 40c2 will "more accurately" model and simulate the earth formation 15 located near the wellbores 17 of FIG. 1 for the purpose of determining the well fluid producing properties of the earth formation 15.

In FIG. 13c1, the Petragrid software 40c1 includes the following novel blocks of code (blocks 40c1A, 40c1B, 40c1C, 40c1D, and 40c1E) which represent novel features relative to the prior art "Grid" software and other software of the prior art. A more complete flow diagram of the Petragrid software 40c1 will be discussed below with reference to FIG. 13c2:

1. Base Triangulation/Tetrahedralization—block 40c1A

Refer to the section of the "Detailed Description of the Preferred Embodiment" set forth below which is entitled "Triangulation and Tetrahedralization".

In FIG. 13c1, before beginning, a definition of the term "K-orthogonal" is provided. A grid is locally "K-orthogonal" if "Ka" is parallel to "r", where "K" is the local permeability tensor, "a" is the interface area vector between a pair of cells, and "r" is the vector from one cell center to the other. The generation of a base triangulation or a tetrahedralization, including the coordinates of the vertices and of the center for each element, is addressed here. In the prior art, K-orthogonal grids are generated by distributing points in 2D or 3D space based on the geometry of the physical model. The distributed points are then triangulated (in 2D space) or tetrahedralized (in 3D space). The center of each triangle is calculated by intersecting the K-orthogonal lines through the midpoints of the edges. The center of each tetrahedron is calculated by intersecting the K-orthogonal lines through the circumcenters of the faces. This approach has the disadvantage of a center being a long way from the centroid of an element when the permeability has a high level of anisotrophy, leading to overlapping simulation cells. In accordance with a further aspect of the present invention relating to "Base triangulation/Tetrahedralization" (block 40c1A), a "new algorithm" will generate an approximately "K-orthogonal" triangular base grid for two dimensional (2D) unstructured grids, and the new algorithm will also generate an approximately "K-orthogonal" tetrahedral base grid for three dimensional (3D) unstructured grids. However, in accordance with this further aspect of the present invention, that new algorithm, which generates the approximately "K-orthogonal" triangular base grid for two dimensional "2D" unstructured grids and the approximately "K-orthogonal" tetrahedral base grid for three dimensional "3D" unstructured grids, will do so by "scaling" the physical geometry. For a detailed description of the aforementioned concept of "scaling", see the section of the "Detailed Description of the Preferred Embodiment", set forth below, which is entitled "K-orthogonal Grid Generation by Scaling". More particularly, the aforementioned "new algorithm" associated with "Base Triangulation Tetrahedralization" (block 40c1A of FIG. 13c1), which: (1) generates the aforementioned approximately "K-orthogonal" triangular base grid for two dimensional (2D) unstructured grids by "scaling" the physical geometry, and (2) generates the approximately "K-orthogonal" tetrahedral base grid for three dimensional (3D) unstructured grids by "scaling" the physical geometry, will generate the aforementioned two types of grids by performing the following functional steps: (1) the physical geometry is mapped into a computational space by using a transformation based on the components of the permeability tensor in each layer of the model; (2) points are distributed in the computational space based on the mapped geometry; (3) a Delaunay triangulation or a tetrahedralization of the points is created, where: (3a) the center of each element (i.e., each "cell") of the triangulation is the center of a circle which is drawn through the vertices of each cell, and (3b) the center of each cell of the tetrahedralization is the center (or circumcenter) of a sphere which is drawn through the vertices of each element or cell; and (4) the vertices of the elements or cells and the centers of the cells are then transformed back into physical space. This approach produces a better quality grid.

2. Triangle/Tetrahedra Aggregation—block 40c1B

Refer to the section of the "Detailed Description of the Preferred Embodiment" set forth below which is entitled "Cell Generation and Triangle Aggregation".

In FIG. 13c1, in accordance with a further aspect of the present invention, prior to generating a simulation grid, such as the grids of FIGS. 13a and 13b, the elements or cells of a base triangulation (triangular grid in 2D space) or a tetrahedralization (tetrahedral grid in 3D space) can be aggregated into sets in order to reduce the number of cells in a composite triangular/tetrahedral grid and to reduce the number of faces in a PEBI grid, with minimal loss of accuracy of subsequent simulation results. In accordance with the further aspect of the present invention, a new algorithm associated with "Triangle—Tetrahedra Aggregation" (block 40c1B of FIG. 13c1) will "aggregate into sets" a pair of "triangle" shaped cells or a pair of "tetrahedra" shaped cells of a grid (such as cells 15a1 of FIG. 13a) when the distance between the circumcenters of the pair of cells is regarded as small as compared to the size of the pair of cells. This operation is performed iteratively so that a plurality of aggregated sets are created, each set of the plurality of aggregated sets including one or more cells. If a set of triangularly shaped cells of a grid, or a set of tetrahedra shaped cells of a grid, are clustered together, the new algorithm associated with "Triangle—Tetrahedra Aggregation" (block 40c1B of FIG. 13c1) will group that set of cells together. That grouping of triangular or tetrahedra shaped cells into groups would reduce the number of cells in the grid without reducing the accuracy of the simulation being performed by the Eclipse Simulator software 40c2 of FIG. 10

3. Cell Generation—block 40c1C

Refer to the section of the "Detailed Description of the Preferred Embodiment" set forth below which is entitled "Cell Generation and Triangle Aggregation".

In FIG. 13c1, the definition of the word "circumcenter" is provided. The "circumcenter" of each cell of a tetrahedralization (i.e., of a tetrahedral cell in a 3D grid) is the center of a sphere which is drawn through the vertices of each tetrahedrally shaped cell. The "circumcenter" of each cell of a triangulation (i.e., of a triangular cell of a 2D grid) is the center of a circle which is drawn through the vertices of each triangular shaped cell. In accordance with a further aspect of the present invention, a triangle shaped cell or a tetrahedron shaped cell or a triangle composite shaped cell or a tetrahedra composite shaped cell or a collection of any one or more of the aforesaid cells are each a K-orthogonal simulation cell provided that the "circumcenter" is used as the simulation cell center. A triangle shaped cell or a tetrahedron shaped cell or a collection of them can each be used as simulation cells of a grid provided that you use the "circumcenters" as the simulation cell centers. When a "collection" of triangle shaped cells or tetrahedron shaped cells of a grid are used as simulation cells, the "combined" circumcenters of that "collection" is used as the simulation cell center.

4. Cell Property Calculation—block 40c1D

Refer to the section of the "Detailed Description of the Preferred Embodiment" set forth below which is entitled "Cell Property Calculation".

In FIG. 13c1, in accordance with a further aspect of the present invention, a new algorithm for calculating the "Transmissibility" between a pair of approximately K-orthogonal cells of a grid, such as between the adjacent cells 15a1 of the grid shown in FIG. 13a, is given by formula (17) reproduced below.

Transmissibility—The transmissibility between a pair of cells i and j, for 2D TET, 2D PEBI, 3D TET and 3D PEBI cells is given by the following formula:

$$T_{ij} = \frac{C_D}{1/t_i + 1/t_j} \text{ where} \tag{17}$$

$$t_i = \frac{a^T K_i r_i}{\|r_i\|^2} \tag{18}$$

$$K_i = \begin{pmatrix} NTG & 0 & 0 \\ 0 & NTG & 0 \\ 0 & 0 & 1 \end{pmatrix} K_{i(raw)} \tag{19}$$

and where:
a=area vector of the interface
$K_i$=permeability tensor of cell i adjusted by net to gross
$r_i$=vector from centre of cell i to the interface along the line of centres
$C_D$=Darcy constant
NTG=net to gross thickness ratio The transmissibility between a pair of radial cells is calculated using radial flow theory between pressure average centres. The transmissibility between a radial cell and a linear cell is also calculated using radial flow between the respective cell centres.

5. Cell Numbering—block 40c1E

Refer to the section of the "Detailed Description of the Preferred Embodiment" set forth below which is entitled "Cell Renumbering".

In FIG. 13c1, the linear algebra solver in the Eclipse Simulator software 40c2 functions by using "structured" grids, not un-structured grids. Yet, the grid of FIG. 13a used by the Petragrid software 40c1 of the present invention is an un-structured grid. As a result, a method is needed to map the un-structured grid into a structured grid for use by the Eclipse simulator software 40c2. Therefore, in accordance with a further aspect of the present invention, a new algorithm associated with the "Cell Numbering" block of code 40c1E will "re-number" each cell of the un-structured grid and map said each cell of the re-numbered un-structured grid into a structured grid which can be used by the Eclipse simulator software 40c2. As a result, the new algorithm, in accordance with the further aspect of the present invention, called the "Cell Renumbering" block of code 40c1E in FIG. 13c1, will "re-number" each cell of the un-structured grid by assigning an (I, J, K) index to said "each cell" of the un-structured grid. Another block of code called a "Data Exporter", discussed below, will map said "each cell" of the un-structured grid into a corresponding cell of a structured grid, said corresponding cell of the structured grid being assigned an address which consists of the aforesaid (I, J, K) index of said "each cell. The method for computing the (I, J, K) indices is discussed in the section of the "Detailed Description of the Preferred Embodiment" which is entitled "Cell Renumbering"; see the subsections entitled "Sweep in Y" and "Sweep in X". In the prior art, the corresponding method included placing a rectangular grid of equal cell size over the whole geometry and numbering cells in the unstructured grid by traversing the rectangular grid in logical cell order. However, in accordance with the further aspect of the present invention, a domain based line sweep method is disclosed for mapping an un-structured grid into a structured grid for use with a conventional reservoir simulator 40c2. The sweep step length is determined dynamically from the centers of neighboring cells. Recalling that an un-structured grid consists of a set of domains, some of which are structured and some of which are un-structured, the new algorithm, associated with "Cell Renumbering" (block 40c1E in FIG. 13c1) of the present invention, will number the structured domains in logical order. The un-structured domains are numbered as a single entity by sweeping a line through the grid in the X and Y directions. The location of the center of each cell is used during the line sweep to assign I, J indices of cells. K indices are assigned using the logical cell number, but where a logical numbering is unavailable, a line sweep in Z may be used. All domains are then slotted into a global structured grid.

In FIG. 13c2, a more complete flowchart of the Petragrid software 40c1 of FIGS. 10 and 13c1 is illustrated. The novel features of the Petragrid software 40c1 of FIG. 13c1 (blocks 40c1A through 40c1E) are included in the flowchart of FIG. 13c2. In FIG. 13c2, the Petragrid software 40c1 includes the following blocks of code: A block of code called an "internal model builder" 40c1F receives the well log output record 25 and the reduced seismic data output record 30d and, responsive thereto, the internal model builder 40c1F generates an "internal model 40c1G data structure". The internal model builder 40c1F will create a "boundary" into which the "points" in the "points" data structure 40c1J (generated by the "Points Distributor" 40c1I) will be distributed. The reduced seismic data output record 30d defines where the horizons 13 of FIG. 1 and the faults are located inside the "boundary", and the well log output record 25 defines where the wellbores 17 of FIG. 1 are located inside the "boundary". However, the operator, at workstation 40 of FIG. 9, will define the "boundary" itself by defining a line in aerial space. The "the internal model c1G data structure" comprises that "boundary". A block of code called a "Point Distributor according to features and controls" 40c1I will receive the internal model 40c1G data file and will distribute a plurality of "points" inside the "boundary" (e.g., a 3D volume of space for tetrahedrally shaped cells); when the plurality of "points" are distributed inside the "boundary", a "points" data structure 40c1J is generated. However, a block of code called a "Control Parameter Editor" 40c1H will: (1) control the distance between adjacent "points" distributed inside the "boundary" thereby defining a fine grid or a coarse grid, (2) define the number of such "points" in the x-direction and the number of such "points" in the y-direction, and (3) define the number of radial divisions or "rings" around the wellbore. A block of code called an "Automatic Triangulator Tetrahedralizer" 40c1A (see block 40c1A of FIG. 13c1) will receive the "Points" data structure 40c1J which contains a multitude of "points" inside the "boundary" and it will connect together all of the "points" in the "points" data structure 40c1J in such a way as to create a "plurality of triangles" (for 2D space) and a "plurality of tetrahedra" (for 3D space) thereby generating a "triangles tetrahedra" 40c1K data structure. A block of code called a "triangle/tetrahedra aggregator" 40c1B (see block 40c1B of FIG. 13c1) will: (1) receive the "plurality of triangles" and/or the "plurality of tetrahedra" in the "triangles tetrahedra" 40c1K data structure, and (2) produce a list, called an "Aggregation Map" data structure 40c1L, which states which set of triangles of the "plurality of triangles" and which set of tetrahedra of the "plurality of tetrahedra" should be grouped together to form a polygonal shape. A block of code called a "Cell Generator" 40c1C (see block 40c1C of FIG. 13c1) will receive the "Aggregation Map" data structure 40c1L and the "Internal Model" data structure 40c1G, and, responsive thereto, the Cell Generator 40c1C will do the aforementioned grouping; that is, the Cell Generator 40c1C will group together "a first set of triangles" of the "plurality of triangles" and "a first set of tetrahedra" of the "plurality of tetrahedra" in accordance with the list of triangles and tetrahedra set forth in the Aggregation Map data structure 40c1L, the "first set of triangles" and the "first set of tetrahedra" being grouped together inside the "boundary" that is defined by the Internal Model data structure 40c1G thereby defining an "Un-Structured Grid" data structure 40c1M (see the grid of FIG. 13a). A block of code called a "Cell Numberer" 40c1E (see block 40c1E of FIG. 13c1) will assign an (I, J, K) index to each "cell" in the Un-Structured Grid data structure 40c1M in response to the Internal Model 40c1G data structure. A Block of code called a "Data Exporter" 40c1Q will receive both the aforesaid (I, J, K) index for each "cell" of the Un-Structured grid and the Un-Structured Grid data structure 40c1M, and, responsive thereto, the Data Exporter 40c1Q will map each cell of the Un-Structured grid c1M data structure into a "structured" grid thereby producing a structured grid having a plurality of cells where each cell of the structured grid has an (I, J, K) index address. The structured grid is used by the Eclipse simulator software 40c2 (recall, the Eclipse simulator 40c2 can only operate on "structured" grids). A block of code called a "Cell Property Calculator" 40c1D (see block 40c1D of FIG. 13c1) will also respond to the Internal Model data file 40c1G by calculating the "Transmissibility" and the "Pore Volume" between "each pair" of K-orthogonal cells of the un-structured grid 40c1M. Recall that the "Transmissibility" is calculated by using the following formula:

$$T_{ij} = \frac{C_D}{1/t_i + 1/t_j} \qquad (17)$$

Figure 13D:
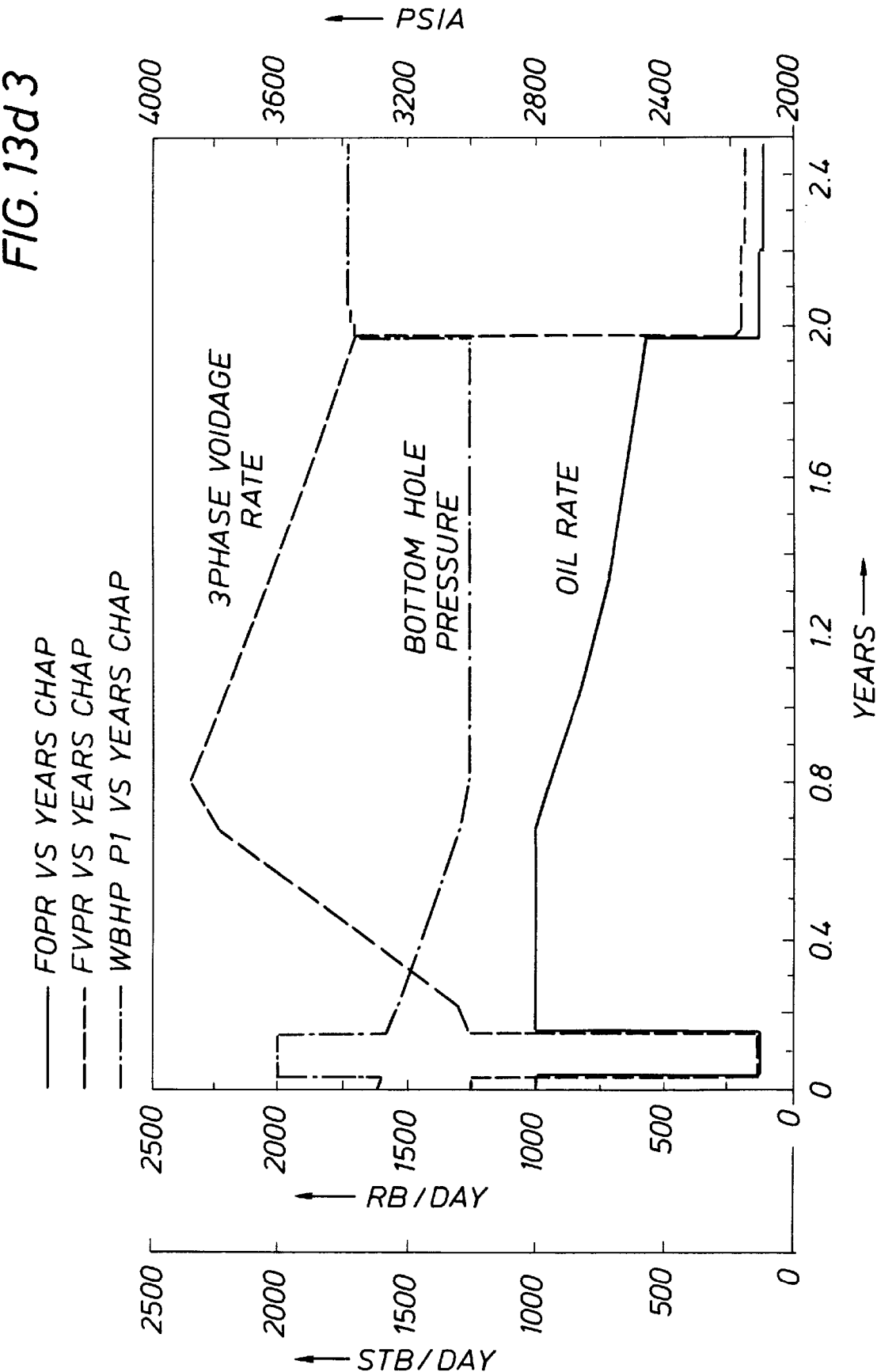

Since there are a multitude of pairs of K-orthogonal cells in the Un-Structured grid 40c1M data structure, a corresponding multitude of "transmissibilities (T)" will be calculated by the Cell Property Calculator 40c1D". A "3D Viewer" 40c1N is the workstation display monitor 40d of FIG. 9 which will display the "Un-structured" grid data structure 40c1M. A block of code called a "Well Connection Calculator" 40c1P will respond to the Un-Structured grid c1M data structure and the Internal Model 40c1G data structure by generating a "Well Connections" data structure 40c1R. Given that each of the wellbores 17 of FIG. 1 will intersect with a plurality of cells of the Un-Structured grid 40c1M, the Well Connection Calculator 40c1P will calculate the fluid flow (called a "flow coefficient") between each said cell of the Un-Structured grid 40c1M which intersects with a wellbore 17. The Well Connections data structure 40c1R therefore includes, for each wellbore 17 of FIG. 1, a particular list of all cells of the Un-Structured grid 40c1M which are cut through and intersected by the wellbore 17 of FIG. 1, and a corresponding list of flow coefficients (called well connections factors) which are associated, respectively, with that particular list of cells. The Data Exporter 40c1Q will respond to the Un-Structured Grid 40c1M data structure and the Well Connections data file 40c1R by mapping each cell of the Un-Structured grid 40c1M data structure into a "structured" grid thereby producing an "Output Data" structure 40c3 which is comprised of the structured grid having a plurality of cells where each cell of the structured grid has a unique (I, J, K) index address. One very important piece of the "Output Data" structure 40c3 is the "Transmissibility" between each pair of K-orthogonal cells of the structured grid and the Pore Volume. This "Output Data" 40c3 is used by the Eclipse Simulator 40c2. Refer to FIG. 13d1 below for a better understanding of the use of the aforementioned "Output Data".

(3) Summary of the Eclipse Simulator software 40c2

In FIG. 13d1, a more detailed construction of the Eclipse Simulator software 40c2 of FIG. 13c2 is illustrated.

The Eclipse Simulator software 40c2 of FIG. 13d1 is used in connection with the "Preferred Embodiment" of this specification. It should be understood, however, that other simulators can be used in conjunction with the Petragrid software 40c1 of the present invention. The Eclipse Simulator software 40c2 is available for purchase from "GeoQuest, a division of Schlumberger Technology Corporation", Houston, Tex. or Abingdon, the United Kingdom.

In FIG. 13d1, the Output Data 40c3 (including the Transmissibility discussed above) is input to the "Simulator" c2A portion of the Eclipse simulator software 40c2. That Simulator 40c2A portion also receives the output of other programs, such as the PVT Program 40c2B, the VFP Program 40c2C, the Schedule Program 40c2D, and other programs 40c2E, all of which are available from "GeoQuest, a division of Schlumberger Technology Corporation" of Houston, Tex. In response to the Output Data 40c3, the Simulator 40c2A will generate simulation results 40c2F for each cell of the structured grid, such as for each cell 15a1 of the grid of FIG. 13b. Examples of the "simulation results" 40c2F include a "pressure" and a "saturation" in each cell of the structured grid. Those simulation results 40c2F are used by separate programs, such as the GRAF program 50, the RTView program 52, and other programs 54. However, more importantly, those simulation results 40c2F are transmitted back to the 3D Viewer 40c1N which represents the display monitor 40d of the workstation 40 of FIG. 9. Recall, from FIG. 13c2, that the un-structured grid 40c1M (which comprises a plurality of cells 15a1) is transmitted to and displayed on the 3D Viewer 40c1N. Therefore, the un-structured grid including all its cells 15a1 will be displayed on the 3D Viewer 40c1N (the display monitor 40d of workstation 40 of FIG. 9). In FIG. 13d1, the simulation results 40c2F, for each cell 15a1 of the grid, are also sent to the 3D Viewer 40c1N (display 40d). As a result, the simulation results 40c2F for "each cell" 15a1 are overlayed over and displayed in that particular "each cell" 15a1 of the grid on the 3D Viewer 40c1N (display monitor 40d) of the workstation 40. Depending upon the value of the pressure or the saturation of the simulation results 40c2F, a different color will be assigned to the simulation results 40c2F; and, when the simulation results 40c2F are overlayed over that particular said "each cell" 15a1 on the 3D Viewer 40c1N, the assigned color associated with the particular simulation results 40c2F (e.g., pressure or saturation) will be used to display the actual value of the simulation results 40c2F of said "each cell" 15a1 on the 3D Viewer 40c1N (display 40d).

In FIGS. 13d2 and 13d3, a typical "output", which is displayed on the 3D Viewer 40c1N of FIGS. 13c2 and 13d1 (i.e., on the "display" 40d of FIG. 9) by the Eclipse Simulator software 40c2, is illustrated. Other examples of such a typical "output" are illustrated in FIGS. 26 through 43 and FIG. 46 of the drawings of this specification. In FIG. 13d2 viewed together with FIG. 13d3, when the assigned color associated with the particular simulation results 40c2F is used to display the simulation results 40c2F of said "each cell" 15a1 on the 3D Viewer 40c1N (display 40d), an "output display", similar to the output display 56 shown in FIG. 13d2 (and 13d3), is displayed on the display monitor 40d (3D Viewer 40c1N) of the interpretation workstation 40 of FIG. 9.

A functional description of the operation of the Petragrid software 40c1 of the present invention, in conjunction with the Eclipse Simulator software 40c2, will be set forth in the following paragraphs with reference to FIGS. 1 through 13d2 of the drawings.

The welling logging operations of FIGS. 1 and 2 are conducted and a well log output record 25 is generated. In addition, the seismic operations of FIGS. 4 and 5 are conducted in the earth formation 15 near the wellbores 17 of FIG. 1 and the seismic output record 20a4 of FIG. 6 is generated. The seismic output record 20a4 of FIG. 6 undergoes data reduction in the mainframe computer 30 of FIG. 7 (using the software shown in FIGS. 11 and 12) and a reduced seismic data output record 30d of FIG. 7 is generated. The well log output record 25 and the reduced seismic data output record 30d are input to an interpretation workstation 40 in FIGS. 8 and 9. A storage disc known as a "CD-Rom" would, for example, separately store the Petragrid software 40c1 and/or the Eclipse simulator software 40c2 thereon. In FIG. 9, that CD-Rom would be inserted, by an operator, into the workstation 40 of FIG. 9, and, as a result, the Petragrid software 40c1 and/or the Eclipse simulator software 40c2 would be loaded into the memory 40c of the workstation 40 of FIG. 9. FIG. 10 illustrates the Petragrid software 40c1 and the Eclipse simulator software 40c2 stored in the memory 40c of the workstation 40. In response to an action by the operator at the workstation 40, the workstation processor 40b of FIG. 9 will begin to execute the Petragrid software 40c1 and the Eclipse simulator software 40c2 of FIG. 10, the workstation processor 40b using the well log output record 25 and the reduced seismic data output record 30d which have already been loaded into the workstation 40.

When that execution of the Petragrid software 40c1 and the Eclipse simulator software 40c2 is complete, the earth formation 15 of FIG. 1, including the horizons 13 embedded in the formation 15, will be divided up into a multitude of interconnected and tetrahedrally shaped volumes or "cells" 15a1 which are shown in FIG. 13a, and the "more accurate information" associated with "each cell" 15a1, relating to the "cell properties" of said "each cell" 15a1 (including in particular its "Transmissibility"), will be generated. The "more accurate information" generated by the Petragrid software 40c1 is used by the Eclipse simulator software 40c2 for generating the "more accurate simulation results" 40c2F of FIG. 13d1.

FIG. 13b illustrates an exploded view of one horizon layer of FIG. 13a, illustrating in great detail the multitude of tetrahedrally shaped cells 15a1. Although the cells 15a1 of FIG. 13b are approximately "rectangularly" shaped in cross section, when the execution of the Petragrid software 40c1 is completed, the cells 15a1 will, in accordance with one aspect of the present invention, be approximately triangularly shaped in 2D space or be approximately tetrahedrally shaped, in 3D space, as shown in FIG. 13a.

When the workstation processor 40b of FIG. 9 begins to execute the Petragrid software 40c1 and the Eclipse simulator software 40c2 of FIG. 10, the internal model builder 40c1F of FIG. 13c2 will build an internal model data structure 40c1G which comprises a "boundary" into which a multitude of "points" will be distributed. The Point Distributor 40c1I will distribute the multitude of "points" into the "boundary" defined by the internal model data structure 40c1G, the distance between adjacent ones of the "points" as well as the number of the "points" in the x-direction and the number of the "points" in the y-direction being controlled by the control parameter editor 40c1H. The point distributor 40c1I will generate a "points" data structure 40c1J which is comprised of the multitude of points distributed in the "boundary". The Automatic triangulator/tetrahedralizer 40c1A will respond to the multitude of points in the points data structure 40c1J by interconnecting those points together to form a multitude of triangularly shaped cells (for 2D space) or a multitude of tetrahedrally shaped cells (for 3D space) thereby generating the triangles/tetrahedra data structure 40c1K. More particularly, the Automatic triangulator/tetrahedralizer 40c1A of FIG. 13c2 will: (1) generate the aforementioned approximately "K-orthogonal" triangular base grid for two dimensional (2D) unstructured grids by "scaling" the physical geometry, and (2) generate the approximately "K-orthogonal" tetrahedral base grid for three dimensional (3D) unstructured grids by "scaling" the physical geometry, and it will generate the aforementioned two types of grids by performing the following functional steps: (1) the physical geometry is mapped into a computational space by using a transformation based on the components of the permeability tensor in each layer of the model, (2) points are distributed in the computational space based on the mapped geometry; (3) a Delaunay triangulation or a tetrahedralization of the points is created, where: (3a) the center of each element (i.e., each "cell") of the triangulation is the center of a circle which is drawn through the vertices of each cell, and (3b) the center of each cell of the tetrahedralization is the center (or circumcenter) of a sphere which is drawn through the vertices of each element or cell, and (4) the vertices of the elements or cells and the centers of the cells are then transformed back into physical space. When these functional steps are completed, the triangle/tetrahedra data structure 40c1K is created. The triangle/tetrahedra aggregator 40c1B of FIG. 13c2 will receive the "plurality of triangles" and/or the "plurality of tetrahedra" in the "triangles tetrahedra" 40c1K data structure 40c1K, and produce a list, called an "Aggregation Map" data structure 40c1L, which states which set of triangles of the "plurality of triangles" and which set of tetrahedra of the "plurality of tetrahedra" should be grouped together to form a polygonal shape. The Cell Generator 40c1C of FIG. 13c2 will receive the "Aggregation Map" data structure 40c1L and the "Internal Model" data structure 40c1G, and, responsive thereto, the Cell Generator 40c1C will group together "a first set of triangles" of the "plurality of triangles" and "a first set of tetrahedra" of the "plurality of tetrahedra" in accordance with the list of triangles and tetrahedra set forth in the Aggregation Map data structure 40c1L, the "first set of triangles" and the "first set of tetrahedra" being grouped together inside the "boundary" that is defined by the Internal Model data structure 40c1G thereby defining an "Un-Structured Grid" data structure 40c1M. The Cell Numberer 40c1E will assign an (I, J, K) index to each "cell" in the Un-Structured Grid data structure 40c1M in response to the Internal Model 40c1G data structure. The Data Exporter 40c1Q will receive both the aforesaid (I, J, K) index for each "cell" of the Un-Structured grid and the Un-Structured Grid data structure 40c1M, and, responsive thereto, the Data Exporter 40c1Q will map each cell of the Un-Structured grid c1M data structure into a "structured" grid thereby producing a structured grid having a plurality of cells where each cell of the structured grid has an (I, J, K) index address. The Cell Property Calculator 40c1D will also respond to the Internal Model data file 40c1G by calculating the "Transmissibility" and the "Pore Volume" between "each pair" of K-orthogonal cells of the un-structured grid 40c1M. Recall that "Transmissibility" is calculated by using the following formula:

$$T_{ij} = \frac{C_D}{1/t_i + 1/t_j} \qquad (17)$$

Since there are a multitude of pairs of K-orthogonal cells in the Un-Structured grid c1M data structure, a corresponding multitude of "transmissibilities (T)" will be calculated by the Cell Property Calculator 40c1D. The 3D Viewer 40c1N is the workstation display monitor 40d of FIG. 9 which will display the "Un-structured" grid data structure 40c1M. The Well Connection Calculator 40c1P will respond to the Un-Structured grid 40c1M data structure and the Internal Model 40c1G data structure by generating the Well Connections data structure 40c1R. Given that each of the wellbores 17 of FIG. 1 will intersect with a plurality of cells of the Un-Structured grid 40c1M, the Well Connection Calculator 40c1P will calculate the fluid flow (called a "flow coefficient") between each said cell of the Un-Structured grid 40c1M which intersects with a wellbore 17. The Well Connections data structure 40c1R therefore includes, for each wellbore 17 of FIG. 1, a particular list of all cells of the Un-Structured grid 40c1M which are cut through and intersected by the wellbore 17 of FIG. 1, and a corresponding list of flow coefficients (called well connections factors) which are associated, respectively, with that particular list of cells. The Data Exporter 40c1Q will respond to the Un-Structured Grid 40c1M data structure and the Well Connections data file 40c1R by mapping each cell of the Un-Structured grid 40c1M data structure into a "structured" grid thereby producing an "Output Data" structure 40c3 which is comprised of the structured grid having a plurality of cells where each cell of the structured grid has a unique (I, J, K) index address. The "Output Data" structure 40c3 includes "Transmissibility" between each pair of K-orthogonal cells of the structured grid and the Pore Volume. The Output Data 40c3 is used by the Eclipse Simulator 40c2.

In FIG. 13d1, the Un-structured grid 40c1M is being displayed on the 3D Viewer 40c1N (display 40d of FIG. 9). The simulator 40c2A will receive the output data 40c3, and in particular, the Transmissibility and Pore Volume figures, and it will then generate a simulation result 40c2F (such as pressure or saturation) for "each cell" of the grid being displayed on the 3D Viewer 40c1N. The simulation results 40c2F for "each cell" are transmitted to the 3D Viewer 40c1N, and the simulation results 40c2F for said "each cell" are overlayed over said "each cell" on the 3D Viewer 40c1N. A different color is assigned to each different value of simulation result 40c2F, and that color is displayed inside said "each cell" on the 3D Viewer 40c1N. For example, for one value of pressure for a particular cell, a first color is assigned, and for a different value of pressure for another cell, a second color is assigned. The first color shows inside the particular cell, and the second color shows inside said another cell.

As a result, the 3D Viewer 40c1N (or display monitor 40d of FIG. 9) will present an output display for viewing by an operator. One example of such an output display from the Eclipse simulator 40c2 is illustrated in FIG. 13d2. Other examples of such an output display from the Eclipse simulator 40c2 is illustrated in FIGS. 26–43.

The resultant output data, which are visible and obtainable from any one of the output displays from the Eclipse simulator 40c2, such as the output displays of FIG. 13d2 and FIGS. 26–43, are "more accurate" than was previously the case in the prior art, mainly because the "Output Data" 40c3 of FIGS. 13c2 and 13d1, which is generated by the Petragrid software 40c1 of the present invention, is "more accurate".

DETAILED DESCRIPTION OF THE PREFERRED EMBODIMENT

Referring to FIGS. 14 through 46, the following "Detailed Description of the Preferred Embodiment" represents a detailed description of the "Petragrid software" 40c1, which will supplement the summary disclosure of the "Petragrid software" 40c1 that is set forth above in the "Description of the Preferred Embodiment". Any reading of the detailed description of the Petragrid software 40c1 set forth below should be read in conjunction with the summary description of the Petragrid software 40c1 set forth above.

Detailed Description of the Petragrid Software 40c1

Discretization Scheme

The discretization scheme presented here is a fully implicit control-volume formulation, using an integrated form of the transport equation for multi-phase flow in porous media. For each conserved quantity, for each cell;

$$m^n - m^{n-1} + \Delta t \sum_j f_j^n = Q^n \tag{1}$$

where the superscript n denotes the time level, m is the mass, $\Delta t$ is the time step, f is the flow through surface j and Q is the production or injection source term. Each flow term in Eq. 1 consists of several phases, due to dissolved gas and vaporised oil; and, for a phase, the flow through surface j is given by;

$$f_j = -\int_{s_j} (\lambda K \nabla u) \cdot n \, ds \tag{2}$$

where $\lambda$ is the phase mobility, K is the permeability and u is the phase pressure. The gravity term is left out of the derivation for convenience and is introduced once a difference scheme has been formed, as $\Delta h \rho g$ where $\rho$ is the arithmatic mean of the cell densities on either side of a face.

Consider a portion of an unstructured grid, which may be PEBI or triangular.

In FIG. 18, points v1,v2,v3 and v4 are cell vertices; c1,c2,c3 and c4 are cell centers and m12,m13 and m14 are intersection points of cell faces and lines joining centers. Assume that the phase mobility is constant on a face, the pressure $u_a$ in the region defined by points c1,m12,v1, and m14 is linear and is determined by values at c1,m12 and m14; and the pressure $u_b$ in the region defined by points c1,m13,v2 and m12 is also linear and is determined by values at c1,m12 and m13. The continuity in pressure between cells is forced only at the intersection points, such as at m12, m13 and m14. By performing the integral in Eq. 2 just inside cell 1, as the terms are piecewise constant, the flow out of cell 1 is given by;

$$f_j = -\lambda(a_{v1m12}^T K_1 \nabla u_a + a_{v2m12}^T K_1 \nabla u_b) \tag{3}$$

where $a_{v1m12}$ is the area vector of the interface v1m12, $K_1$ is the permeability tensor of cell 1. If a local coordinate system is defined, with one axis along c1, m12 and the other axes orthogonal to it, then a unit vector in the direction of c1, m12 is given by;

$$\hat{r} = \frac{r_{c1m12}}{\|r_{c1m12}\|} \tag{4}$$

For symmetric K, if a grid is truly K-orthogonal, $a^T K$ will be in the direction of $r^T$. Hence, we resolve the $a^T K$ terms in Eq. (3) into the local coordinate directions and use only the component in the direction given in Eq. (4) for the flow calculations. For truly K-orthogonal grids, the components of $a^T K$ in the other directions will be zero. The neglected cross term is reported as a measure of the deviation of the grid from K-orthogonality.

$$f_j = -\lambda \left( \frac{a_{v1m12}^T K_1 r_{c1m12}}{\|r_{c1m12}\|} \frac{r_{c1m12}^T}{\|r_{c1m12}\|} \nabla u_a + \frac{a_{v1m12}^T K_1 r_{c1m12}}{\|r_{c1m12}\|} \frac{r_{c1m12}^T}{\|r_{c1m12}\|} \nabla u_b + T_c \right) \tag{5}$$

As the pressure is assumed to be linear within each portion;

$$f_j = -\lambda \left( \frac{a_{v1m12}^T K_1 r_{c1m12}}{\|r_{c1m12}\|^2} (u_{m12} - u_1) + \frac{a_{v1m12}^T K_1 r_{c1m12}}{\|r_{c1m12}\|^2} (u_{m12} - u_1) + T_c \right) \tag{6}$$

or, $$f_j = -\lambda \left( \frac{a_{v1m12}^T K_1 r_{c1m12}}{\|r_{c1m12}\|^2} (u_{m12} - u_1) + T_c \right) \tag{7}$$

The transmissibility T, between cells 1 and 2, is obtained by following the above steps for cell 2, forcing a flow balance and eliminating $u_{m12}$ between them. By simplifying the subscripts we have, $$\frac{1}{T} = \frac{\|r_1\|^2}{a^T K_1 r_1} + \frac{\|r_2\|^2}{a^T K_2 r_2} \tag{8}$$

Eq. (8) reduces to the standard five point formula for Cartesian grids; to the standard PEBI formula for isotropic cases.

Note that, at cell interfaces, where there is a change in the principal directions of the permeability tensor or where there is a change in the anisotropy ratio at an interface not orthogonal to a principal direction, the calculation of pressure continuous points m12,m13 and m14 by intersecting a straight line between the cell centres and the face becomes approximate. A more accurate form should take the permeability tensors on either side into account and use a segmented line.

K-Orthogonal Grid Generation by Scaling

There are two known techniques for generating K-orthogonal grids. One is to distribute points in physical space, followed by a Delaunay triangulation in the same space and by the generation of K-orthogonal bisectors of triangle edges. This has the disadvantage of the K-orthogonal bisectors intersecting each other to form overlapping cells in cases of high anisotropy[22]. The second is to transform the physical domain into a computational domain in which orthogonality corresponds to K orthogonality in the physical domain.

In FIG. 19, points are distributed and triangulated in the computational space, which is followed by a transformation back to the physical space prior to cell property calculation. The latter has the disadvantage that the transformation may be approximate in certain regions such as at faults, but it does generate a physical grid. This work uses the latter method. Let there be a piecewise constant transformation T, which maps the physical space to the computational space. Then, $$p_c = T_p \quad (9)$$

where p is a vector in physical space. Let the grid be orthogonal in computational space. Then, a vector between two centres r is orthogonal to any vector v on the cell interface.

$$v_c^T r_c = 0 \quad (10)$$

We also have;

$$v_c = Tv, r_c = Tr \quad (11)$$

Using equation (11) in equation (10), we get;

$$v^T T^T Tr = 0 \quad (12)$$

The K-orthogonality condition in physical space is given by;

$$v^T K^{-1} r = 0 \quad (13)$$

Comparing equations (12) and (13), we have;

$$TT^T = K^{-1} \quad (14)$$

A similar transformation was used in Peaceman[20] for deriving a well connection factor for anisotropic media. The equivalence of the orthogonality property is retained for any scaling provided it is a scalar multiplier of T. In the current version of the software, the transformation is applied by scaling the z coordinate of the model using the local horizontal and vertical permeabilities. This is given by;

$$T = \begin{pmatrix} 1 & 0 & 0 \\ 0 & 1 & 0 \\ 0 & 0 & (k_x k_y)^{1/4} / (k_z)^{1/2} \end{pmatrix} \quad (15)$$

The computational model for a layered system is constructed by applying a pointwise z scaling on a layer basis, while traversing the model from top to base. In addition to the z scaling, a scaling in y, which is constant for the whole model, is also available.

A feature of gridding in computational space is that, irregular cells have aspect ratios near unity in isotropic space, which become elongated in physical space. This may be an advantage, as one could argue that grids which are equilateral in isotropic space may lead to more accurate results than those which are equilateral in the corresponding anisotropic physical space.

Further, convergence problems associated with MPFA schemes for highly anisotropic cases are reduced by using nearly K-orthogonal or stretched grids, as in Aavatsmark[2].

Composite Triangular and Tetrahedral Grids

The discretization scheme used above is applicable to any grid provided that it satisfies the K-orthogonality property. This section describes the use of triangles and tetrahedra and collections of them as simulation cells, by carefully constructing them to satisfy the K-orthogonality property. As described in the previous section, the point distribution and the triangulation is performed in an isotropic computational space. Each triangle in a triangulation has a circumcircle, which is a circle through its vertices. The centre of each circumcircle is used as the cell centre. Lines joining centres of neighbouring cells are perpendicular to the edges. Hence, these are orthogonal grids. If more than three points lie on a single circle, such as for a rectangle, all the external edges satisfies the orthogonality property. Hence, we aggregate triangles into polygons, if their circumcentres lie within a specified tolerance and reduce the number of simulation cells. This process does not affect the accuracy of simulation results, as two coinciding cell centres will tend to have an infinite transmissibility and for finite flows will have the same cell solution. See the limiting case of equation (8).

In FIG. 21, an example of an aggregation step is illustrated.

In three dimensions, a tetrahedron may form a simulation cell in an orthogonal grid, provided the cell centre is at its circumsphere's centre. Lines joining centres of neighbouring cells are orthogonal to the faces. Similar to the triangular case, any collection of tetrahedra with coinciding circumcentres may be aggregated without loss of accuracy in simulation results. For example, a tetrahedralization of points distributed in a rectangular lattice will produce sets of tetrahedra with coinciding centres, aggregating into brick cells.

In FIG. 20, C is the circumcentre of the tetrahedron 1234 and D is the circumcentre of the face 124 and the vector DC is orthogonal to any vector on the face. Aggregated cells thus formed in computational space are transformed back into physical space.

It can be seen that PEBI grids and aggregated triangular grids constructed from a Delaunay triangulation are duals of each other, i.e., the vertices of one system becomes the cell centres of the other. This is because a Delaunay triangulation guarantees that no vertices lie inside the circumcircles of any triangle. In 3D, the duality argument holds on tetrahedra.

Grid Types

This specification uses five types of cells: 2D PEBI, 2D TET, Radial, 3D PEBI and 3D TET. A domain consists of a set of cells of a single type and a grid consists of a set of domains. A complex grid is built in stages. An initial grid is generated which is of a single type, except for 2D PEBI and 2D TET which may contain Radial domains. In subsequent stages, domains of equal or higher dimension are added to the grid. For all types of grids given below, the point placement, triangulation (or tetrahedralization) and the cell generation is performed in a permeability scaled computational space and the resulting grid is transformed to the physical space. The cell types are briefly described below, and further information is provided in subsequent sections.

Figure 22:
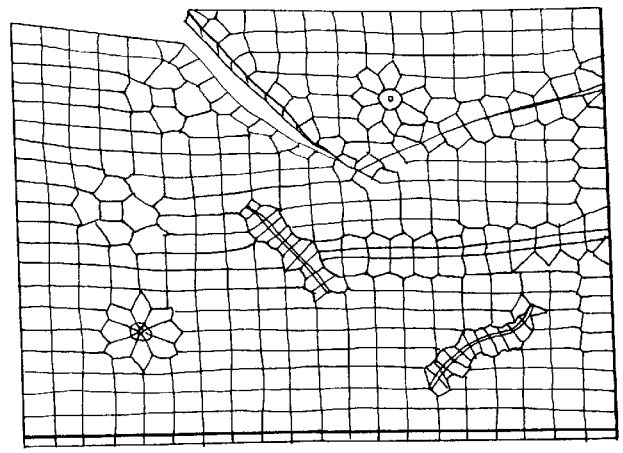
FIG. 22 illustrates a 2.5D PEBI grid with radial, rectangular, single cell well refinements and a rectangular background.
Figure 23:
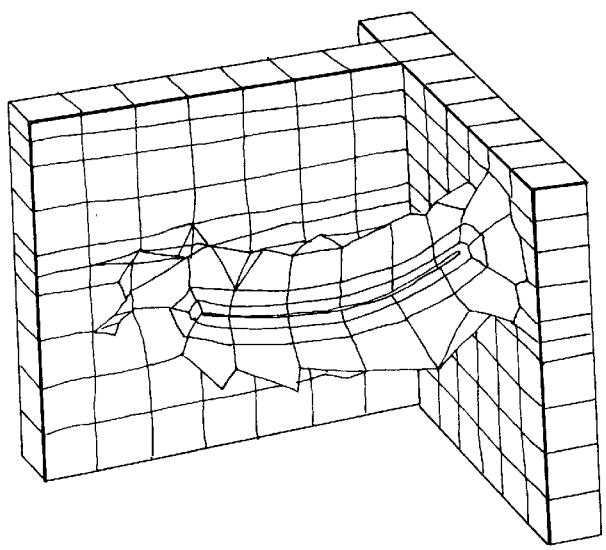
FIG. 23 illustrates part of a 3D PEBI grid with a well refinement and a multi-layered rectangular background.
Figure 24:
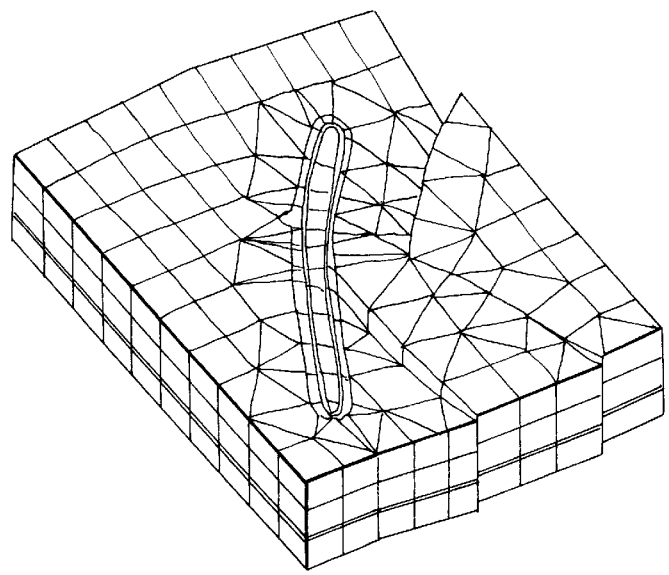
FIG. 24 illustrates a 2.5D Composite triangular grid with multi-layers, a rectangular well refinement.
Figure 25:
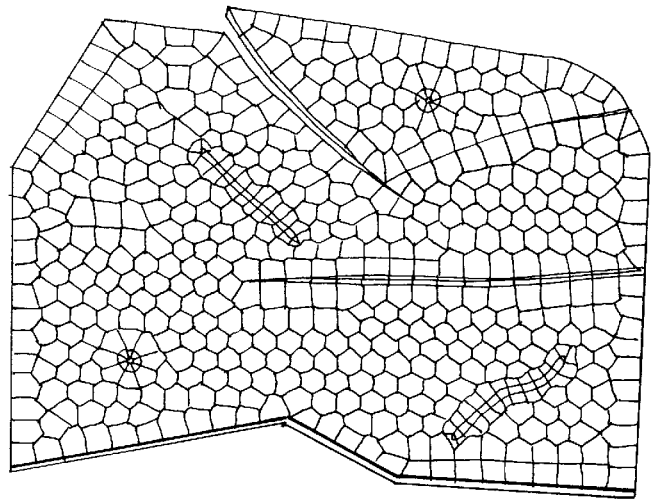
FIG. 25 illustrates a 2.5D PEBI grid with a hexagonal background, honouring a boundary polygon.
Figure 26:
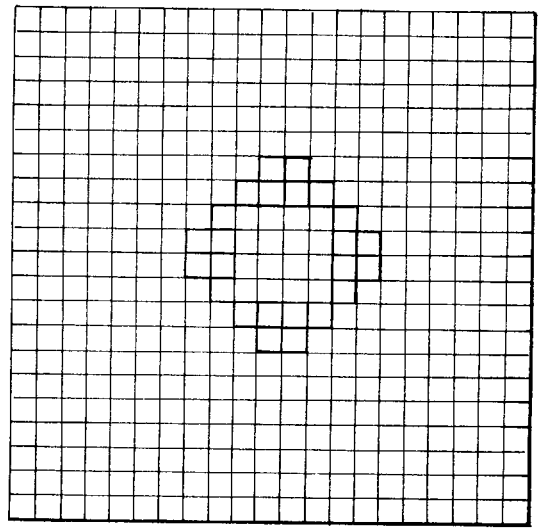
FIGS. 26 through 43 illustrate further example output displays, similar to the example output display of FIG. 13$d$2, each of which can be displayed, by the Eclipse simulator software, on the interpretation workstation display monitor (i.e., the 3D viewer of FIGS. 13$c$2 and 13$d$1), FIGS. 26 through 43 illustrating the following.
Figure 27:
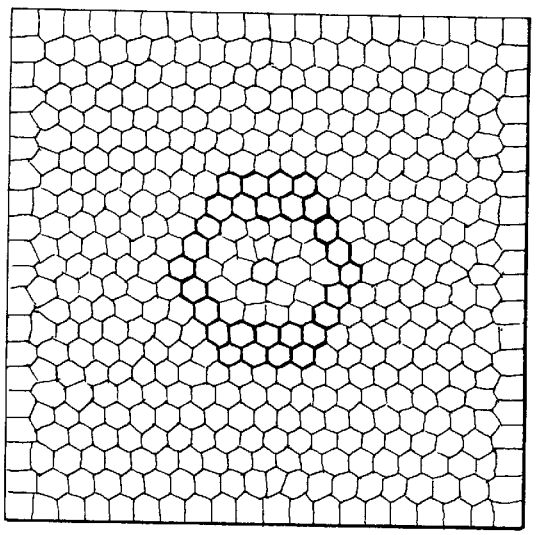
Figure 28:
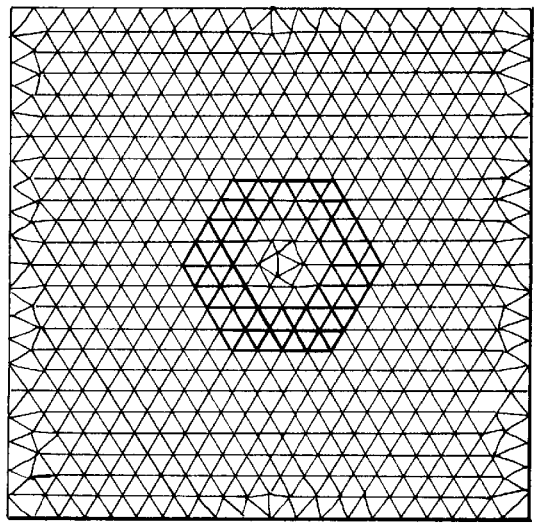
Figure 29:
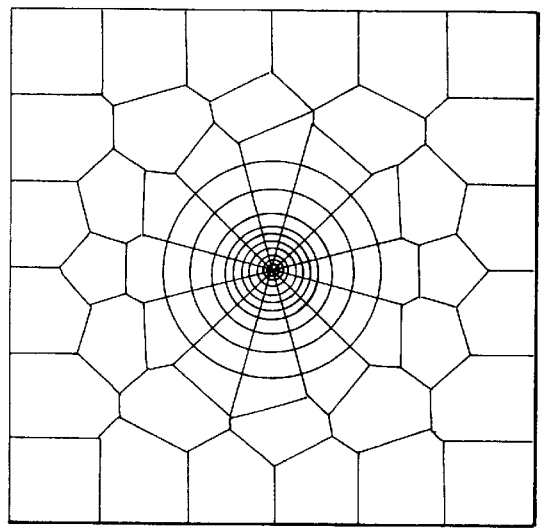
Figure 30:
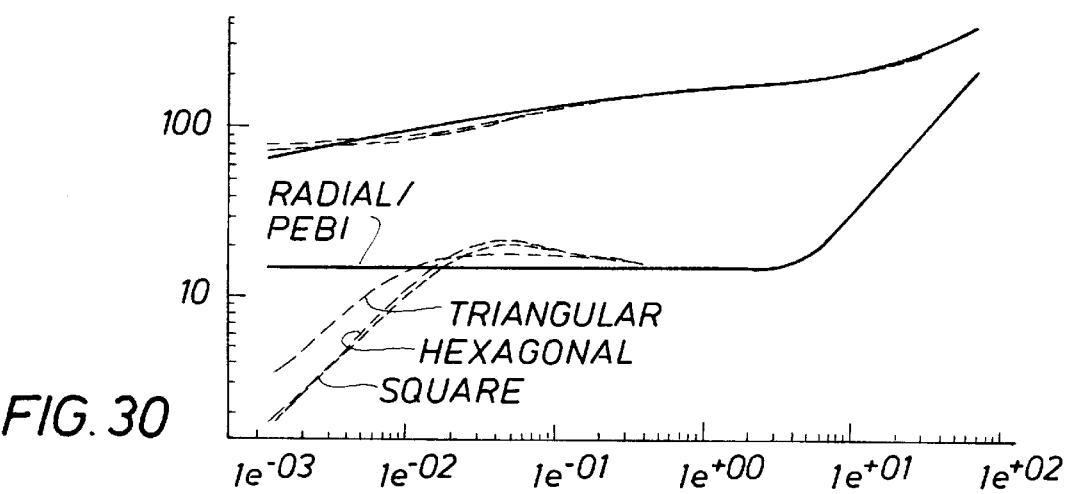
Figure 31:
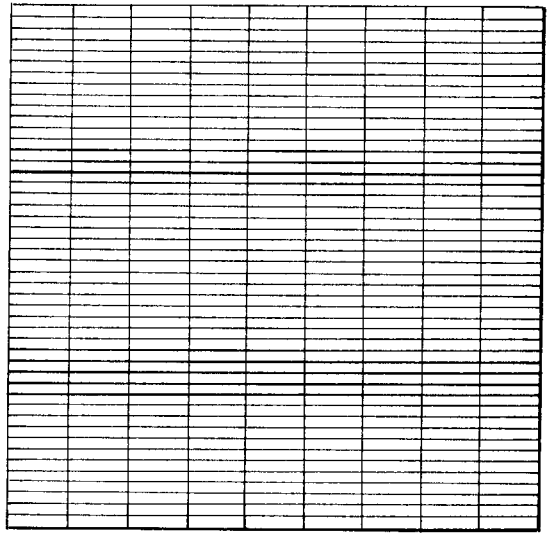
Figure 32:
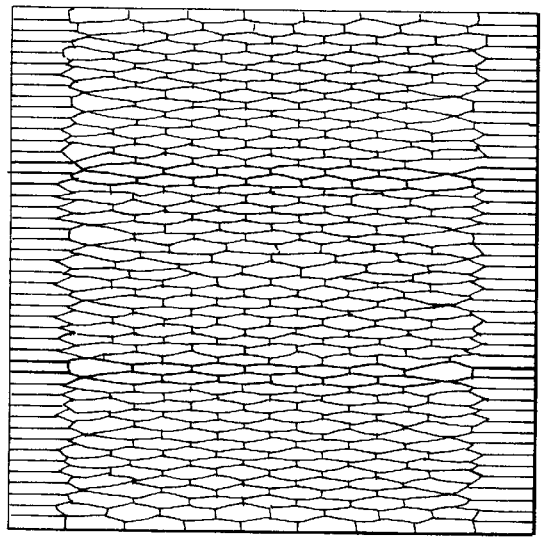
Figure 33:
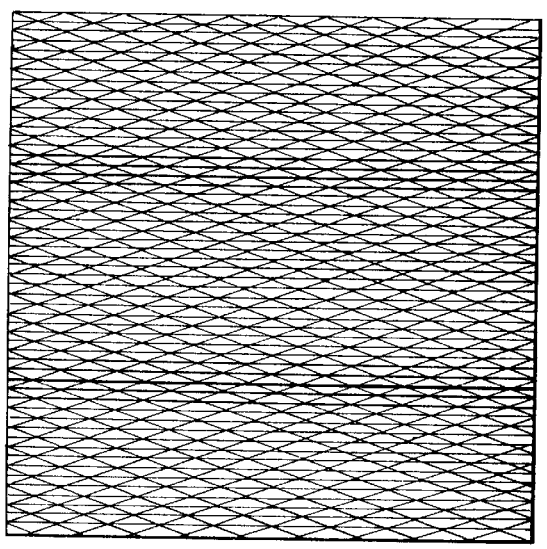
Figure 34:
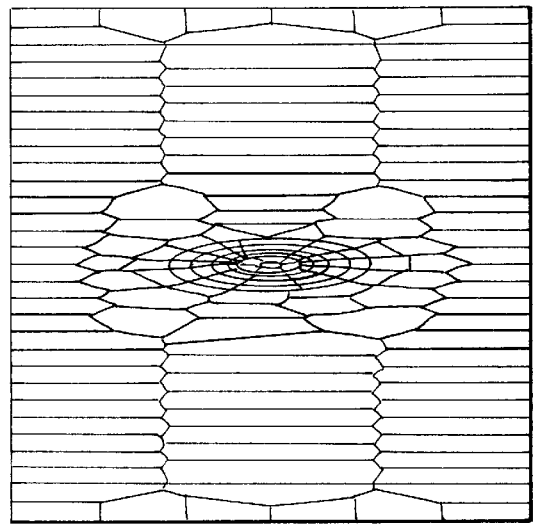
Figure 35:
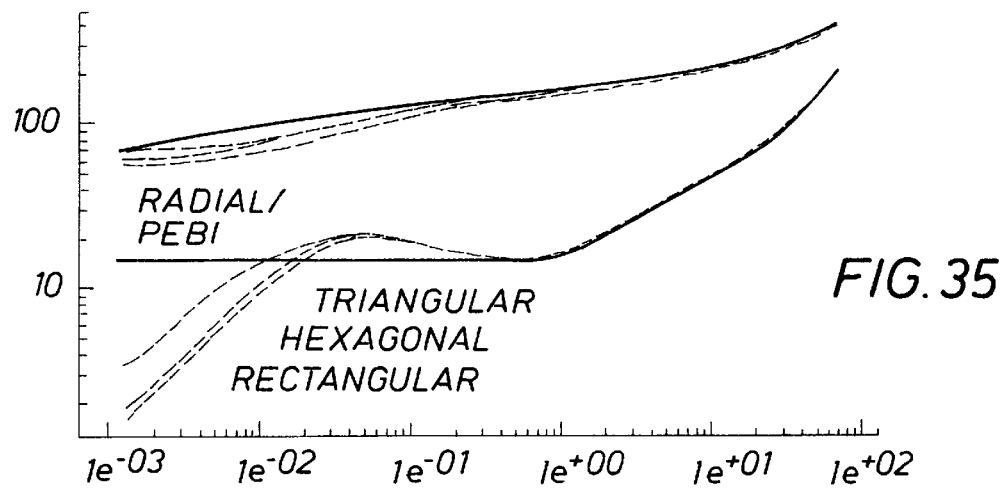

In FIGS. 22, 23, 24, and 25, example grids are illustrated. FIG. 22 illustrates a grid with radial, rectangular, single cell well refinements and a rectangular background. FIG. 23 illustrates part of a 3D PEBI grid with a well refinement and a multi-layered rectangular background. FIG. 24 illustrates a 2.5D composite triangular grid with multi-layers, a rectangular well refinement. FIG. 25 illustrates a 2.5D PEBI grid with a hexagonal background, honoring a boundary polygon.

2D PEBI. A 2D PEBI domain is generated by distributing points on a plane, creating their Delaunay triangulation, generating perpendicular bisectors of the triangle edges and by sampling structure maps at the intersections of the bisectors.

2D TET. A 2D TET domain is generated by distributing points on a plane, creating their Delaunay triangulation, aggregating triangles into polygons and by sampling structure maps at polygon nodes.

Radial. A radial domain is generated by first creating 2D PEBI or 2D TET interface and interior cells. The interior cells are replaced by radial cells of logarithmic growth from the wellbore with any number of segments. The interface cells are modified to comply with the neighboring radial cells.

3D PEBI. A 3D PEBI domain is generated by distributing points in 3D space, creating their Delaunay tetrahedralization and generating perpendicular bisectors of the tetrahedron edges.

3D TET. A 3D TET domain is generated by distributing points in 3D space, creating their Delaunay tetrahedralization and aggregating tetrahedra.

Point Distribution

The first stage in grid generation is "point distribution". Points are distributed according to the global grid type and local grid style. The local grid style is a selectable item for each feature in the gridding system. Example features are faults, wells, hydraulic fractures, regions and boundaries. For 2D PEBI and 2D TET grid generation, all features are projected onto a horizontal plane on which points are distributed. For 3D PEBI and TET grid generation, points are distributed in 3D space. Feature intersections are handled as special cases.

Fault Point Distribution—Points are distributed on fault traces for 2D TET grid type and for 2D PEBI grid type. Points are placed along each trace in pairs, one on either side. The spacing between points along a trace and normal to a trace are either fixed in advance or calculated from the local regional point spacing.

Well Point Distribution—There are three well grid styles; radial, rectangular and single cell. Radial well domains within 2D TET grids are generated by distributing points corresponding to the outer nodes of the outermost radial cells and a point at the centre of the domain, triangulating these with points from other domains and by replacing the resulting single ring of radial cells with a logarithmically growing set of radial cells. The inner surfaces of the innermost radial cells match the wellbore. The volume corresponding to the wellbore itself is external to the grid. Radial well domains within 2D PEBI grids are generated by placing a set of points at the pressure centres of PEBI/radial interface cells and a point at the centre of the domain. As with the TET case, the points are triangulated and a radial domain is fitted inside the interface cell set. Both 2D TET and 2D PEBI rectangular well domains are generated by distributing points along well tracks and normal to well tracks. The point spacing along a well track is either fixed or calculated from the local regional spacing. The Point distribution normal to a track is logarithmic in growth from an inner radius to an outer radius. The ends of wells contain semi-circular distributions of points. In 2D TET and 2D PEBI rectangular domains, well tracks are inside inner most cells, which are typically much larger than wellbores.

Rectangular well domains within 3D TET and PEBI grids are generated by placing points on the outer most vertices of the outer most radial cells and at the pressure centres of the interface cells respectively. As with the radial case, the resulting mini-domains are replaced by complete domains with logarithmic growth of cells from the wellbore to an outer radius. The ends of wells contain hemi-spherical distributions of points. The volume corresponding to the wellbore itself is external to the grid. In single cell grid style, points are distributed in a circle to generate a cell of a specified number of sides and size. This technique only applies in 2D.

Fracture Point Distribution—This applies to 2D PEBI grids only. It places points at the pressure centres of interface cells of a fractured domain. A fracture domain is specified by a well radius, a fracture length, a fracture width, a number of radial divisions, a number of azimuthal divisions and a cell length. A fracture domain honours both the wellbore and the hydraulic fracture, which is typically narrower than the wellbore. A set of high permeability cells describes the fracture itself.

Region Point Distribution—The region point distribution determines the background grid of each region. A region is defined by a polygonal boundary. Three styles of point distribution are supported; rectangular, triangular/hexagonal and radial. Rectangular and triangular/hexagonal distributions are regular patterns of points distributed along lines parallel to definable axes. Rectangular style distributes equally spaced points, to give a specified number of cells in each I and J direction, within the region limits. Triangular/hexagonal style distributes points in a triangular pattern, which are equilateral if (I extent)/(I cells) is equal to (J extent)/(J cells). This style results in triangular cells for 2D TET and hexagonal cells for 2D PEBI grids. Radial point distribution style distributes a set of points radiating from a particular well within each region.

Boundary Point Distribution—These styles are identical to fault point distributions, except for the point spacing being determined solely from the regional grid.

Triangulation and Tetrahedralization

The second stage in generating unstructured grids is the construction of a valid triangulation or a tetrahedralization of the point set (which was created by the "Point Distribution") while using the features of the model. The term "features of the model" recalls a computer program simulation or model executing on a computer workstation, where the program model simulates an earth formation near a wellbore that is drilled into the formation, the earth formation including one or more horizons and one or more faults cut into the horizons.

If the resulting grid is a PEBI grid, the triangulation (or tetrahedralization) has to be of Delaunay type. Therefore, we generate Delaunay tessellations of space. The algorithm employed is a modified version of the incremental point insertion method of Bowyer[6]. In this method all points are added incrementally, into a valid Delaunay tessellation. The starting position is a rectangle or a cube larger than the complete set of points with a known Delaunay tessellation. Finally, all triangles or tetrahedra external to the gridding boundary are removed. All Delaunay grid generation algorithms which work on real numbers suffer from rounding errors, which result in the creation of unphysical tetrahedra and infinite loops. This is due to performing a key test between possible local tetrahedralizations within the limited precision of a computer. The test involves computing terms involving $L^5$ (and $L^4$ for triangles), where L is an edge length of a tetrahedron. If tetrahedra of large aspect ratios are involved this problem cannot be avoided by traditional scaling methods. Recent literature suggests working with integer arithmetic, such as in George[14]. However, the size of even a long integer is insufficient for practical problems.

Hence, these ideas are used via a software implementation of longer integers making the process of tetrahedralization slower and complex. In this specification, we use the fact that a double precision word represents discrete numbers rather than real numbers, and can be used for exact calculations. If all calculations can be guaranteed not to exceed the fractional part of a double precision number, they will behave similarly to integers and will not have any roundoff errors.

Therefore, in accordance with one aspect of the present invention, prior to tetrahedralizing, we scale the points, in accordance with the aforementioned section of this specification entitled "K-Orthogonal Grid Generation by Scaling", in such a way that the fractional part of a double precision word is never exceeded during computations. We also avoid divisions and square-roots both of which introduce inaccuracy. The length of a double precision word is sufficiently long for reservoir simulation grids, which give a point resolution of 1/8192 in 2D and 1/1032 in 3D in each dimension. This precision would not be sufficient if wellbores were gridded by point placement on the surface, rather than by fitting separately calculated domains, as is the case here.

A Delaunay tetrahedralization may contain certain tetrahedra known as slivers. These are tetrahedra with co-planar or nearly co-planar vertices. The existence of slivers does not invalidate the Delaunay property, as they have finite circumspheres which exclude other vertices. There is no sliver analogue in 2D, as three co-linear points cannot have a finite circumcircle. Sliver tetrahedra do not cause problems for PEBI cells, but they may do for composite tetrahedral grids as tetrahedra are used as simulation cells. When generating composite tetrahedral grids it is important to aggregate sliver cells into neighbouring cells.

Cell Generation and Triangle Aggregation

The third stage, following a triangulation or a tetrahedralization, is cell geometry generation. This involves the creation of an aggregation map, which is a list of triangles or tetrahedra to form a cell in TET grids or to form a cell vertex in PEBI grids. There are two rules governing the aggregation:

(1) all triangles or tetrahedra, whose nodes are nearest neighbours of a structured distribution of points, are aggregated; and (2) all triangles or tetrahedra with circumcentres close to each other are aggregated.

The criterion for circumcentres being sufficiently close is the distance between them as a fraction of the extent of the pair of elements along the line of centres, being less than specified tolerance. The approximate circumcentre of the aggregated element is a volume weighted average of the components. The concept behind aggregation is the elimination of small faces from PEBI grids and superfluous cells of nearly equal solutions (as the centres are close) from TET grids. See FIG. 21.

Cells for 2D TET grids are generated by tracing the boundary of each aggregated set of triangles, sampling the nodes on the structure maps and by creating the required number of cells if layer refinement is active. Cells for 2D PEBI grids are generated by tracing polygons connecting the centres of aggregated elements, sampling the nodes on the structure maps and by creating the required number of cells if layer refinement is active. In both of these grids, the top and the bottom faces contain a hinge node, which is located at the cell centre in xy space and sampled onto the structure maps.

This allows cells to take better account of structure variations, than with the corner nodes alone.

Cells for 3D TET and PEBI grids are generated in a manner analogous to their 2D counterparts using tetrahedra, except for the absence of map sampling and hinge nodes. The surface of a cell face is defined by a local triangulation of its vertices. A hinge face is triangulated by joining its hinge node to all the boundary nodes. A non-hinged face is triangulated by moving through the vertices in an oscillatory manner, starting from the first node on the list.

Secondary domains such as radial, hydraulic fracture and 3D well domains are created by replacing relevant parts of primary domains.

The pressure centres of radial cells are at the pressure equivalent radii for radial flow in xy space and at the arithmetic averages in z. The pressure centres of 2D PEBI cells are at the initial seed point in xy space and at the arithmetic averages of the hinge nodes in z. The pressure centres of 2D TET cells are at their circumcentres in xy space and at the arithmetic averages of the hinge nodes in z. The pressure centres of 3D PEBI domains are at their seed points, of 3D TET domains are at their circumcentres and of 3D well domains are at their mass centres. Any pressure centre found to be outside a cell boundary is moved inside, along the direction of the mass centre. This is possibile if a cell is a single obtuse triangle in a 2D TET grid or a tetrahedron in a 3D TET grid. The original point placement and grid smoothing is aimed at minimizing such cases. Initially, cells are generated in permeability scaled computational space, which are then transformed into physical space. Once in physical space, cells external to the gridding boundary are removed from the grid.

Cell Property Calculation

A constant property value within each cell, in physical space, is calculated by sampling property maps at the cell centres. The primary property values within each cell include porosity, permeability, net to gross, as well as other primary cell based properties. Secondary properties in each cell, such as pore volumes and transmissibilities, are calculated using the primary property values and the cell geometry.

Pore Volume—For 2D TET, 2D PEBI, 3D TET and 3D PEBI cells, the following formula is used for pore volume computation.

$$PORV = NTG * PORO * \sum_{i=1,nf} \sum_{j=1,nt} V_{ij} \qquad (16)$$

where "nf" is the number of faces on a cell; "nt" is the number of triangles on each face; $V_{ij}$ is the volume of the tetrahedron defined by joining the cell centre to the jth triangle on the ith face of the cell. The volume of a radial cell is calculated using its vertices in polar coordinates.

Transmissibility—The transmissibility between a pair of cells i and j, for 2D TET, 2D PEBI, 3D TET and 3D PEBI cells is given by the following formula:

$$T_{ij} = \frac{C_D}{1/t_i + 1/t_j} \qquad (17)$$

where $$t_i = \frac{a^T K_i r_i}{\|r_i\|^2} \qquad (18)$$

$$K_i = \begin{pmatrix} NTG & 0 & 0 \\ 0 & NTG & 0 \\ 0 & 0 & 1 \end{pmatrix} K_{i(raw)} \qquad (19)$$

and where:

a=area vector of the interface $K_i$=permeability tensor of cell i adjusted by net to gross $r_i$=vector from centre of cell i to the interface along the line of centres $C_D$=Darcy constant NTG=net to gross thickness ratio The transmissibility between a pair of radial cells is calculated using radial flow theory between pressure average centres. The transmissibility between a radial cell and a linear cell is also calculated using radial flow between the respective cell centres.

Orthogonality Error—For transmissibility calculations only, the component of $a^T K$ in the K-orthogonal direction is used. We use the remainder as an orthogonality error indicator. The error for a single cell is given by;

$$E = \frac{\sum_{faces} \left| a^T K - \frac{a^T K r}{\|r\|^2} r^T \right|}{\sum_{faces} \|a^T K\|} \qquad (20)$$

where "a" is the area vector and "r" is the vector from the cell centre to the face. The error term for a single face is given by summing the corresponding face terms in Equation (20) for the two cells on either side of the face.

Grid Smoothing—Grid smoothing is one approach for improving the quality of a grid, which makes cells more equilateral. This is an iterative process of moving free nodes of a triangulation to the average of their neighbours, followed by a re-triangulation. A free node is any node which is not associated to a feature such as a fault, a well or boundary. Smoothing is not recommended with rectangular background grids, as the diagonal edges will induce a distortion of the rectangular structure. A single smoothing iteration has a node re-positioning given by equation (21), below, followed by a re-triangulation of the adjusted nodes.

$$p_i = \alpha p_i + \frac{\beta}{m} \sum_{j=1,m} p_j \qquad (21)$$

where "i" is a free node, $\alpha$=0.5, $\beta$=0.5, and "m" is the number of neighboring nodes at "i".

Deviated Coordinate Lines—Lines joining nodes on the top surface of a 2D grid to the corresponding nodes on the bottom surface are referred to as coordinate lines. By default, these lines are vertical. However, it is possible to deviate them from the vertical to honour angled faults, boundaries and deviated wells. In such a case, the first operation is to generate a vertical version of the required 2D grid, by selecting the top most traces of the deviated features. The next stage is to build a deviation map for the coordinate lines. The deviations of the coordinate lines at the deviated features are calculated directly from the features. The deviations elsewhere are calculated by interpolating from the known values. The interpolation method employed is a solution to the 2D Laplace's equation with known deviations as boundary conditions. The Laplace's equation is solved by the finite element method on a triangular grid constructed using the seed points for a 2D TET grid consisting of the faults, the wells, the boundary and the background.

Well Connection Factors—Well connection factors for different types of well grids are given below. The permeability tensor used in all well connection factors are adjusted for net to gross using Equation (19).

Radial—Each cell adjacent to a wellbore is connected by;

$$T = C_D \theta (k_x k_y)^{1/2} \frac{h}{\ln(r_o / r_w) + S} \qquad (22)$$

where $r_o$ is the equivalent pressure radius of the cell.

Rectangular 3D—These domains consist of cells of logarithmic growth, from the surfaces of wellbores. Cells adjacent to a wellbore are connected by;

$$T = \frac{T_r}{1 + \frac{T_r}{C_D \theta k h} S} \qquad (23)$$

$$T_r = C_D a^T \frac{Kr}{\|r\|^2} \qquad (24)$$

where k is given by;

$$k = (l_x^2 k_y k_z + l_y^2 k_z k_x + l_z^2 k_x k_y)^{1/2} \qquad (25)$$

The above connection factor is based on a half cell transmissibility between the cell pressure centre and the well and a skin term estimated by comparing to an equivalent radius formula. The estimation of the permeability in the direction of the well track using direction cosines in Equation (25) is from Alvestad et al.[3].

Single Cell 2D—Single cell well connections refer to wells which go through the pressure centres of 2.5D PEBI or triangular grids. Such wells are connected to a single cell in each layer, given by, $$T = C_D \frac{\theta(k_x k_y)^{1/2} h}{\ln(r_o / r_w) + S} \qquad (26)$$

where;

$$r_o = e^{\frac{\sum_i T_i \ln r_i - 2\pi k h}{\sum_i T_i}} \qquad (27)$$

All terms in Equation (27) are calculated by transforming the grid to a locally isotropic system. Equation (27) is from Fung[13] and Palagi[19].

As these cells are generated by distributing points equidistantly from the well in an isotropic space. Aspect ratio restrictions are automatically handled by the gridding process.

Rectangular 2D—The formulae given below are used for calculating well connections primarily for 2.5D grids with cells aligned along tracks of horizontal wells. The same formulae are used even if the cells are not aligned. The approach is to resolve the well track within a cell into two components, one is horizontal along the track and the other is vertical. Peaceman's well connections for the two components are calculated and added together vectorially. The vectorial addition of Peaceman connections was first presented by Chang[7]. The permeability in the horizontal direction is taken to be the geometric average of x and y permeabilities.

Let the direction along the track on the xy plane be "h", normal to the track on the xy plane be "r" and the vertical be "v":

$$T = (T_h^2 + T_v^2)^{1/2} \tag{28}$$

$$T_h = C_D \frac{\theta(k_h k_v)^{1/2} h_h}{\ln(r_h/r_w) + S} \tag{29}$$

$$T_v = C_D \frac{\theta k_h h_v}{\ln(r_v/r_w) + S} \tag{30}$$

$$r_h = 0.28 \frac{\left[D_r^2\left(\frac{k_v}{k_h}\right)^{1/2} + D_v^2\left(\frac{k_h}{k_v}\right)^{1/2}\right]^{1/2}}{\left(\frac{k_v}{k_h}\right)^{1/4} + \left(\frac{k_h}{k_v}\right)^{1/4}} \tag{31}$$

$$r_v = 0.28 \frac{[D_h^2 + D_r^2]^{1/2}}{2.0} \tag{32}$$

Cell Renumbering

The solution algorithm for linear equations (used in Eclipse[25], by Orthomin with Nested Factorization preconditioning, and by Appleyard et al.[5]) operates on a structured grid of dimension NX*NY*NZ. It is sufficiently flexible to handle non-neighbour connections and inactive cells efficiently.

Hence, in accordance with another aspect of the present invention, we re-number unstructured grids into external structured grids, keeping the number of non-neighbour connections down.

A grid consists of a set of domains, some of which are structured. All the unstructured domains are numbered together using a line sweep algorithm described below, into an nx*ny*nz box. The structured domains are numbered into individual boxes while transposing I and J indices. All the boxes, structured and unstructured, are stacked in I into a global grid of NX*NY*NZ. Structured domains are transposed during the renumbering to increase the probability of stacking along the shorter dimension, since nx is typically greater than ny.

Line Sweep Algorithm—The current implementation of the line sweep algorithm does not perform a sweep in the Z direction as all the domains contain a natural numbering in the third dimension, defined by the initial points. However, it is possible to extend the algorithm to include a Z sweep if domains without natural numberings need to be handled.

Sweep in Y—Sort cells in increasing order of the y coordinate of centres:

YL=Ymin+eps
J=0
S=All cells with y<=YL
while YL<=Ymax
J=J+1
Cell$_j$=J for all cells in S
Calculate Ymean, SD for all neighbours of S with y>=YL,
YL=Ymean+SD+eps
S=All cells with YLold<y<=YL
do
NY=J Sweep in X—Sort cells in increasing order of the x coordinate of centres XL=Xmin+eps
I=0
S=All cells with x<=XL
Create temporary vector Imax[NY] to hold I index for each row
while XL<=Xmax
I=I+1
Imax[]=I for 1 to NY
for all cells in S in ascending order of x
  Ic=Imax[cell$_j$]+1
  cell$_i$=Ic
  Imax[cell$_j$]=Ic
  I=max(I,Ic)
do
Calculate Xmean, SD for all neighbours of S with x>=XL
XL=Xmean+SD+eps
S=All cells with XLold<x<=XL
do
NX=I
SD=Standard Deviation
S=Set of cells
eps=tolerance The sweep in X is somewhat more complex than the one in Y, to ensure that no two or more cells have the same I and J indices. It can be shown that this algorithm gives optimal numberings (has minimum number of non-neighbour connections) for regular Cartesian and hexagonal grids.

In accordance with another aspect of the present invention, once all the domains have been renumbered and slotted into an external grid of NX*NY*NZ, it can be viewed as a structured grid with active and inactive cells and nearest neighbour and non-neighbour transmissibilities between cells.

Consider the following example of three domains. Domain one is structured and is size 3×3, domain two is structured and is size 6×2, and domain three is unstructured and is renumbered to be size 5×8. These domains are fitted into an external grid of size 10×8, containing 44 active cells and 36 inactive cells, neighbour connections for each cell and a list of non-neighbour connections.

In FIG. 14, table 1 gives the external grid cells for this example. The data is supplied to Eclipse using three BOX commands, one for each domain. Once all the grid data is in Eclipse, it eliminates the inactive cells and frees all space associated with them. Although, from then on, Eclipse operates only on the active cells, the flow calculations and linear algebra exploit the bands of the complete grid.

Unstructured Grid Class

This is a brief description of the data model used for all unstructured grids.

A grid is described by an amalgamation of logical domains, each of which represents a structured or unstructured portion of the grid. Each domain has a logical dimension (NX, NY, NZ) and cells with a cell ID in the range 1 to NX*NY*NZ. Each cell indexes a physical polyhedron defined by sets of faces, which are in turn defined by sets of nodes. All faces and nodes of an amalgamation are stored together, in the NFACENOD (number of nodes on each face), FACENODS (IDs of nodes on each face), and NDCOORD (nodal coordinates) arrays. The polyhedra are defined by the NCELLFAC (number of faces on each cell) and CELLFACS (IDs of faces on each cell) arrays for each domain. For a radial domain, a rotation axis is specified by two points in the RADAXIS array.

Each domain also defines a mapping from internal cell IDs to external grid IDs in the EXTCELL array. Non-neighbour connections for the external grid do not need to be specified; these can be deduced from the grid geometry. Bounding boxes for groups of external cells are stored in the BOXES array.

LGRs (local grid refinements) may also be defined as amalgamations. The connections between cells in the LGR and those in the parent amalgamation are defined in each domain by the NNCLG array. For convenience, the parent cells are indexed by an amalgamated cell ID; this is the cell ID of the "n"th domain offset by the sum of the number of cells in the first to "n−1" th domains. Corresponding faces are also stored.

Local Grid Refinement Handling

This is a facility for inserting local refinements into existing grids. It allows importing existing corner point or unstructured grids, selecting sets of cells and generating local grids and their export for local or global time stepping. It is primarily meant for inserting 3D refinements into 2D grids for accurate well modelling and fault handling.

Multi-point Flows

K-orthogonal grid generation by scaling can produce regions which are only approximately K-orthogonal. These regions can by identified by the error estimate in Equation (20). Flows in such regions can be described by a multi-point formula, as given by Aavatsmark[1]. Work is currently underway to implement these flow terms in the reservoir simulator Eclipse and the unstructured grid generator used in this work.

Cross-section Gridding

This allows the generation of 2D grids on cross-sections of reservoirs. The end points of a line in areal view, and a cross-section thickness are used to define a cross-section model. All reservoir features are projected onto this plane and 2D grids (where the structured direction is along the thickness of the section) are generated. The cross-section model may be sub-divided in the structured direction using arbitrary weights.

Relative Merits of Different Grids

The flexibility in point placement is highest with composite tetrahedral grids. Points may be placed on layer interfaces and on fault surfaces. In order to generate PEBI grids which honour layer interfaces, points have to be mirrored on either side. The same must be performed for faults. For a multi-layered problem, points must be duplicated for each interface giving twice as many grid layers as geological layers. Even with cell aggregation, in general, there are more cells in a composite tetrahedral grid than in a PEBI grid with the same number of seed points. The cell re-numbering algorithm used here is less effective for tetrahedral grids. Further, in 3D, there may be some residual sliver tetrahedra with very small volumes. There is also the possibility of the ortho-centre of a tetrahedral cell lying outside itself, but the cell centre must be placed inside at the loss of orthogonality. Careful point placement and grid smoothing reduce frequency of such cases.

A triangular grid with the same point spacing as a Cartesian grid has a smaller grid orientation effect. A hexagonal PEBI grid has an even smaller grid orientation effect. An effective approach is to generate a 2D unstructured grid first, whether it is PEBI or triangular and to introduce 3D regions around complex wells and faults subsequently.

Results—Set of Example Grids.

In FIGS. 22 to 25, a set of example grids are illustrated.

FIG. 22 is a 2.5D PEBI grid for a six well case with two horizontal wells with rectangular refinements, two vertical wells with radial refinements, two vertical wells with single cell completions, three vertical faults and a rectangular background grid.

FIG. 23 is a 3D PEBI grid for a multi-layered case with a horizontal well.

FIG. 24 is a 2.5D composite triangular grid for a multi-layered single well case.

FIG. 25 is a 2.5D PEBI grid showing boundary honoring.

Single Phase, Isotropic, Producer.

This example consists of a square region of side 400 ft and depth 100 ft, permeability of 20 mD, with a central producer in single phase. Simulations were performed on four grids, square, hexagonal PEBI, triangular and a radial/irregular PEBI combined model.

In FIGS. 26 through 30, the cell pressures at the end of the simulation and a comparison of the pressure drop at the wellbore with an analytic solution are provided in FIGS. 26 to 30.

As expected the early time results from all grids except for the combined grid are poor, primarily due to the fact that the well is completed in a large cell. The results from the first three grids become acceptable for welltest analysis once the effect of the drawdown has reached about 60 ft, where as the combined grid solution (including the derivative) is almost identical to the analytic solution throughout. Note that the square grid solution is identical to that from the standard five point scheme.

In FIG. 15, Eclipse simulation statistics are given in table 2.

As the number of cells and the number of time steps vary for the different grids, a measure of simulation cost calculated by dividing the CPU time (on an SGI Indigo 2, R4400) by the number of cells and by the number of time steps is given in the final column. As expected the cost of simulating on an unstructured grid is higher than on a structured grid, due to non-neighbour connection handling. The cost ratio between a square and a hexagonal grid is encouragingly small at 1.3.

Single Phase, Anisotropic, Producer.

This example consists of a square region of side 400 ft and depth 100 ft, permeability of $k_x$=100 mD, $k_y$=4 mD, with a central producer in single phase. Simulations were performed on four grids, rectangular, hexagonal PEBI, triangular and a radial/irregular PEBI combined model. All grids were generated by mapping to an isotropic computational space, hence they have an approximate aspect ratio of 5 (5=√100/4) in physical space. A grid which has square cells in physical space was also used, which gave marginally inferior results to the rectangular grid.

In FIGS. 31 through 35, the cell pressures at the end of the simulation and a comparison of the pressure drop at the wellbore with an analytic solution are provided in FIGS. 31 to 35.

Again, the early time results from all grids except for the combined grid are poor, due to the coarseness of the grids. The combined grid solution is almost identical to the analytic solution (including the derivative) throughout.

In FIG. 16, Eclipse simulation statistics are given in table 3.

Two Phase, Isotropic, Injector

This test example is a simplified version of the Hegre, Dalen and Henriquez[17] test, used to investigate grid orientation effects. It has been reduced to a single water injector case in a circular region, initially saturated with oil. The properties of the fluids have been adjusted so that the mobility of the injected fluid is approximately 20 times that of the displaced fluid. The resulting water front should be circular and deviations from it are seen more easily than with a multi-well simulation.

Figure 36:
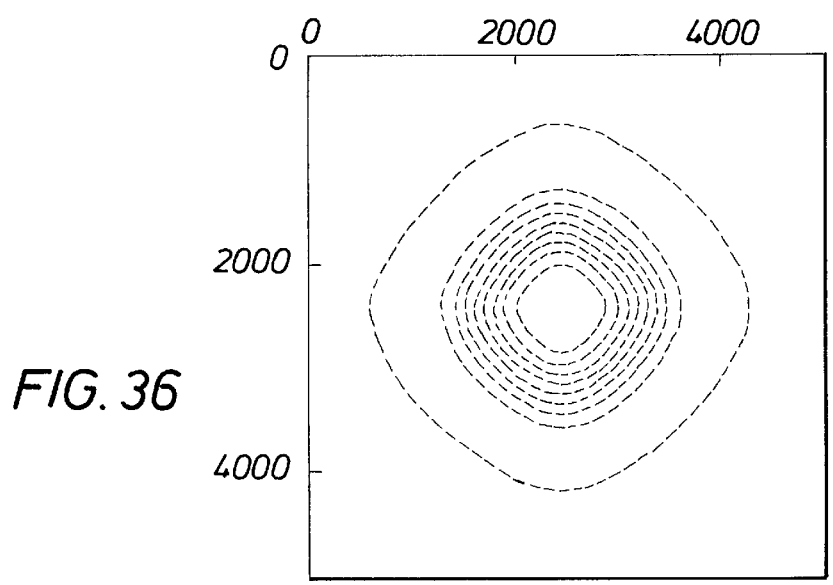
Figure 37:
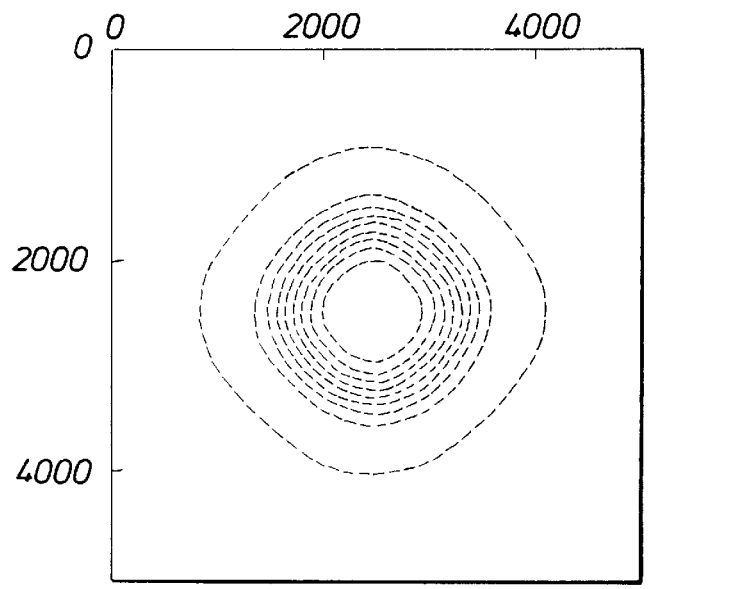
Figure 38:
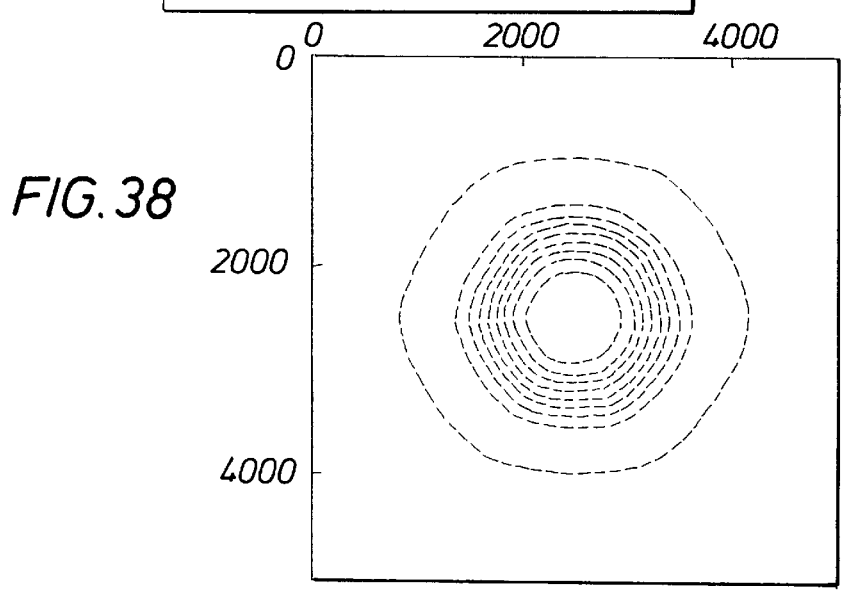
Figure 39:
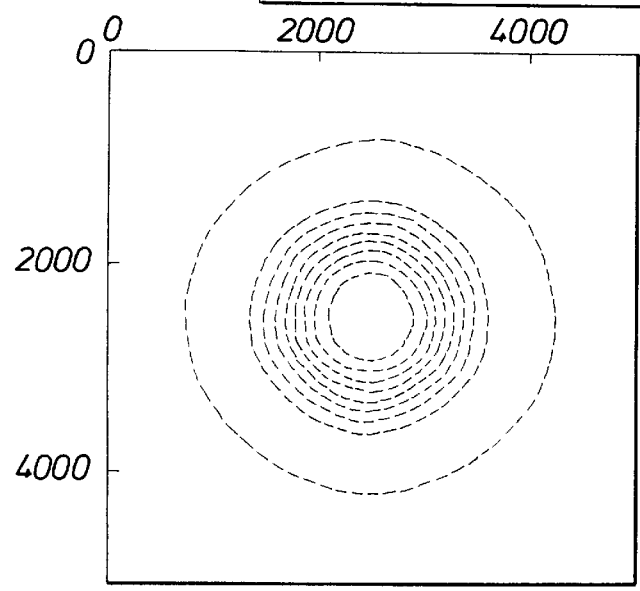

In FIGS. 36 through 39, water saturation contours at a fixed time for different grids are illustrated. FIG. 36 is from a square grid of 100 ft cells, FIG. 37 is from a square grid of 50 ft cells, FIG. 38 is from an equilateral triangular grid where the nodes are spaced 100 ft apart, and FIG. 39 is from a hexagonal PEBI grid using the same triangulation as in the previous grid. The water saturation contours become more circular from FIGS. 36 to 39, with the hexagonal PEBI grid showing the least grid orientation effect.

Two Phase, Isotropic and Anisotropic, Multi-well.

This is a set of tests on two versions of the Hegre, Dalen and Henriquez test problem.

Figure 40:
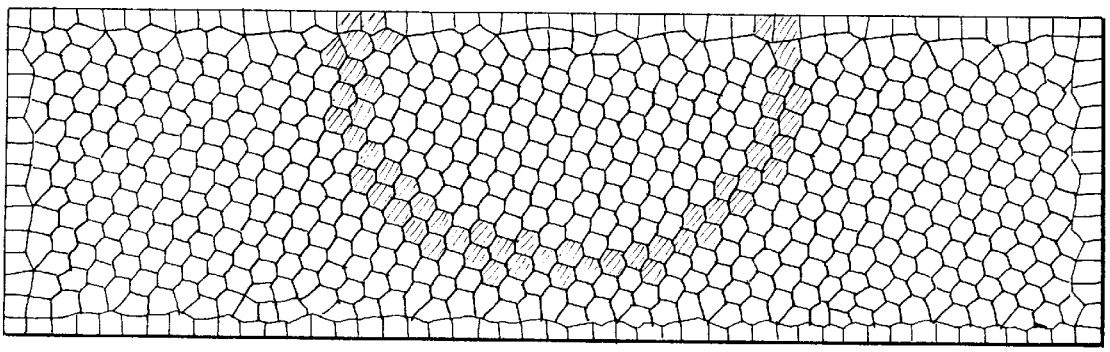

In FIG. 40, a PEBI grid is illustrated for the original test case with a single water injector and two producers, which also shows the water saturation at a fixed time.

Figure 42:
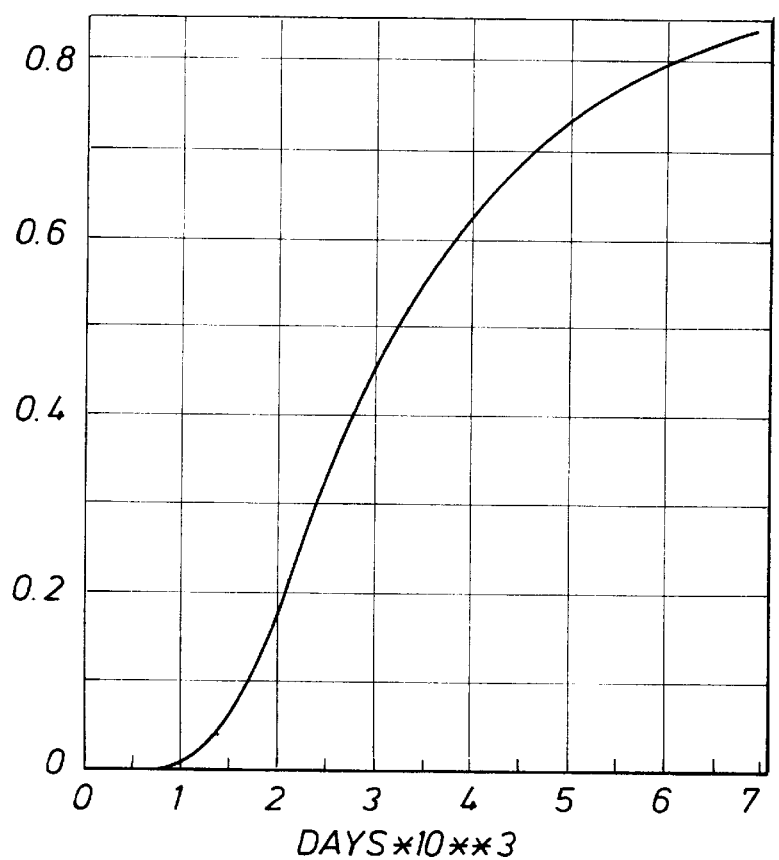

In FIG. 42, a plot of the water cut at the two producers is illustrated.

Figure 41:
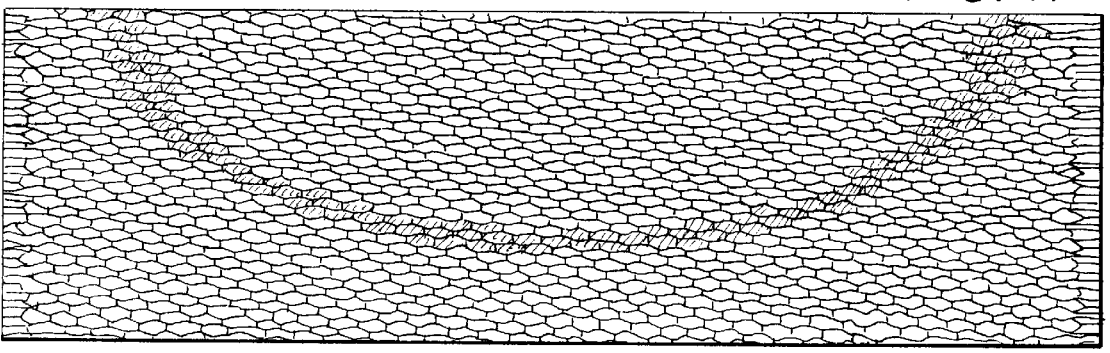

In FIG. 41, a modified version of the test with $k_x/k_y=5$, and a K-orthogonal grid is illustrated.

Figure 43:
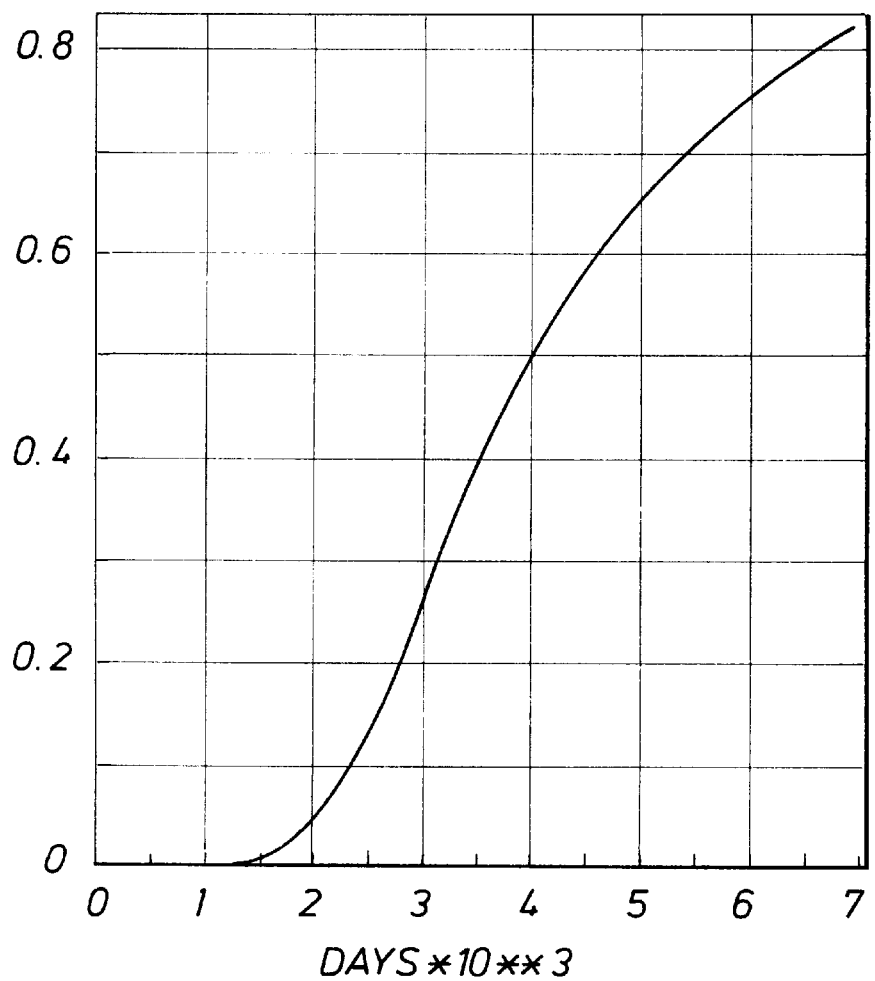

In FIG. 43, a plot of the water cut at the two producers for the case in FIG. 41 is illustrated.

Both grids have been constructed in such a way to ensure a direct line of cells between the injector and one producer and a staggered line of cells between the injector and the other producer. The water cut at the two producers is identical for both isotropic and anisotropic cases. This is another example of a properly constructed K-orthogonal grid giving results with a low grid orientation effect.

North Sea Gas Field—This is a field example of a North Sea gas field. It has three phases, multiple layers, and wells, and consists of a 15 year prediction. It was simulated on three grids; first, on a rectangular grid which does not honour any features; second, on a hexagonal grid which honours the boundary, faults and wells; and third, on a rectangular grid which honours above features.

Figure 44:
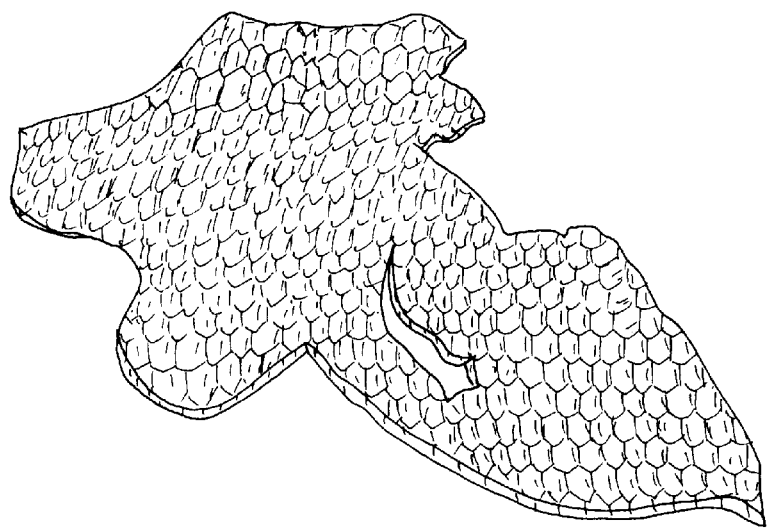
FIG. 44 illustrates a multi-layered hexagonal grid for a north sea gas field.

In FIGS. 17 and 44, a hexagonal grid is shown in FIG. 44 and simulation statistics are given in table 4 which is illustrated in FIG. 17. The simulation cost ratio between the rectangular grid which honours no model features and the one which honours all model features is 1.3.

3D Horizontal Well—This is a partially penetrating horizontal well centred in a square region of 600×600 ft, and 400 ft depth, well length of 200 ft. The permeability is 20 mD, porosity is 0.25 and the drawdown is 500 stb/day and the drawdown is one day long. It was simulated in single phase (oil) and the results when compared with an analytic model were found to be very good.

Figure 45:
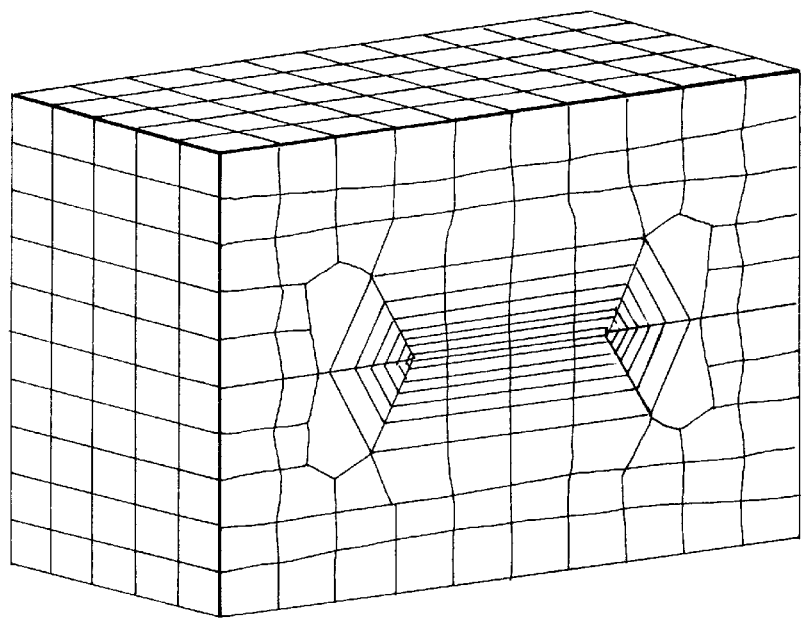
FIG. 45 illustrates a cross-section of a grid for a partially penetrating horizontal well.
Figure 46:
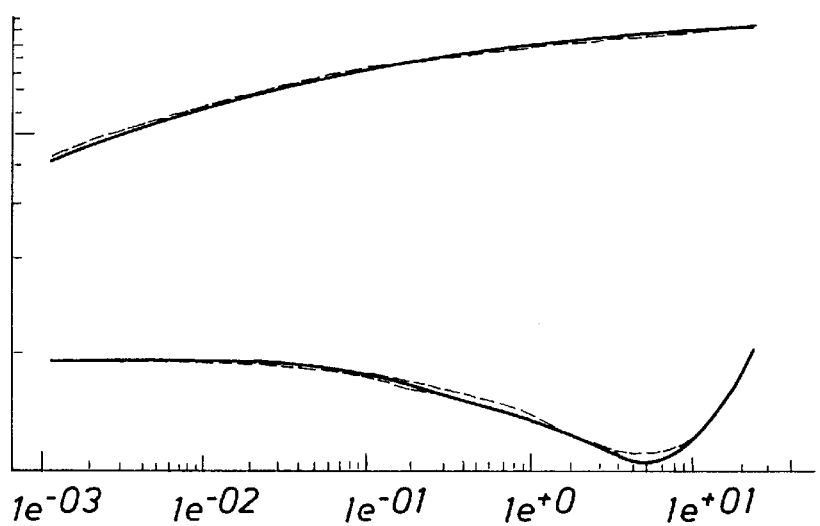
FIG. 46 illustrates another further example output display, similar to the example output display of FIG. 13d2, which can be displayed, by the Eclipse simulator software, on the interpretation workstation display monitor (the ED viewer), this example illustrating a Log-log plot of wellbore pressure drop from a 3D PEBI grid solution and an analytic one for a partially penetrating horizontal well.

In FIGS. 45 and 46, a cross-section of the grid and the wellbore pressure drops are in FIGS. 45 and 46.

Conclusions

A robust algorithm has been presented which uses a transformation into an isotropic computational space, for generating grids which are K-orthogonal for a wide class of problems and are approximately K-orthogonal for the remainder. The transformation algorithm could be extended to better handle more complex cases.

The deviation from K-orthogonality is reported on a cell basis, which could be used to determine regions for local application of MPFA schemes.

Composite triangular and tetrahedral grids, which are the duals of 2D and 3D PEBI grids are highly flexible and can be used for reservoir simulation.

A two point transmissibility formula and other cell property calculations and well connection factor calculations are derived for general unstructured grids.

Simulation results on K-orthogonal grids generated by the transformation method have been found to agree well with analytic solutions. The radial/PEBI combination is particularly accurate. Hexagonal grids have been found to contain a low grid orientation effect for isotropic and anisotropic cases.

At this stage there is insufficient experience to make a recommendation between PEBI and composite tetrahedral grids. Automatic gridding, complex reservoir feature honouring, flexible refinements and improved accuracy advantages of unstructured grids outweigh the relatively small cost of increased simulation time per cell, for a wide range of models.

References

References 1 through 25 listed below are each incorporated by reference into this specification:

1. I.Aavatsmark, T.Barkve, O.Boe, T.Mannseth, "Discretization on unstructured grids for inhomogeneous, anisotropic media, Part 1: Derivation of the methods", accepted for publication in SIAM J. Sci. Comp.

2. I.Aavatsmark, T.Barkve, O.Boe, T.Mannseth, "Discretization on unstructured grids for inhomogeneous, anisotropic media, Part 2: Discussion and results", accepted for publication in SIAM J. Sci. Comp..

3. J.Alvestad, K.Holing, K.Christoffersen, O.Langeland, "Interactive Modelling of Multiphase Inflow Performance of Horizontal and Highly Deviated Wells", SPE 27577, Euro. Comp. Conf., Aberdeen (1994).

4. L. C. N. Amado, L.Ganzer, Z. E. Heinemann, "Finite Volume Discretization of Fluid Flow Equation on General Perpendicular Bisection Grids", 5th Intl. Forum on Reservoir Simulation, Muscat, Oman (1994).

5. J. R. Appleyard, I. M. Cheshire, "Nested Factorization", SPE 12264, Res. Sim. Symp., San Francisco (1983).

6. A.Bowyer, "Computing Dirichlet tesselations", Comp. J., 24, p162–167 (1981).

7. M -M. Chang, L.Tomusta, M. K. Tham, "Predicting Horizontal/Slanted Well Production by Mathematical Modeling", SPE 18854, SPE Prod. Oper. Symp., Oklahoma (1989).

8. A.Cominelli, P.Consonni, S.Mantica, G.Manzini, "High Order Mixed Finite Element TVD Finite Volume Schemes for Black Oil Simulation", ECMOR V, Leoben, Austria (1996).

9. P. E. Cottrell, E. M. Buturla, "Two-Dimensional Static and Transient Simulation of Mobile Carrier Transport in a Semiconductor", NASECODE Proc., Boole Press Dublin (1979).

10. B.Delaunay, "Sur la Sphere vide, Izvestiya Akademii Nauk SSSR", Math. and Nat. Sci. Div., No 6, p793–800 (1934).

11. L. J. Dulofsky, "A triangle based mixed finite volume technique for modelling two phase flow through porus media", J. Comp. Phys., 105, p252–266 (1993).

12. P.Forsyth, "A Control Volume Finite Element Method for Local Mesh Refinement", SPE 18415, 10th Reservoir Simulation Symposium (1989).

13. L. S. Fung, A. D. Hiebert, L.Nghiem, "Reservoir Simulation with a Control Volume Finite Element Method", SPE 21224, 11th SPE Symposium on Resrvoir Simulation, Anaheim (1991).

14. P. L. George, F.Hermeline, "Delaunay's Mesh of a Convex Polyhedron in Dimension d. Application to Arbitrary Polyhedra", IJNME, Vol 33, p975–995, Wiley (1992).

15. D.Gunasekera, "The generation and application of Voronoi (PEBI) grids for simulating well tests and reservoirs with Eclipse", Weltest 200 Project Technical Report No 2, GeoQuest (1992).

16. D.Gunasekera, "Orthogonal Composite Tetrahedral Grids", Gridless Simulator Project Report 1, GeoQuest (1995).

17. T. M. Hegre, V.Dalen, A.Henriquez, "Generalized transmissibilities for distorted grids in reservoir simulation", SPE 15622, Proc. SPE 61st Annual Tech. Conf. and Exhi., New Orleans (1986).

18. Z. E. Heinemann, C. W. Brand, "Gridding Techniques in Reservoir Simulation", Proc. First Int. Forum on Reservoir Simulation, Alphbach, Austria (1988).

19. C. L. Palagi, K.Aziz, "Use of Voronoi Grids in Reservoir Simulation", SPE 22889, 66th Annual Technical Conference and Exhibition, Dallas (1991).

20. D. W. Peaceman, "Interpretation of Well-Block Pressures in Numerical Reservoir Simulation with Nonsquare Grid Blocks and Anisotropic Permeability", SPEJ, p531–543 (June 1983).

21. D. K. Ponting, "Corner point geometry in reservoir simulation", Proc. ECMOR 1, Cambridge (1989).

22. S.Verma, "Flexible Grids for Reservoir Simulation", PhD Dissertation, Dept, Pet. Eng., Stanford University (1996).

23. G.Voronoi, "Nouvelles applications des parametres continuous a la theorie des formes quadratiques", J. Reine Angew. Math., 134, no 4., p198–287, (1908).

24. A. M. Winslow, "Numerical Solution of the Quasilinear Poisson Equation in a Nonuniform Mesh", J. Comp. Phys (1967).

25. ECLIPSE 100 User Manual, GeoQuest, Abingdon, U.K. (1997).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus responsive to a set of seismic data and a set of well log data for displaying a gridded earth formation comprised of a plurality of grid cells located near a wellbore and a plurality of simulation results associated, respectively, with said plurality of cells, comprising:

output data generating means operatively responsive to the set of seismic data and the set of well log data for generating output data, said output data including a plurality of values, each of said plurality of values being indicative of a transmissibility between a pair of said plurality of cells, said transmissibility being determined from the following equation:

$$T_{ij} = \frac{C_D}{1/t_i + 1/t_j},$$

where $t_i = \frac{a^T K_i r_i}{\|r_i\|^2}$ and $K_i = \begin{pmatrix} NTG & 0 & 0 \\ 0 & NTG & 0 \\ 0 & 0 & 1 \end{pmatrix} K_{i(raw)}$ and a=area vector of the interface, $K_i$=permeability tensor of cell i adjusted by net to gross, $r_i$=vector from centre of cell i to the interface along the line of centers, $C_D$=Darcy constant, and NTG=net to gross thickness ratio;

display means for displaying said gridded earth formation comprised of said plurality of grid cells; and simulator means operatively connected to said display means and responsive to said output data from said output data generating means for generating said plurality of simulation results associated, respectively, with said plurality of grid cells, each of said plurality of simulation results being overlayed over a grid cell of said plurality of grid cells on said display means for displaying a simulation result for each of said plurality of grid cells of said gridded earth formation.

2. The apparatus of claim 1, wherein said output data generating means comprises:

un-structured grid generating means operatively responsive to said set of seismic data and said set of well log data for generating an un-structured grid in connection with said earth formation, said un-structured grid including a first plurality of grid cells;

cell numberer means operatively connected to said un-structured grid generating means for assigning an (I, J, K) index value to each grid cell of said first plurality of grid cells of said un-structured grid; and data exporter means responsive to said un-structured grid generated by said un-structured grid generating means and to said (I, J, K) index value associated with each of said first plurality of grid cells of said un-structured grid for mapping said un-structured grid into a structured grid having a second plurality of grid cells, said output data including said structured grid having said second plurality of grid cells and said plurality of values indicative of said transmissibility between each said pair of said second plurality of grid cells of said structured grid.

3. The apparatus of claim 2, wherein said output data generating means comprises:

cell property calculation means operatively connected to said un-structured grid generating means for calculating said transmissibility between each pair of said first plurality of grid cells of said un-structured grid; and well connections determination means responsive to said un-structured grid generated by said un-structured grid generating means for calculating a plurality of flow coefficients associated, respectively, with certain ones of said first plurality of grid cells of said un-structured grid which are intersected by said wellbore and generating a well connections data structure comprised of said certain ones of said first plurality of grid cells and said plurality of flow coefficients, said data exporter means being responsive to said well connections data structure and to said un-structured grid generated by said un-structured grid generating means and to said (I, J, K) index value associated with each of said first plurality of grid cells of said un-structured grid for mapping said un-structured grid into said structured grid having said second plurality of cells.

4. The apparatus of claim 2, wherein said un-structured grid generating means comprises:

means operatively responsive to said set of seismic data and said set of well log data for defining a boundary within said formation in which said wellbore is located;

point distribution means for distributing a plurality of points inside said boundary;

means for controlling a distance between adjacent ones of said points inside said boundary; and means for interconnecting said plurality of points together to form either a plurality of triangularly shaped cells in 2D space or a plurality of tetrahedrally shaped cells in 3D space.

5. The apparatus of claim 4, wherein said un-structured grid generating means further comprises:

aggregation means for defining certain ones of said plurality of triangularly shaped cells or certain ones of said plurality of tetrahedrally shaped cells which should be grouped together thereby forming an aggregation map, each of said certain ones of said triangularly shaped cells and each of said certain ones of said tetrahedrally shaped cells having a circumcenter, a distance between said circumcenters of adjacent ones of said triangularly shaped cells or a distance between said circumcenters of adjacent ones of said tetrahedrally shaped cells being small as compared to an overall size of said triangularly shaped cell or a size of said tetrahedrally shaped cell.

6. The apparatus of claim 5, wherein said un-structured grid generating means further comprises:

cell generation means responsive to said aggregation map generated by said aggregation means for grouping together said certain ones of said plurality of triangularly shaped cells or said certain ones of said plurality of tetrahedrally shaped cells thereby generating said un-structured grid in connection with said earth formation, said certain ones of said triangularly shaped cells and said certain ones of said tetrahedrally shaped cells each having a combined circumcenter, said combined circumcenter of said certain ones of said plurality of triangularly shaped cells and said combined circumcenter of said certain ones of said plurality of tetrahedrally shaped cells being a simulation cell center when said cell generation means groups together said certain ones of said plurality of triangularly shaped cells or said certain ones of said plurality of tetrahedrally shaped cells.

7. The apparatus of claim 6, wherein said output data generating means comprises:

cell property calculation means operatively connected to said un-structured grid generating means for calculating said transmissibility between each pair of said first plurality of grid cells of said un-structured grid; and well connections determination means responsive to said un-structured grid generated by said un-structured grid generating means for calculating a plurality of flow coefficients associated, respectively, with certain ones of said first plurality of grid cells of said un-structured grid which are intersected by said wellbore and generating a well connections data structure comprised of said certain ones of said first plurality of grid cells and said plurality of flow coefficients, said data exporter means being responsive to said well connections data structure and to said un-structured grid generated by said un-structured grid generating means and to said (I, J, K) index value associated with each of said first plurality of grid cells of said un-structured grid for mapping said un-structured grid into said structured grid having said second plurality of grid cells.

8. Apparatus for generating more accurate earth formation grid cell property information adapted for use by a simulator, said simulator displaying more accurate simulation results of the formation near a wellbore, comprising:

means for building a boundary;

means for distributing a plurality of points inside said boundary;

means for connecting together said plurality of points inside said boundary such that a plurality of triangles are formed in 2D space or a plurality of tetrahedra are formed in 3D space;

means for creating an aggregation map comprised of a list of certain ones of said plurality of triangles or certain ones of said plurality of tetrahedra which should be grouped together to form a polygonal shape, said certain ones of said plurality of triangles and said certain ones of said plurality of tetrahedra having nodes which are nearest neighbors of a structured distribution of points and having circumcenters which are clustered closely together;

means for grouping together inside said boundary said certain ones of said plurality of triangles or said certain ones of said plurality of tetrahedra in response to said aggregation map;

means for generating an un-structured grid in response to the means for grouping comprised of a plurality of grid cells;

means for calculating cell property information for each of said plurality of grid cells;

means for generating output data which includes said cell property information for said each of said plurality of grid cells, said output data being adapted for use by said simulator, said simulator generating a plurality of said simulation results associated, respectively, with said plurality of grid cells of said un-structured grid in response to said output data; and display mans for displaying said plurality of grid cells and the respective plurality of simulation results.

9. The apparatus of claim 8, wherein said certain ones of said plurality of triangles and said certain ones of said plurality of tetrahedra, which are grouped together by the means for grouping, each have a combined circumcenter and a simulation cell center, said combined circumcenter being said simulation cell center.

10. The apparatus of claim 8, further comprising:

means for assigning an (I, J, K) index to each grid cell of said plurality of grid cells of said un-structured grid generated by said means for generating an un-structured grid.

11. The apparatus of claim 10, further comprising:

means responsive to said (I, J, K) index assigned to said each grid cell of said un-structured grid by the means for assigning and to said un-structured grid generated by the means for generating for mapping said each grid cell of said plurality of grid cells of said un-structured grid into a structured grid having a second plurality of grid cells, each grid cell of the second plurality of grid cells of said structured grid having an (1, J, K) index address.

12. The apparatus of claim 11, wherein said output data, generated by said means for generating output data, comprises:

said structured grid having said second plurality of grid cells where each grid cell of the second plurality of grid cells has said (I, J, K) index address, and said cell property information for each of said second plurality of grid cells.

13. The apparatus of claim 12, wherein said cell property information includes a transmissibility between adjacent ones of said second plurality of grid cells, said transmissibility being determined from the following equation:

$$T_{ij} = \frac{C_D}{1/t_i + 1/t_j},$$

$$\text{where } t_i = \frac{a^T K_i r_i}{\|r_i\|^2} \text{ and } K_i = \begin{pmatrix} NTG & 0 & 0 \\ 0 & NTG & 0 \\ 0 & 0 & 1 \end{pmatrix} K_{i(raw)}$$

and a=area vector of the interface, $K_i$=permeability tensor of cell i adjusted by net to gross, $r_i$=vector from centre of cell i to the interface along the line of centers, $C_D$=Darcy constant, and NTG=net to gross thickness ratio.

14. The apparatus of claim 10, further comprising:
means for determining which ones of said plurality of grid cells of said un-structured grid, generated by said means for generating said un-structured grid, are cut through and intersected by said wellbore thereby identifying a subset of said plurality of grid cells which consists of another plurality of grid cells;
means for calculating a flow coefficient for each grid cell of said another plurality of grid cells; and
means for determining a well connections data structure including said another plurality of grid cells and a plurality of the flow coefficients associated, respectively, with said another plurality of grid cells.

15. The apparatus of claim 14, further comprising:
means responsive to said (I, J, K) index assigned to said each grid cell of said un-structured grid by the means for assigning and to said un-structured grid generated by the means for generating and to said well connections data structure determined by said means for determining for mapping said each grid cell of said plurality of grid cells of said un-structured grid into a structured grid having a second plurality of grid cells, each grid cell of the second plurality of grid cells of said structured grid having an (I, J, K) index address.

16. Apparatus responsive to input data for generating more accurate earth formation grid cell property information for use by a simulator, said simulator displaying more accurate simulation results of said earth formation, comprising:
means responsive to said input data for defining an un-structured grid data structure, said un-structured grid data structure comprising a first plurality of grid cells;
cell property calculator means responsive to said first plurality of grid cells of said un-structured grid for calculating a particular property associated with each pair of grid cells of said un-structured grid, said particular property representing said more accurate earth formation grid cell property information for use by said simulator;
data exporter means responsive to said un-structured grid data structure and the particular properties associated therewith for mapping the un-structured grid of said un-structured grid data structure into a structured grid thereby producing an output data structure comprised of said structured grid having a second plurality of grid cells;
simulator means responsive to said output data structure for generating a set of simulation results; and
display means responsive to said set of simulation results for displaying said simulation results, said simulation results representing said more accurate simulation results of said earth formation.

17. The apparatus of claim 16, wherein said input data comprises seismic data, said first plurality of grid cells of said un-structured grid comprising a plurality of approximately triangularly shaped or tetrahedrally shaped grid cells, said second plurality of grid cells of said structured grid comprising a plurality of approximately rectangularly shaped grid cells, and wherein said apparatus further comprises:
cell numberer means for assigning an (I, J, K) index address to each grid cell of the un-structured grid data structure, each grid cell of said structured grid produced by said data exporter means also having said (I, J, K) index address.

18. The apparatus of claim 17, wherein said particular property associated with each pair of grid cells of said un-structured grid comprises a transmissibility.

19. The apparatus of claim 18, wherein said transmissibility is determined from the following equation:

$$T_{ij} = \frac{C_D}{1/t_i + 1/t_j},$$

$$\text{where } t_i = \frac{a^T K_i r_i}{\|r_i\|^2} \text{ and } K_i = \begin{pmatrix} NTG & 0 & 0 \\ 0 & NTG & 0 \\ 0 & 0 & 1 \end{pmatrix} K_{i(raw)}$$

and a=area vector of the interface, $K_i$=permeability tensor of cell i adjusted by net to gross, $r_i$=vector from centre of cell i to the interface along the line of centers, $C_D$=Darcy constant, and NTG=net to gross thickness ratio.

20. The apparatus of claim 17, wherein said particular property associated with each pair of grid cells of said un-structured grid comprises a pore volume.

21. The apparatus of claim 16, wherein said means responsive to said input data for defining an un-structured grid data structure comprises:
an internal model builder responsive to said input data and adapted for building an internal model data structure representing a boundary into which a plurality of points are distributed;
a point distributor responsive to said internal model data structure and adapted for distributing a plurality of points inside said boundary thereby generating a points data structure;
a triangulator tetrahedralizer adapted for receiving the plurality of points in said points data structure and for connecting together all said points in said boundary so as to create a plurality of triangles or a plurality of tetrahedra thereby generating a triangles tetrahedra data structure; and
means for grouping together a first set of triangles of said plurality of triangles or a first set of tetrahedra of said plurality of tetrahedra to form a plurality of polygonal shapes grouped together inside said boundary, said plurality of triangles or said plurality of tetrahedra including said plurality of polygonal shapes grouped together inside said boundary defining said un-structured grid data structure.

22. The apparatus of claim 21, wherein said means for grouping comprises:
a triangle tetrahedra aggregator responsive to said triangles tetrahedra data structure adapted for producing an aggregation map which states which set of triangles of the plurality of triangles or which set of tetrahedra of the plurality of tetrahedra should be grouped together to form said polygonal shapes; and
a cell generator responsive to the sets of triangles and tetrahedra in said aggregation map and adapted for grouping together said first set of triangles of said plurality of triangles or said first set of tetrahedra of said plurality of tetrahedra in response to said aggregation map.

23. The apparatus of claim 21, wherein said point distributor further comprises a control parameter editor responsive to said points data structure generated by said point distributor and adapted for controlling the distance between adjacent points of said plurality of points distributed inside said boundary by said point distributor, said control parameter editor further adapted for defining a number of said plurality of points distributed inside said boundary in an "x" direction and a number of said plurality of points distributed inside said boundary in a "y" direction.

24. The apparatus of claim 21, wherein said input data comprises seismic data, said first plurality of grid cells of said un-structured grid comprising a plurality of relative triangularly shaped or tetrahedrally shaped grid cells, said second plurality of grid cells of said structured grid comprising a plurality of relative rectangular shaped grid cells, and wherein said apparatus further comprises:

cell numberer means for assigning an (I, J, K) index address to each grid cell of the un-structured grid data structure, each grid cell of said structured grid produced by said data exporter having said (I, J, K) index address.

25. The apparatus of claim 24, wherein said particular property associated with each pair of grid cells of said un-structured grid comprises a transmissibility.

26. The apparatus of claim 25, wherein said transmissibility is determined from the following equation:

$$T_{ij} = \frac{C_D}{1/t_i + 1/t_j},$$

where $t_i = \frac{a^T K_i r_i}{\|r_i\|^2}$ and $K_i = \begin{pmatrix} NTG & 0 & 0 \\ 0 & NTG & 0 \\ 0 & 0 & 1 \end{pmatrix} K_{i(raw)}$ and a=area vector of the interface, $K_i$=permeability tensor of cell i adjusted by net to gross, $r_i$=vector from centre of cell i to the interface along the line of centers, $C_D$=Darcy constant, and NTG=net to gross thickness ratio.

27. The apparatus of claim 24, wherein said particular property associated with each pair of grid cells of said un-structured grid comprises a pore volume.

28. The apparatus of claim 21, wherein said triangulator tetrahedralizer, which is adapted for generating said triangles tetrahedra data structure containing said plurality of points connected together inside said boundary, comprises:

grid generation means for generating an approximately K-orthogonal triangular based grid or approximately K-orthogonal tetrahedral based grid by scaling a physical geometry.

29. The apparatus of claim 28, wherein said grid generation means which generates the K-orthogonal grid by scaling the physical geometry, further comprising:

means for mapping said physical geometry into a computation space;

means for distributing said plurality of points in said points data structure in said computational space based on the mapped geometry;

means for performing a Delaunay triangulation or tetrahedralization on said plurality of points in said computational space thereby creating a plurality of cells; and means for transforming the plurality of cells in said computational space back into physical space.

* * * * *